(12) United States Patent
Yoshioka

(10) Patent No.: US 9,477,846 B2
(45) Date of Patent: Oct. 25, 2016

(54) SIGNATURE DEVICE AND SIGNATURE METHOD

(71) Applicant: FUJITSU LIMITED, Kawasaki-shi, Kanagawa (JP)

(72) Inventor: Takashi Yoshioka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 14/602,887

(22) Filed: Jan. 22, 2015

(65) Prior Publication Data
US 2015/0131965 A1 May 14, 2015

Related U.S. Application Data

(62) Division of application No. 13/421,092, filed on Mar. 15, 2012, now Pat. No. 8,971,691.

(30) Foreign Application Priority Data

Mar. 18, 2011 (JP) ................................ 2011-061788

(51) Int. Cl.
*H04N 5/93* (2006.01)
*G06F 21/64* (2013.01)
(Continued)

(52) U.S. Cl.
CPC ........... *G06F 21/64* (2013.01); *G06K 9/00154* (2013.01); *G11B 27/031* (2013.01); *G11B 27/19* (2013.01); *H04N 1/215* (2013.01); *H04N 1/32128* (2013.01); *H04N 5/765* (2013.01); *H04N 5/93* (2013.01); *H04N 5/931* (2013.01); *H04N 7/18* (2013.01); *H04N 9/8205* (2013.01); *H04N 19/40* (2014.11); *H04N 19/467* (2014.11);
(Continued)

(58) Field of Classification Search
CPC .................. G06F 17/30843; G06F 17/30017; H04N 21/235; G06Q 50/24
See application file for complete search history.

(56) References Cited

U.S. PATENT DOCUMENTS

2001/0033660 A1 10/2001 Maeda
2002/0152267 A1* 10/2002 Lennon ............. G06F 17/30017
709/203
(Continued)

FOREIGN PATENT DOCUMENTS

JP 2004-5934 1/2004
JP 2005-33503 2/2005

OTHER PUBLICATIONS

Restriction/Election Requirement issued Apr. 11, 2013 corresponding to U.S. Appl. No. 13/421,092.
(Continued)

*Primary Examiner* — Hung Dang
*Assistant Examiner* — Sunghyoun Park
(74) *Attorney, Agent, or Firm* — Staas & Halsey LLP

(57) ABSTRACT

A signature device including a storage unit configured to store moving image data, and a processor configured to extract original metadata from moving image data for the image data of each of a plurality of images forming the moving image data, the original metadata including location data of the image data and identification data of the moving image data, to encode the image data of each of the images into still image data in accordance with an image format, to write the still image data into a first area, to write the original metadata extracted by the extractor into a second area, the first area and the second area being included in a storage area of a still image data file in which the still image data is filed, and to generate summary data for the still image data file.

4 Claims, 35 Drawing Sheets

(51) Int. Cl.
- H04N 1/21 (2006.01)
- H04N 1/32 (2006.01)
- H04N 5/765 (2006.01)
- H04N 5/931 (2006.01)
- H04N 9/82 (2006.01)
- H04N 7/18 (2006.01)
- H04N 21/234 (2011.01)
- H04N 21/2343 (2011.01)
- H04N 21/235 (2011.01)
- H04N 21/266 (2011.01)
- H04N 21/6334 (2011.01)
- H04N 21/6377 (2011.01)
- H04N 21/8352 (2011.01)
- H04N 21/84 (2011.01)
- H04N 21/8549 (2011.01)
- H04N 19/60 (2014.01)
- H04N 19/467 (2014.01)
- H04N 19/40 (2014.01)
- G06K 9/00 (2006.01)
- G11B 27/031 (2006.01)
- G11B 27/19 (2006.01)

(52) U.S. Cl.
CPC .......... *H04N 19/60* (2014.11); *H04N 21/2351* (2013.01); *H04N 21/23418* (2013.01); *H04N 21/234309* (2013.01); *H04N 21/26613* (2013.01); *H04N 21/63345* (2013.01); *H04N 21/63775* (2013.01); *H04N 21/8352* (2013.01); *H04N 21/84* (2013.01); *H04N 21/8549* (2013.01); *H04N 2201/3205* (2013.01); *H04N 2201/3214* (2013.01); *H04N 2201/3215* (2013.01); *H04N 2201/3232* (2013.01); *H04N 2201/3233* (2013.01); *H04N 2201/3238* (2013.01); *H04N 2201/3249* (2013.01); *H04N 2201/3281* (2013.01)

(56) References Cited

U.S. PATENT DOCUMENTS

| | | |
|---|---|---|
| 2003/0147563 A1 | 8/2003 | Liu et al. |
| 2004/0103233 A1 | 5/2004 | Shinkai et al. |
| 2004/0120698 A1 | 6/2004 | Hunter |
| 2004/0234240 A1 | 11/2004 | Kurosawa et al. |
| 2005/0160067 A1 | 7/2005 | Sohma et al. |
| 2007/0036522 A1 | 2/2007 | Yoshida et al. |
| 2010/0042642 A1 | 2/2010 | Shahraray et al. |

OTHER PUBLICATIONS

Office Action issued Jun. 7, 2013 corresponding to U.S. Appl. No. 13/421,092.

Final Office Action issued Oct. 17, 2013 corresponding to U.S. Appl. No. 13/421,092.

Advisory Action issued Dec. 18, 2013 corresponding to U.S. Appl. No. 13/421,092.

Office Action issued Mar. 6, 2014 corresponding to U.S. Appl. No. 13/421,092.

Final Office Action issued Aug. 28, 2014 corresponding to U.S. Appl. No. 13/421,092.

\* cited by examiner

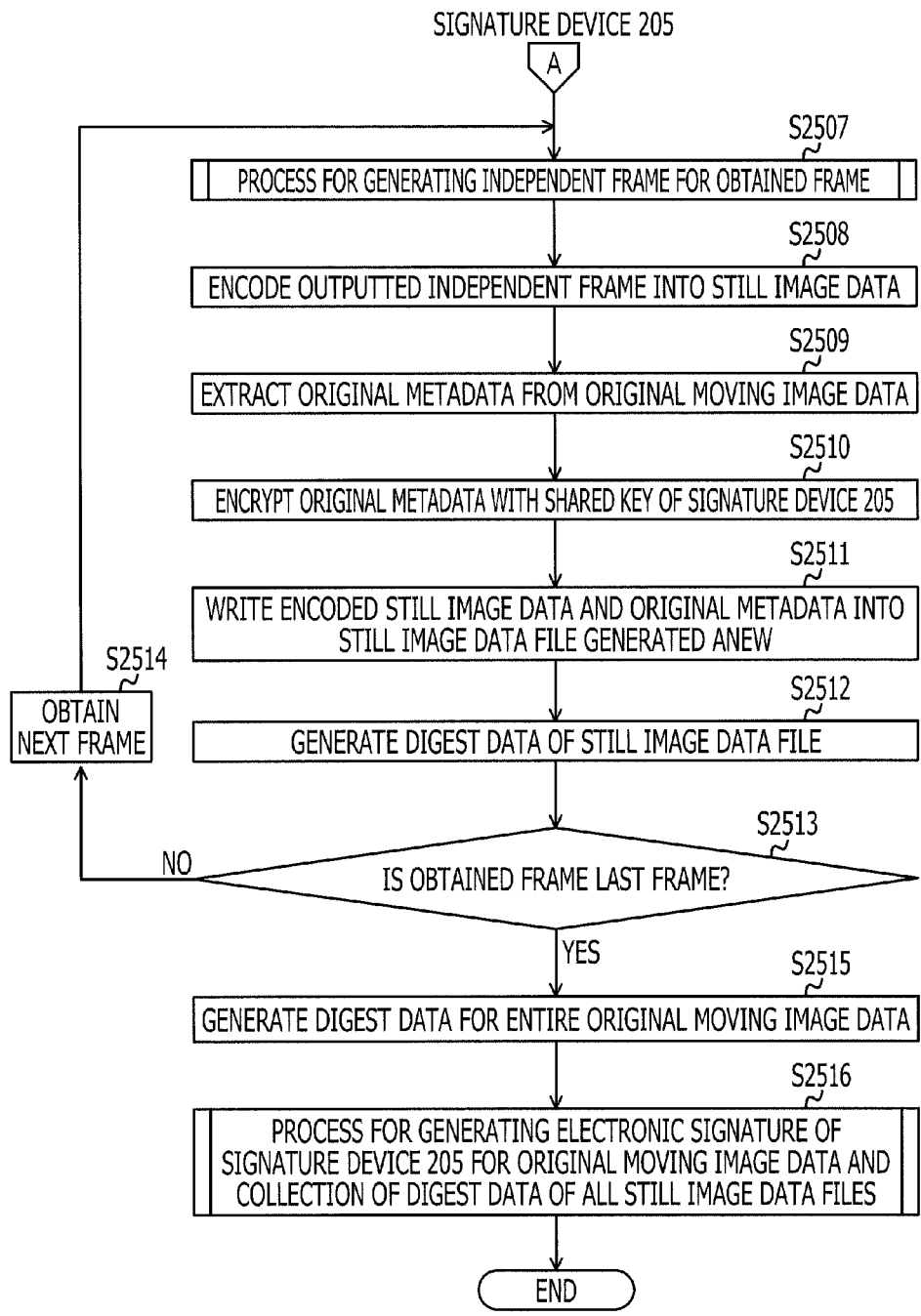

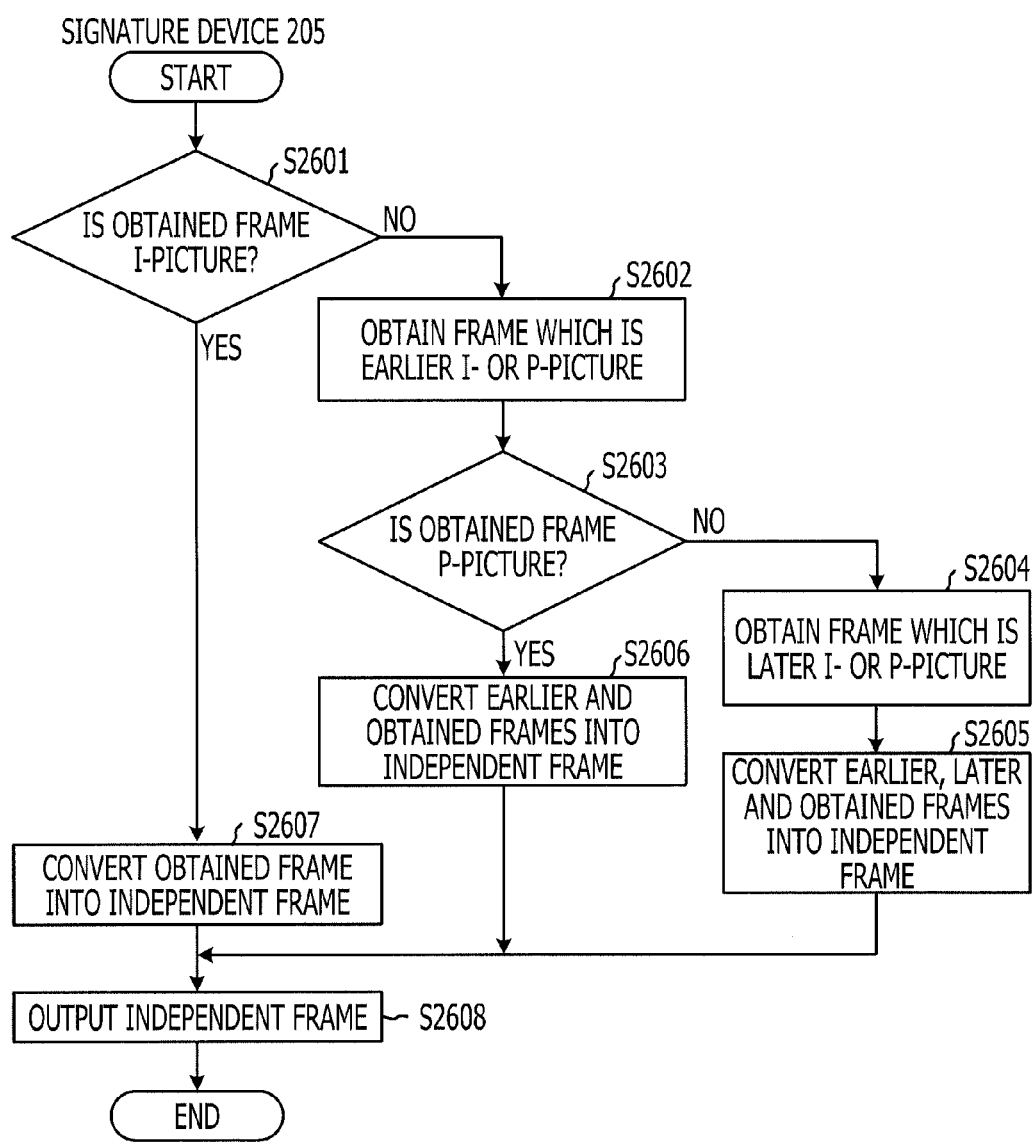

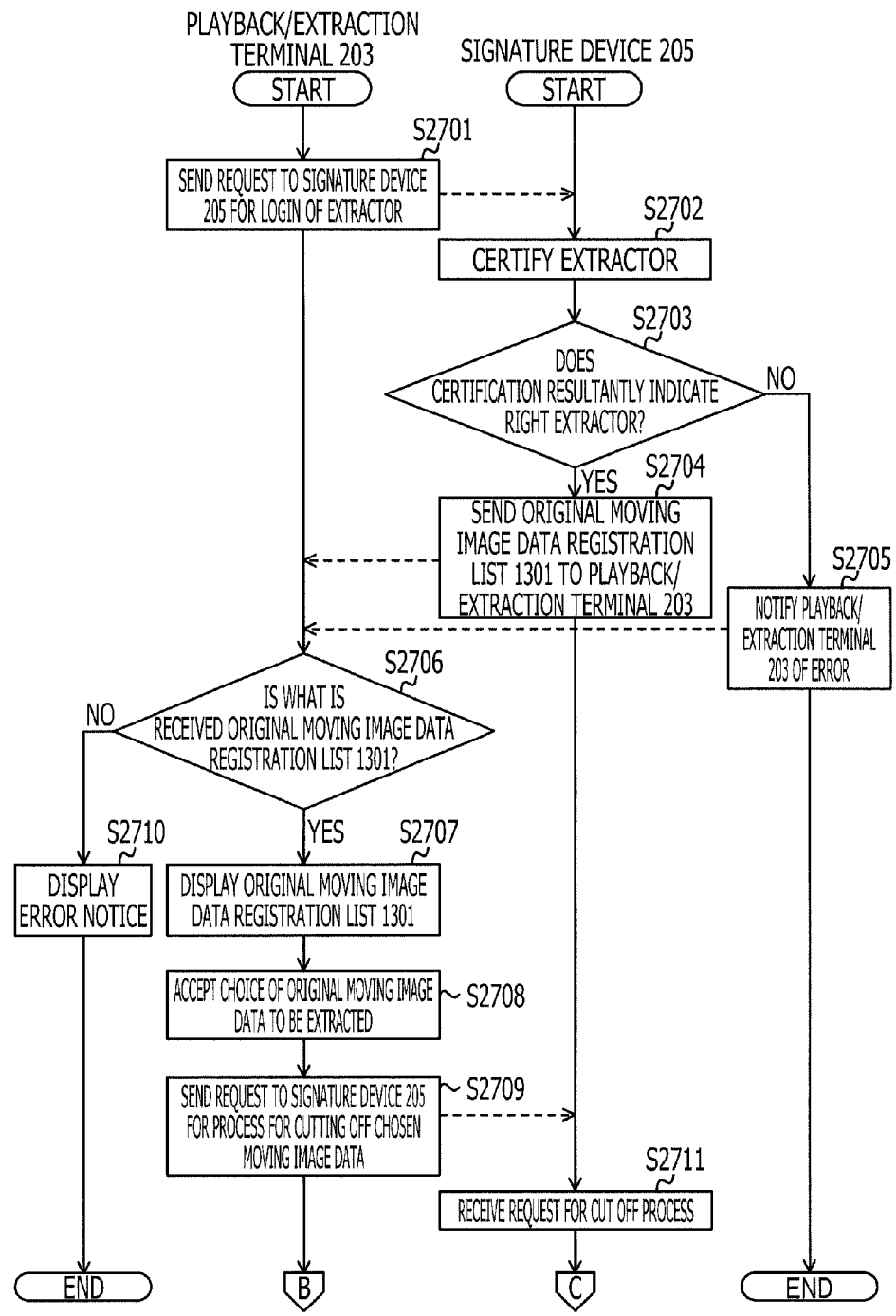

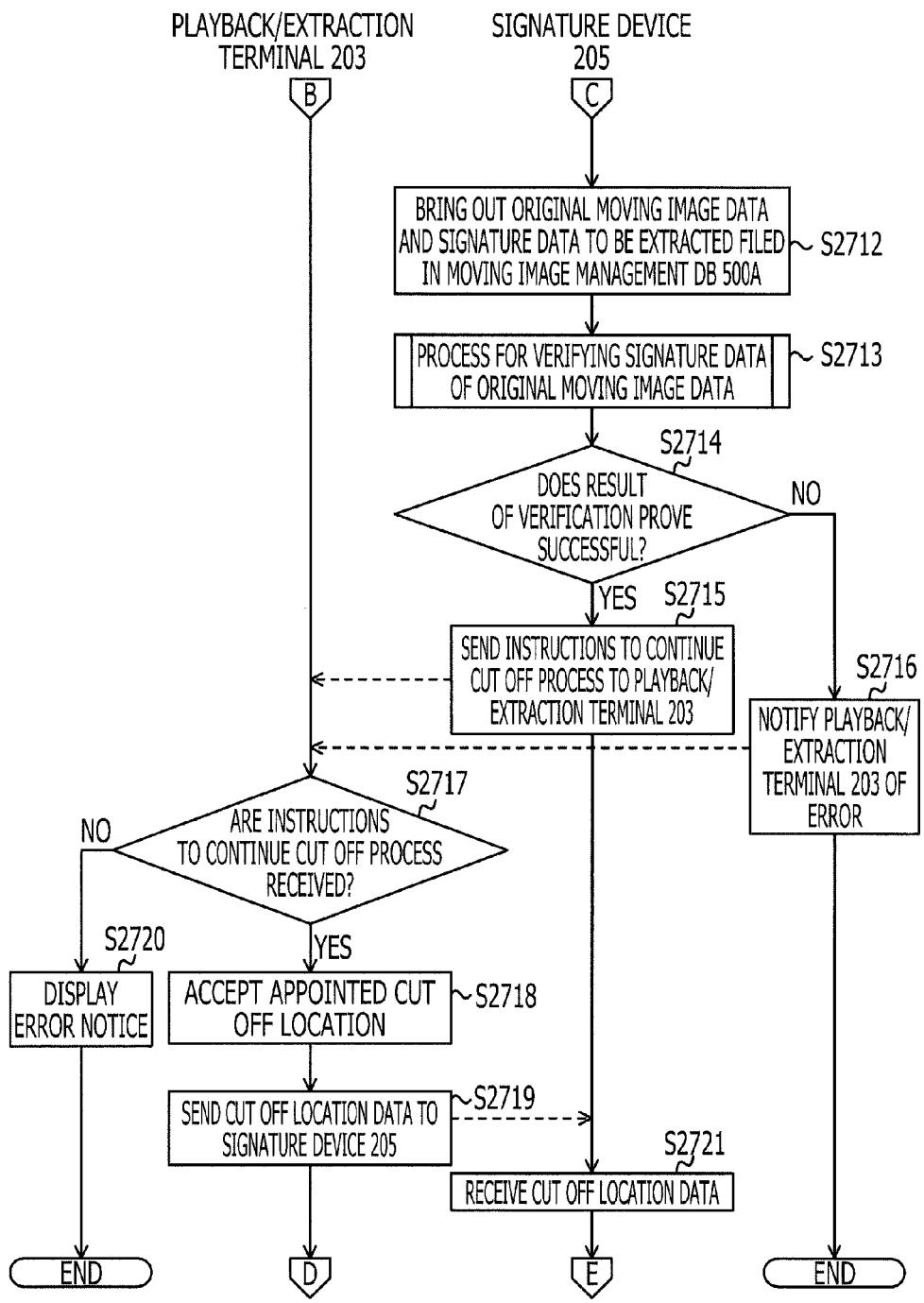

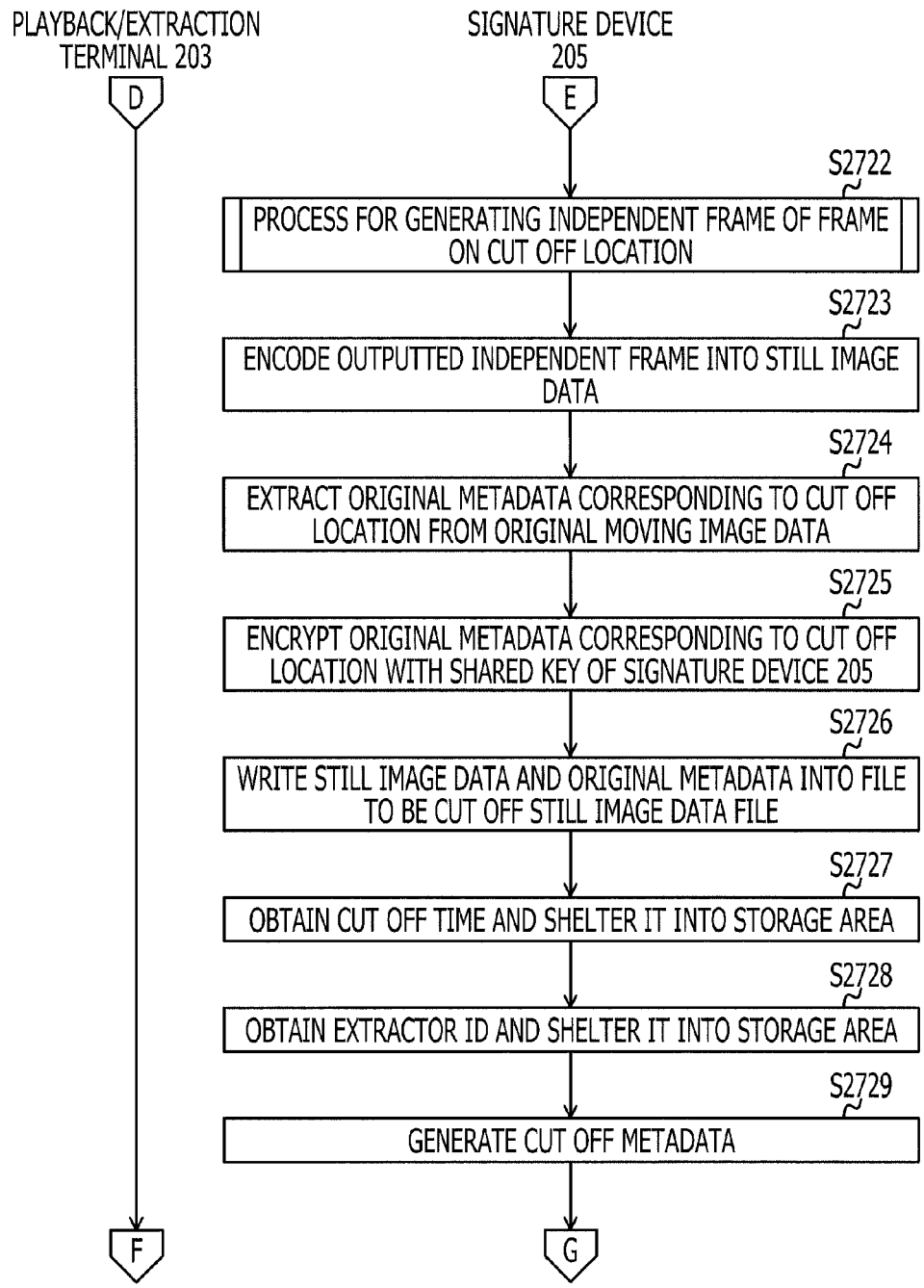

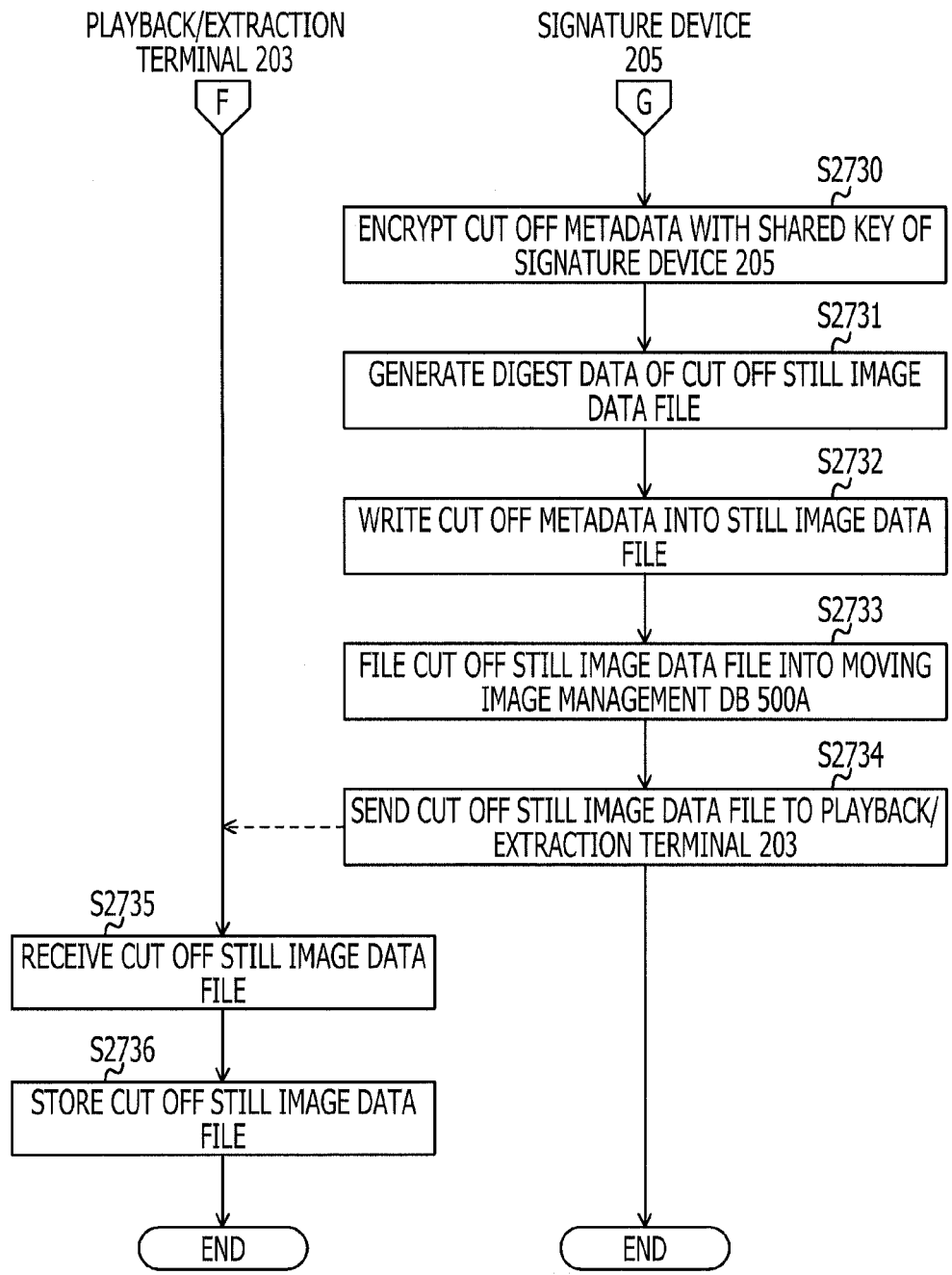

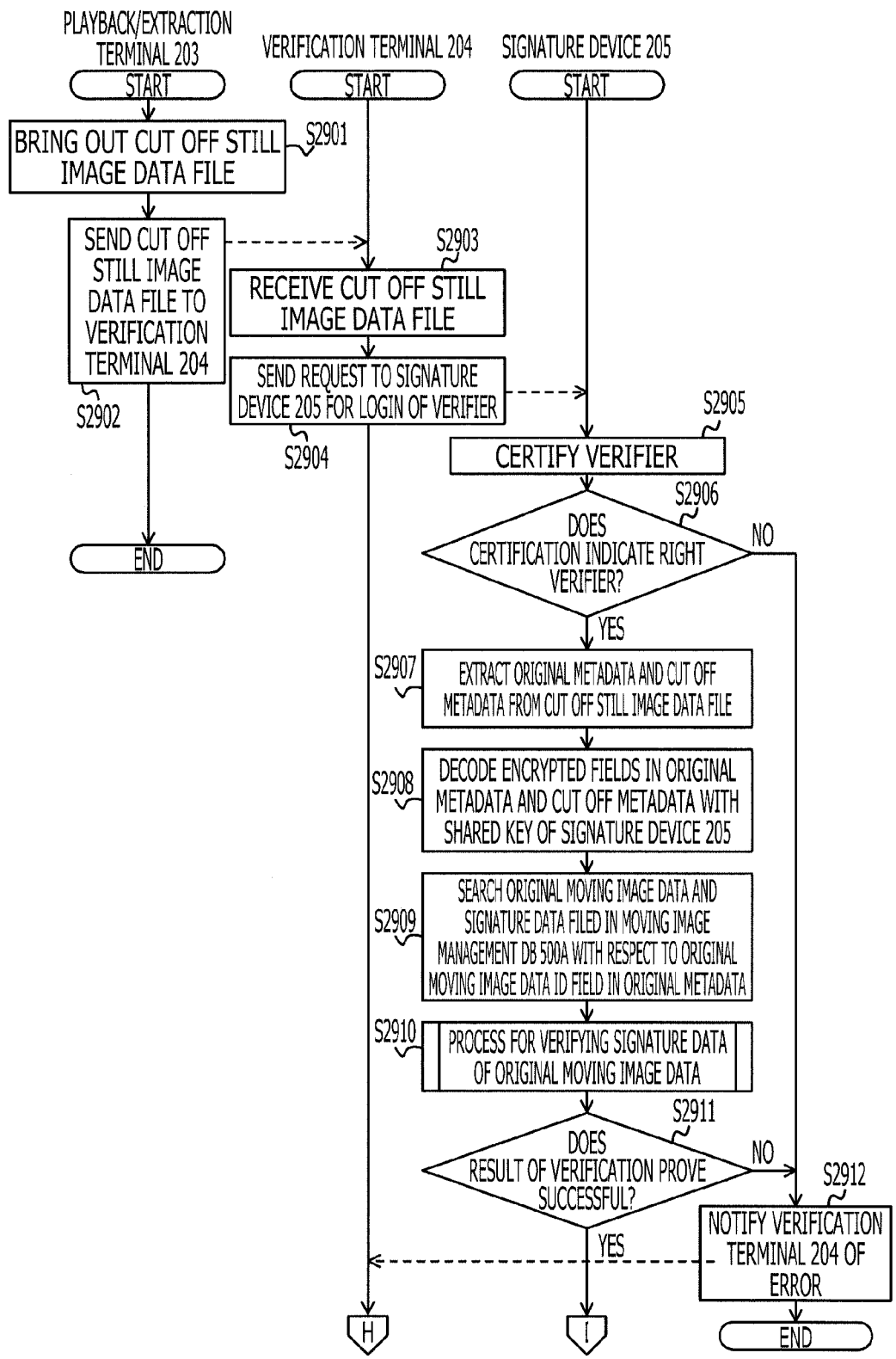

US 9,477,846 B2

SIGNATURE DEVICE AND SIGNATURE METHOD

CROSS-REFERENCE RELATED TO APPLICATION

This application is a divisional application of application Ser. No. 13/421,092, which was filed on Mar. 15, 2012 and is based upon and claims the benefit of priority of the prior Japanese Patent Application No. 2011-61788, filed on Mar. 18, 2011, the entire contents of both of which are incorporated herein by reference.

This application is based upon and claims the benefit of priority of the prior Japanese Patent Application No. 2011-61788, filed on Mar. 18, 2011, the entire contents of which are incorporated herein by reference.

FIELD

The embodiment discussed herein is related to a signature device and a signature method which generates and verifies a signature.

BACKGROUND

In recent years, an observation camera is installed in a store, a busy street or a condominium and a drive recorder is installed in a business use vehicle as usual, and moving image data is treated as evidence in an increasing number of cases. Further, it is in the process of being a common sense that a store records a conversation between a customer and an operator and keeps the record as evidence in order to deal with a trouble concerning trading on the phone or supporting business.

The store provides a videotape or an image or audio file as it is at present so as to give moving image data or voice as evidence. If, however, image or voice is stored increasingly in digital forms, it can be easily altered or edited and thus will ask for third-party authentication such as a signature or timestamp so as to be treated as evidence. Services or products which record voice of a telephone operator with a timestamp are on sale in practice. It is expected that these kinds of technologies will be increasingly in demand.

Incidentally, a method for dividing contents in an electronic document into headings, calculating summary data of each of the headings, and adding an electronic signature to collection of the summary data of each of the headings is used as a technology for detecting a third-party's alteration. The summary data mentioned here corresponds to hash data calculated by the use of a cryptographic one-way hash function called a message digest.

Further, a technology for providing an image file with an expanded area and recording related data together with image data is disclosed with regard to image filing. Further, another technology for providing an image file with an expanded area and recording a plurality of copies or partial copies of appended data corresponding to image data is disclosed with regard to image filing (Japanese Laid-open Patent Publications No. 2005-33503 and No. 2004-5934, e.g., discuss those technologies).

Further, a form of Internet service called cloud computing (called "cloud" hereafter) in which a user can use services provided by servers on the network without being aware of them has been mainstreamed in recent years. Services for using the cloud so as to pile up and manage digitized moving images and voices in a center server in the cloud and to distribute content are being mainstreamed.

SUMMARY

According to an aspect of the invention, a signature device including a storage unit configured to store moving image data, and a processor configured to extract original metadata from moving image data for the image data of each of a plurality of images forming the moving image data, the original metadata including location data of the image data and identification data of the moving image data, to encode the image data of each of the images into still image data in accordance with an image format, to write the still image data into a first area, to write the original metadata extracted by the extractor into a second area, the first area and the second area being included in a storage area of a still image data file in which the still image data is filed, and to generate summary data for the still image data file.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 12 is an explanatory diagram which illustrates exemplary image data that original metadata is added to;

FIG. 15A is an explanatory diagram which depicts an exemplary cut off still image data file that original metadata and cut off metadata are added to;

FIG. 15B is another explanatory diagram which depicts an exemplary cut off still image data file that original metadata and cut off metadata are added to;

FIG. 17 is an explanatory diagram which depicts an exemplary screen that a list of original moving image data is displayed on;

FIG. 18 is an explanatory diagram which depicts an exemplary screen that a cut off still image data file is made on;

FIG. 19 is an explanatory diagram which depicts an exemplary screen that a cut off still image data file to be verified is chosen on;

FIG. 20 is an explanatory diagram which depicts an exemplary screen that a result of verification of a cut off still image data file is displayed on;

FIG. 21 is an explanatory diagram which depicts an exemplary screen that property data of a cut off still image data file is displayed on;

FIG. 25B is a second page of the flowchart which depicts the exemplary process for generating the signature to be put to the original moving image data;

FIG. 26 is a flowchart which depicts a process for generating an independent frame;

FIG. 27A is a first page of a flowchart which depicts an exemplary process for generating a cut off still image data file;

FIG. 27B is a second page of the flowchart which depicts the exemplary process for generating the cut off still image data file;

FIG. 27C is a third page of the flowchart which depicts the exemplary process for generating the cut off still image data file;

FIG. 27D is a fourth page of the flowchart which depicts the exemplary process for generating the cut off still image data file;

FIG. 29A is a first page of a flowchart which depicts an exemplary process for verifying a cut off still image data file.

DESCRIPTION OF EMBODIMENTS

According to a cloud service included in ordinary technologies described above for providing third-party's authentication, however, moving image data or signature data is stored as the original in a center server. As the center server verifies part of the moving image data in condition that the large-sized moving image data and the signature data are integrated and managed in a table, etc., there is a problem in that it is difficult to identify related data to be used for confirming the original.

An object of the embodiment is to provide a signature device and a signature method which facilitates identification of related data to be used for confirming the original in order to reduce the above problems that the ordinary technologies have.

The embodiment of a disclosed signature device and a signature method will be explained in detail with reference to the drawings.

Figure 1:
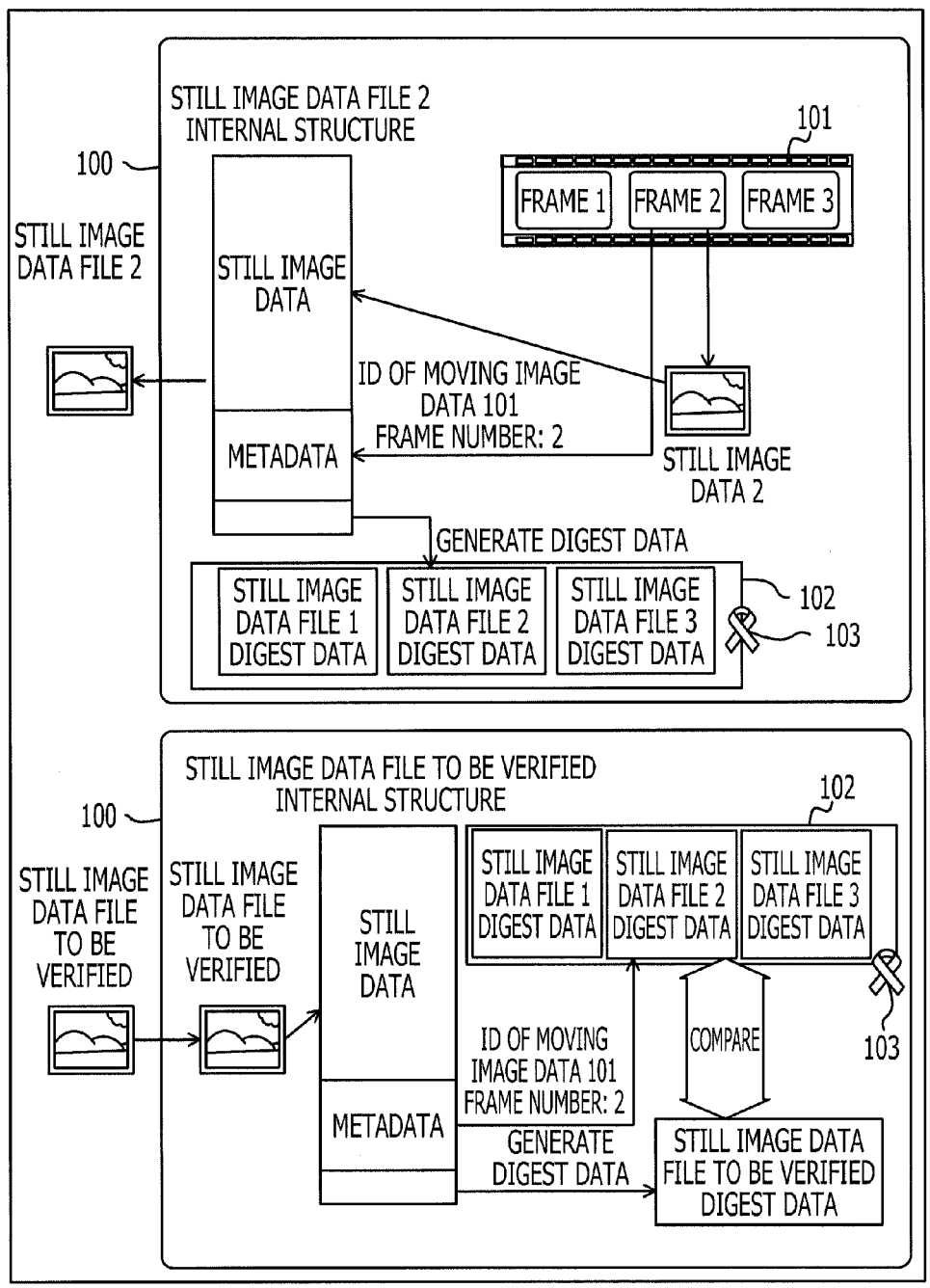
FIG. 1 is an explanatory diagram which depicts exemplary operations of a signature system of the embodiment in time of signature generation and in time of verification.

FIG. 1 is an explanatory diagram which depicts exemplary operations of a signature system 100 of the embodiment in time of signature generation and verification. The operation in time of signature generation will be explained first. The signature system 100 including a signature device of the embodiment generates a piece of still image information (still image data) for every frame in a piece of moving image information (moving image data) 101 on the basis of the image information (image data) of each of the frames. In time of generation, the signature system 100 writes metadata including an ID (IDentification) for identification of the moving image data 101 and a frame number into an expanded area according to an image format in a still image information file (still image data file) in which still image data is filed according to the image format of the still image data. Incidentally, the metadata is additional data related to the data to be generated itself.

Suppose that a JPEG (Joint Photographic Experts Group) format which is one of standard formats of compressed still images is used for the image format of the still image data file of the embodiment. Further, suppose that an MPEG (Moving Picture Experts Group) format which is one of standard formats of compressed moving images is used for moving image data.

After writing the metadata, the signature system 100 generates digest data which summarizes the still image data file that the metadata is written into, and stores the digest data generated in order of the frame numbers in a storage area. After storing the digest data, the signature system 100 makes a digest data group stored in order of the frame numbers an object to be signed 102, and provides the object to be signed 102 with en electronic signature.

The signature system 100, e.g., encodes a frame 1 into still image data 1. Then, the signature system 100 writes the metadata into an expanded area of a still image data file 1 in which the still image data 1 is filed. After writing the metadata, the signature system 100 generates still image data file 1 digest data which is digest data of the still image data file 1. The signature system 100 similarly generates still image data file 2 digest data and still image data file 3 digest data. After generating them, the signature system 100 provides the object to be signed 102 filed in order of the frame numbers such as the still image data file 1 digest data, still image data file 2 digest data, still image data file 3 digest data and so on with an electronic signature 103.

Further, the signature system 100 outputs a still image data file for which metadata is written into an expanded area of the still image data file in order to open still image data to the public. The signature system 100 opens the still image data file 2 as depicted in FIG. 1.

Then, the operation in time of verification will be explained. The signature system 100 extracts metadata filed in an expanded area from a still image data file to be verified. As the still image data file 2 is supposed to be the image to be verified in FIG. 1, the signature system 100 extracts an ID and a frame number: 2 of the moving image data 101.

After extracting them, the signature system 100 searches a stored digest data group of the object to be signed 102 for digest data corresponding to the data that the combination of the ID and the frame number of the moving image data 101 is extracted from. As the frame number: 2 is supposed, the still image data file 2 digest data is searched for in FIG. 1. If the still image data file 2 digest data agrees with the digest data of the still image data file to be verified after the search, the signature system 100 can prove no alteration.

The signature system 100 signs the object to be signed including the metadata which facilitates identification of signature data for confirming the original so that the signature data can be easily identified in time of signature verification as described above. The signature device of the embodiment will be explained hereafter by the use of FIGS. 2 to 29B.

Figure 2:
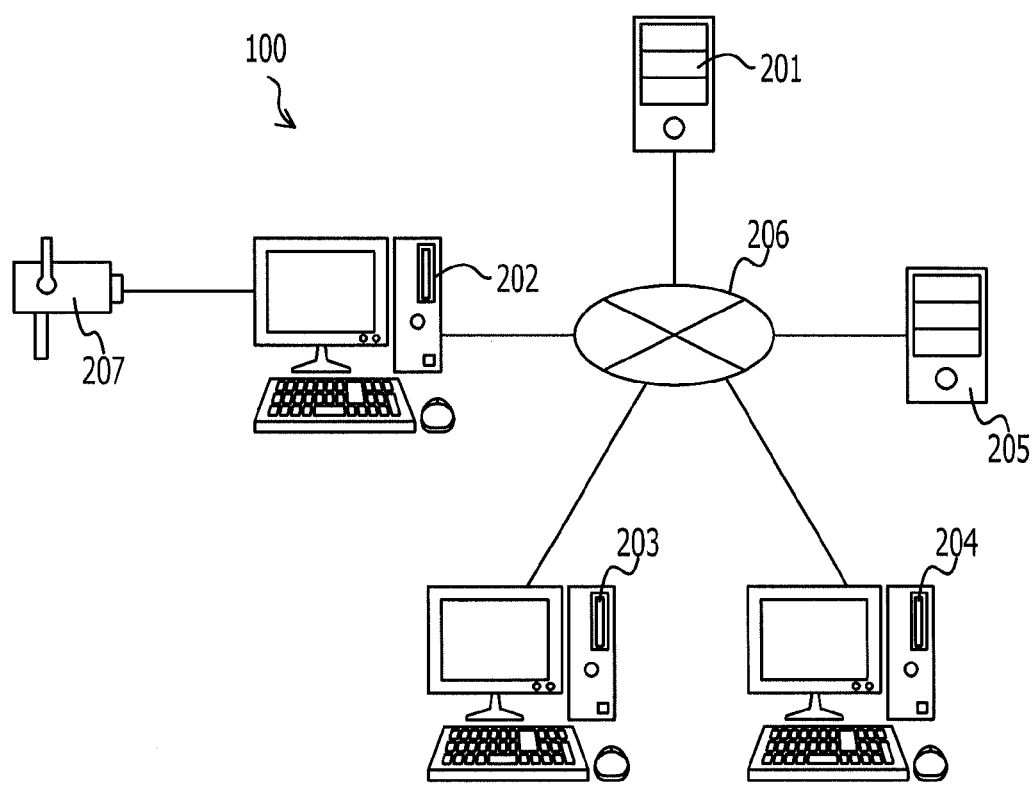
FIG. 2 is an explanatory diagram which depicts an exemplary device group of the signature system.

FIG. 2 is an explanatory diagram which depicts an exemplary device group of the signature system 100. The signature system 100 includes an authenticator device 201, an upload terminal 202, a playback/extraction terminal 203, a verification terminal 204 and a signature device 205. Those devices, the authenticator device 201 through the signature device 205, are each connected to a network 206. Further, the upload terminal 202 can communicate with a picture recorder terminal 207.

The authenticator device 201 is a server of an authenticator which manages electronic signature data. An electronic signature is formed by summary data that an object to be signed is summarized into encrypted with a secret key that a transmitter has. Then, the transmitter sends the electronic signature, the object to be signed and a certificate of a public key to a receiver. The receiver checks validity of the certificate of the public key, decodes the encrypted electronic signature with the public key included in the certificate of the public key, and compares the decoded electronic signature with summary data obtained from the object to be signed. The authenticator device 201 decides whether the electronic signature is sent from a right party or not depending upon whether the comparison proves agreement or not. The process will be described later in detail with reference to FIG. 23.

Further, the summary data described above is hash data calculated for the object to be signed by the use of a cryptographic one-way hash function. The summary data is called a message digest as well, in order to imply that the object to be signed can be compressed in size. Further, only the hash data generated by the use of the cryptographic one-way hash function is generated only from the object to be signed, and is characterized by a feature that original data will not be restored from the generated hash data.

Thus, the cryptographic one-way hash function is often used for data encryption or electronic signature generation. The cryptographic one-way hash function incorporates algorithms MD5 (Message Digest 5), SHA (Secure Hash Algorithm)-1 or SHA-256. Which algorithm is used for data to generate summary data (algorithm for generating hash data) is written in the certificate of the public key.

The upload terminal 202 obtains and stores streaming data recorded by the picture recording terminal 207 (called original moving image data, hereafter), and runs a process for registering the original moving image data on the signature device 205.

The playback/extraction terminal 203 is a terminal that an extractor uses so as to play back and extract the original moving image data in the signature device 205. The verification terminal 204 is a terminal that a verifier uses so as to work the signature device 205 and verify part of the original cut off the still image data file.

The signature device 205 is a center server in the signature system 100. The signature device 205 specifically stores and piles original moving image data sent from the upload terminal 202, and runs a process for generating a signature. Further, the signature device 205 is instructed by the playback/extraction terminal 203 so as to run a process for playing back and extracting the stored and piled moving image data. Further, the signature device 205 is instructed by the verification terminal 204 so as to verify the original of the stored and piled moving image data and to verify part of the original for a cut off the still image data file.

The network 206 may correspond to every type of communication network such as the Internet, an intranet, a wide area network, etc. The picture recording terminal 207 is a terminal which films and records streaming data to be made the original moving image data. A handheld video camera or industrial surveillance camera, e.g., is employed as the picture recording terminal 207. The picture recording terminal 207 can communicate with the upload terminal 202. Meanwhile, the picture recording terminal 207 may exchange data with the upload terminal 202 by means of a removable recording media that the terminals 207 and 202 can be equipped with, a USB (Universal Serial Bus) memory or an exclusive-use cable according to IEEE 1394, etc.

Figure 3:
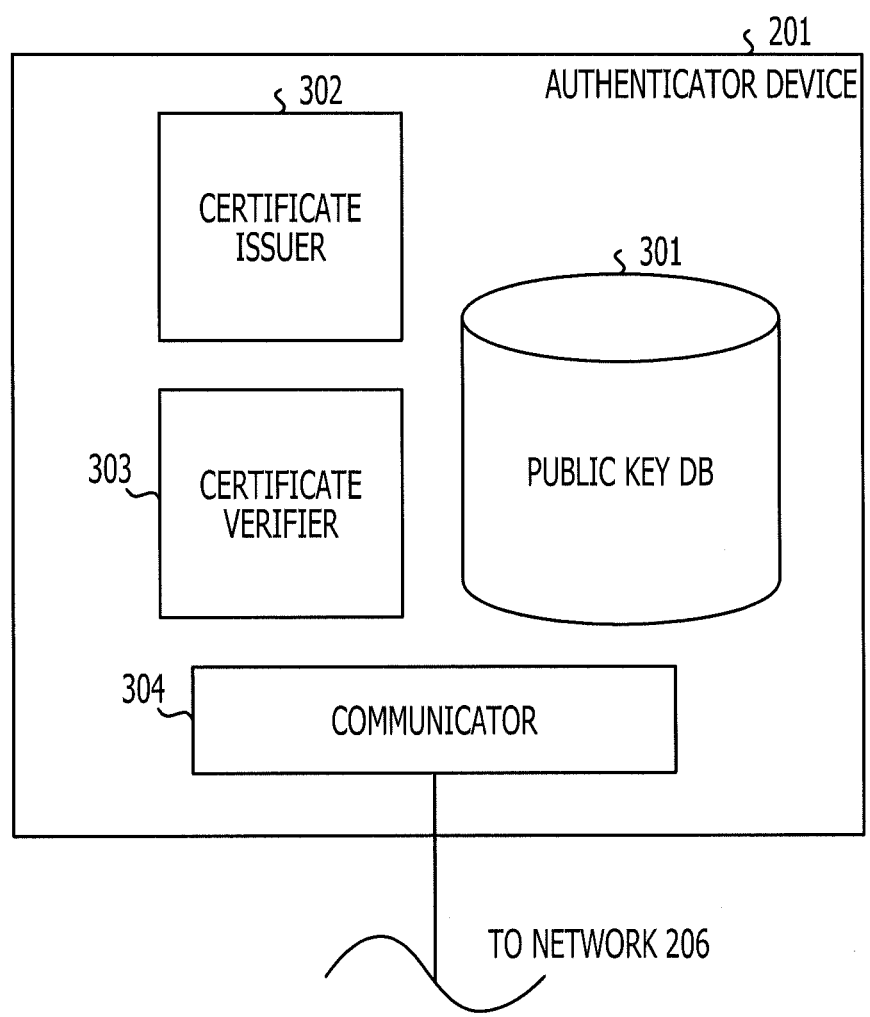
FIG. 3 is a block diagram which depicts an exemplary function of an authenticator device.

FIG. 3 is a block diagram which depicts an exemplary function of the authenticator device 201. The authenticator device 201 includes a public key DB (DataBase) 301, a certificate issuer 302, a certificate verifier 303 and a communicator 304. A public key of the signature device 205 is piled on the public key DB 301. The certificate issuer 302 issues a certificate of a public key as requested. The certificate verifier 303 verifies a certificate of a public key. The communicator 304 is connected to the network 206 and performs communication trough the network 206.

(Hardware Constitution of Signature Device 205)

Figure 4:
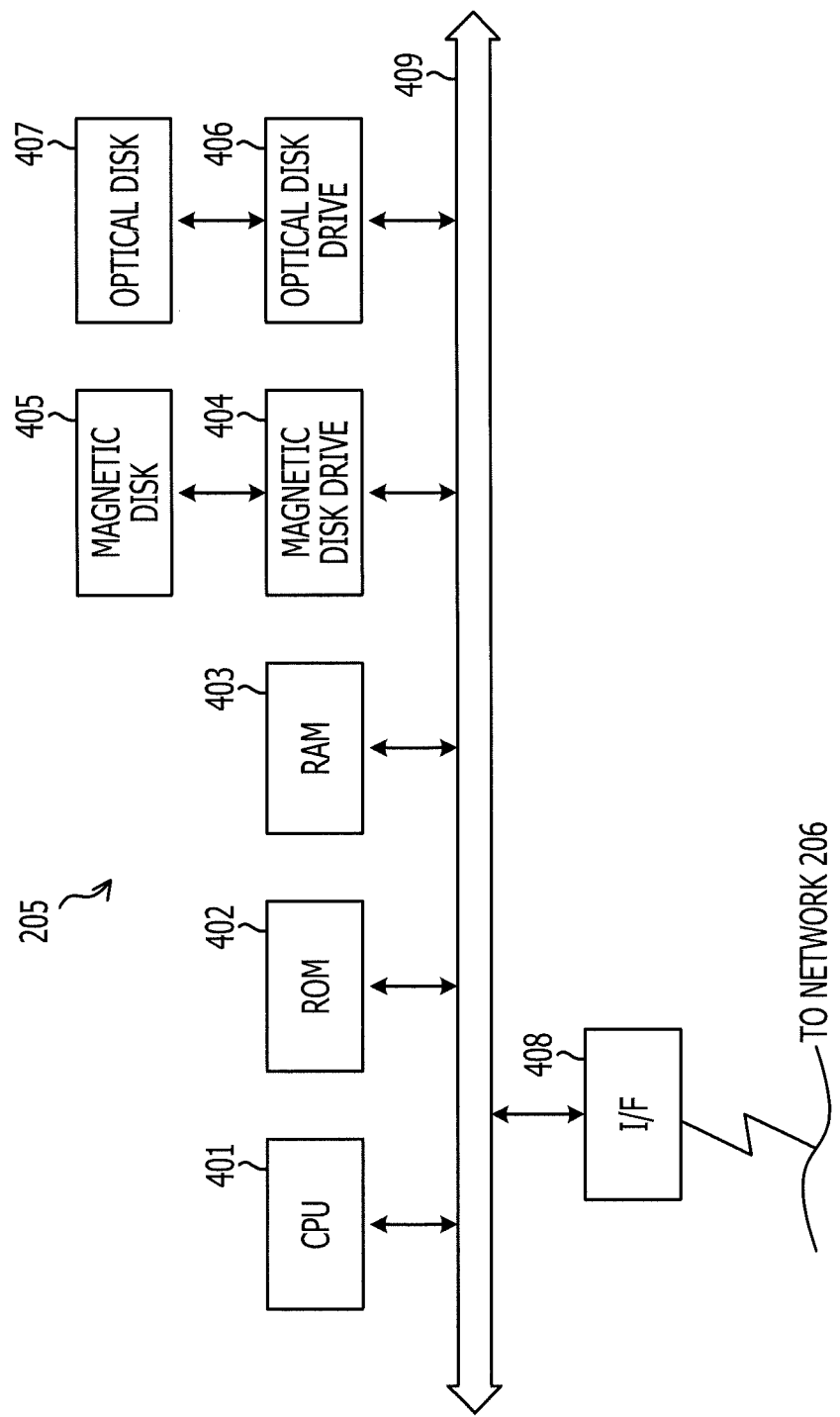
FIG. 4 is a block diagram which depicts an exemplary hardware constitution of the signature device.

FIG. 4 is a block diagram which depicts an exemplary hardware constitution of the signature device 205. The signature device 205 includes a CPU (Central Processing Unit) 401, a ROM (Read-Only Memory) 402 and a RAM (Random Access Memory) 403 as depicted in FIG. 4. The signature device 205 further includes a magnetic disk drive 404, a magnetic disk 405, an optical disk drive 406 and an optical disk 407 as storage devices. The signature device 205 further includes an I/F (Interface) 408. The respective portions are connected with one another through a bus 409.

The CPU 401 mentioned here controls the entire signature device 205. The ROM 402 stores therein programs including a boot program. The RAM 403 is used as a work area for the CPU 401. The magnetic disk drive 404 controls operations to read and write data from and to the magnetic disk 405 as controlled by the CPU 401. The magnetic disk 405 stores therein written data as controlled by the magnetic disk drive 404.

The optical disk drive 406 controls operations to read and write data from and to the optical disk 407 as controlled by the CPU 401. The optical disk 407 stores therein written data as controlled by the optical disk drive 406, or lets a computer read data stored in the optical disk 407.

The I/F 408 is connected to the network such as a LAN (Local Area Network), a WAN (Wide Area Network) or the Internet through a communication line, and is connected to another device through the network 206. Then, the I/F 408 controls the interface between the network 206 and the inside of the signature device 205, and controls data input and data output from and to an external device. A modem or LAN adaptor, e.g., may be employed as the I/F 408.

Incidentally, the signature device 205 may include hardware components used as user interfaces such as a display monitor, a keyboard or a mouse if operated directly by a user.

Figure 5:
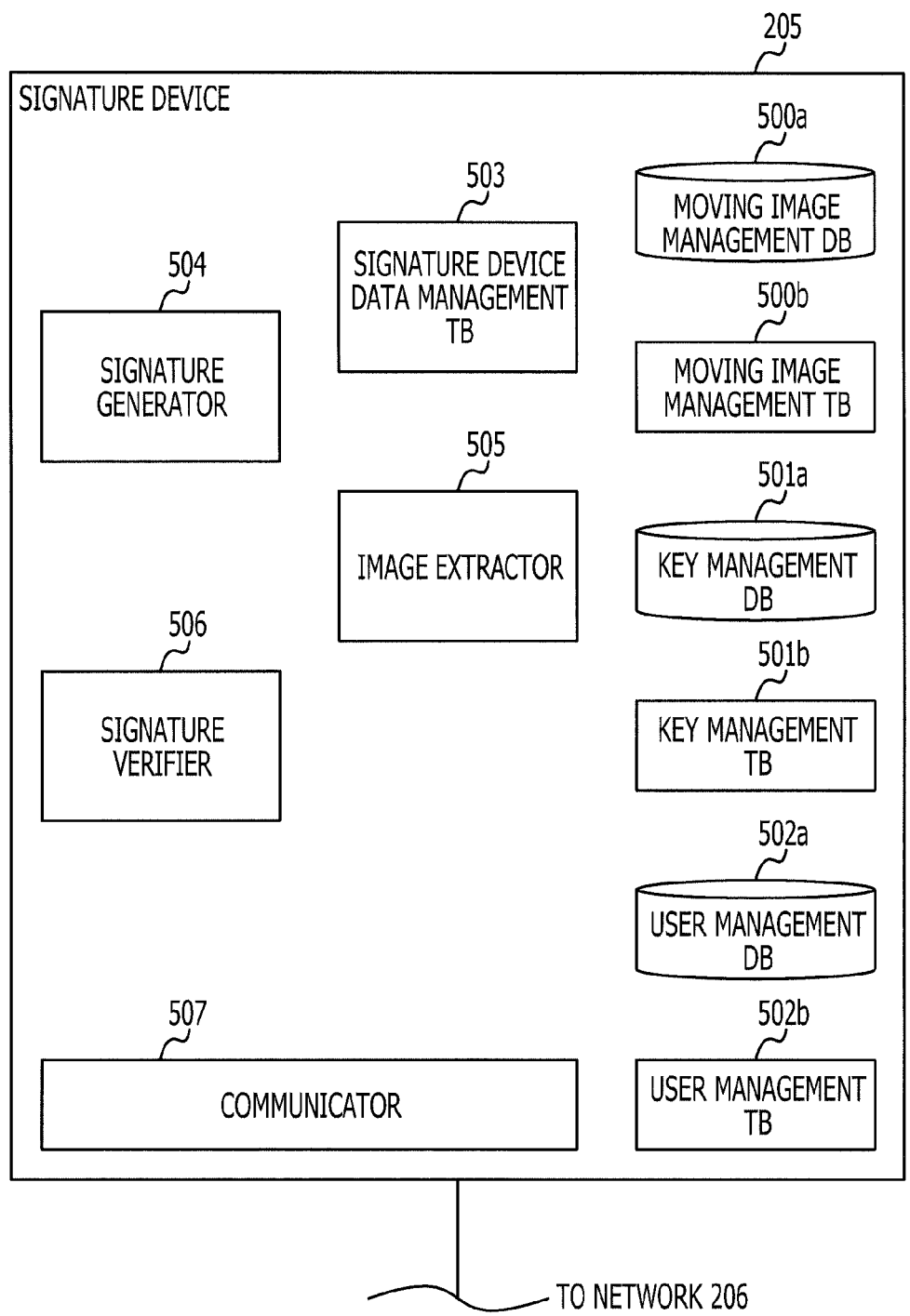
FIG. 5 is a block diagram which depicts an exemplary function of the signature device.

FIG. 5 is a block diagram which depicts an exemplary function of the signature device 205. The signature device 205 can access a moving image management DB 500a, a moving image management TB 500b, a key management DB 501a, a key management TB 501b, a user management DB 502a, a user management TB 502b and a signature device data management TB 503. Further, the signature device 205 includes a signature generator 504, an image extractor 505, a signature verifier 506 and a communicator 507. The databases and tables, i.e., the moving image management DB 500a through the signature device data management TB 503 are each stored in the storage devices such as the ROM 402, the RAM 403, the magnetic disk 405, the optical disk 407, etc. Further, the functional portions, i.e., the signature generator 504 through the communicator 507 each implement their function by means of the CPU 401 running programs stored in the storage devices.

The moving image management DB 500a is a database in which data received from the upload terminal 202 and data sent to the playback/extraction terminal 203 are stored. The moving image management TB 500b is a table for managing data to control access to the moving image management DB 500a.

The key management DB 501a is a database in which a certificate of a public key issued by the authenticator device 201, a secret key for signature corresponding to the certificate of the public key, and an encryption key for encrypting two kinds of metadata that the embodiment is related to which are original metadata and cut off metadata are stored. The key management TB 501b is a table for managing data to control access to the key management DB 501a. Incidentally, the metadata and cut off metadata will be explained with reference to FIG. 6.

The user management DB 502a is a database for managing user data to control user's access to the signature device 205. The user management TB 502b is a table for managing data to control access to the user management DB 502a. The signature device data management TB 503 is a table in which peculiar data to uniquely identify the signature device 205 is stored.

The signature generator 504 has a function to put signature data to moving image data. The image extractor 505 has a function to extract an image on a location to be extracted specified in the original moving image data as a cut off still image data file as instructed by the playback/extraction terminal 203. The signature verifier 506 receives the cut off still image data file from the verification terminal 204 and verifies part of the original. The communicator 507 performs communication through the network 206.

(Functions of the Signature Generator 504, the Image Extractor 505 and the Signature Verifier 506)

Figure 6:
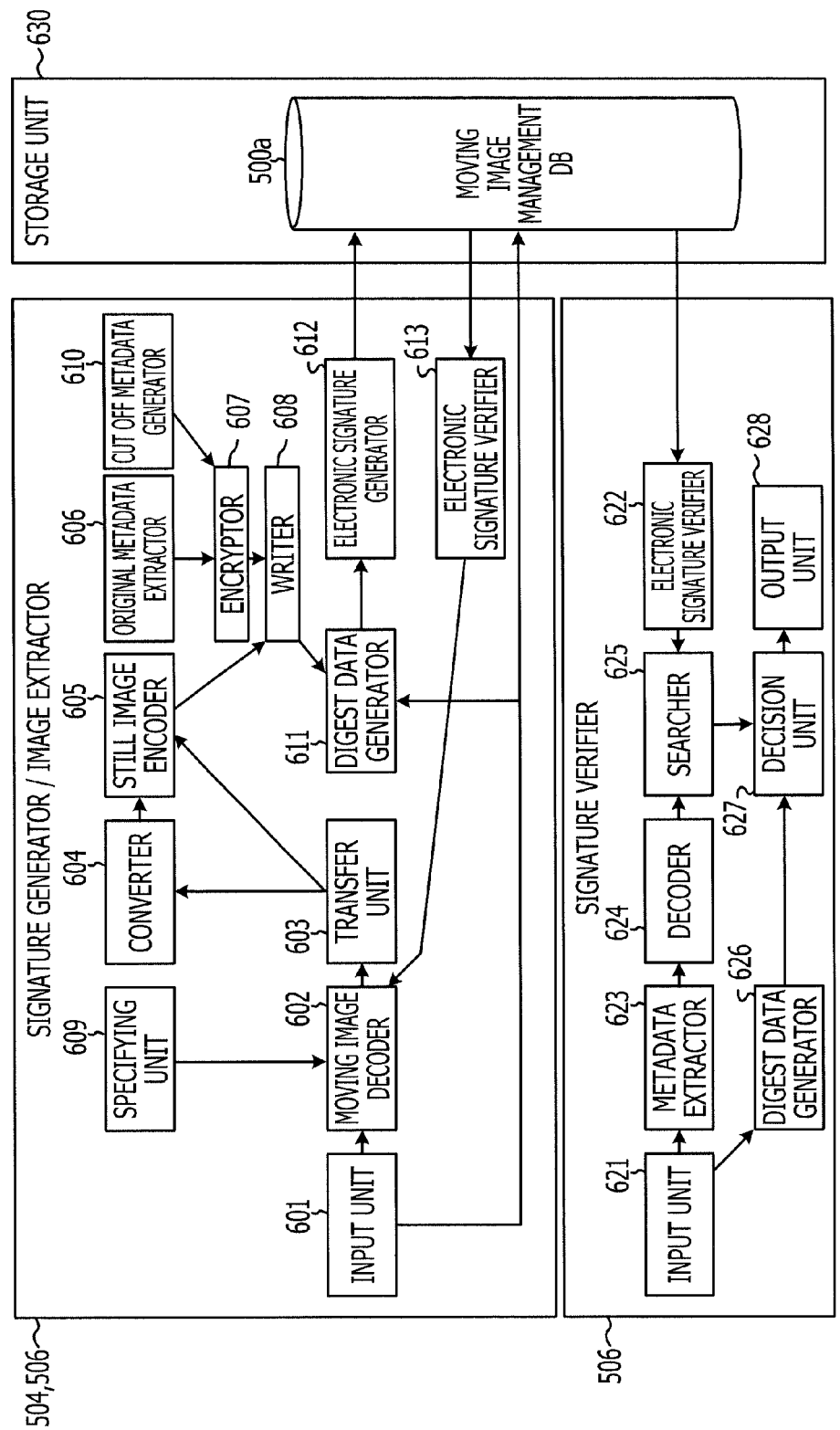
FIG. 6 is a block diagram which depicts exemplary functions of a signature generator, an image extractor and a signature verifier.

Then, exemplary functions of the signature generator 504, the image extractor 505 and the signature verifier 506 will be explained. FIG. 6 is a block diagram which depicts exemplary functions of the signature generator 504, the image extractor 505 and the signature verifier 506. Incidentally, the signature generator 504 and the image extractor 505 having some of the functions in common will be explained together.

Further, the signature generator 504 includes an input unit 601, a moving image decoder 602, a transfer unit 603, a converter 604 and a still image encoder 605. The signature generator 504 further includes an original metadata extractor 606, an encryptor 607, a writer 608, a digest data generator 611 and an electronic signature generator 612.

The signature extractor 505 includes a specifying unit 609, a moving image decoder 602, a transfer unit 603, a converter 604 and a still image encoder 605. The signature extractor 505 further includes an original metadata extractor 606, an encryptor 607, a cut off metadata generator 610, a digest data generator 611, an electronic signature generator 612 and an electronic signature verifier 613.

Further, the signature verifier 506 includes an input unit 621, an electronic signature verifier 622, a metadata extractor 623, a decoder 624, a searcher 625, a digest data generator 626, a decision unit 627 and an output unit 628. Further, the signature generator 504, the image extractor 505 and the signature verifier 506 can each access a storage unit 630.

This function to be a controller is specifically implemented, e.g., by the CPU 401 running the programs stored in the ROM 402, the RAM 403, the magnetic disk 405, the optical disk 407 and so on depicted in FIG. 4. Meanwhile, the function may be implemented by another CPU running the programs via the I/F 408. The function to be the controller is implemented by the input unit 601 through the output unit 628.

The input unit 601 has a function to input data. The input unit 601 inputs, e.g., original moving image data. Incidentally, inputted data is stored in storage areas such as the RAM 403, the magnetic disk 405, the optical disk 407, etc.

The moving image decoder 602 has a function to analyze and obtain moving image data for every one of plural images in the moving image data. Types of the image data includes a predictive frame which will not be played back independently and a moving image frame which can be played back independently. The moving image decoder 602 analyzes and obtains picture data for every frame, e.g., by means of an MPEG decoder according to an MPEG format. Incidentally, a predictive frame is a P- or B-picture according to MPEG, and a moving image frame which can be independently played back is called an I-picture. The moving image data complies with various moving image formats including MPEG-1, MPEG-2, H264/AVC, etc. Incidentally, the decoded frames are each stored in a storage area in the RAM 403, the magnetic disk 405, the optical disk 407, etc.

The transfer unit 603 has functions to transfer a predictive frame having been inputted to the converter 604 and to transfer a first or second one of moving image frames having been inputted to the still image encoder 605. There are two types of the moving image frames which are a first moving image frame having been present in the moving image data from the beginning and a second moving image frame that a predictive frame is converted into and is enabled to be played back by the converter 604. If the moving image data is in an MPEG format, e.g., the transfer unit 603 transfers a moving image frame enabled to be independently played back that P- and B-pictures which are predictive frames are converted into by the converter 604 to the still image encoder 605. Incidentally, the transferred data is stored in the storage area in the RAM 403, the magnetic disk 405, the optical disk 407, etc.

The converter 604 has a function to convert a predictive frame which will not be independently played back into a second moving image frame which can be independently played back on the basis of a first moving image frame which can be independently played back. The converter 604 specifically converts, e.g., a P- and B-pictures which are predictive frames into a moving image frame which can be played back on the basis of an I-picture which can be independently played back. Further, the converter 604 converts a P-picture on the basis of a preceding I- or P-picture. Further, the converter 604 converts a B-picture on the basis of preceding and succeeding I- or P-pictures. Incidentally, the converted frame is stored in the storage area in the RAM 403, the magnetic disk 405, the optical disk 407, etc.

The still image encoder 605 has a function to encode a first or second moving image frame into still image data according to an image format. The still image encoder 605 encodes, e.g., a moving image frame that P- and B-pictures have been converted into according to an MPEG format and a frame which is an I-picture into still image data according to the image format. The image format except for a JPEG format is a JPEG 2000 format, a PNG (Portable Network Graphic) format, etc. Incidentally, the encoded still image data is stored in the storage area in the RAM 403, the magnetic disk 405, the optical disk 407, etc.

The original metadata extractor 606 has a function to extract the original metadata including location data of image data and identification data of moving image data from the moving image data for each of the plural images. Incidentally, the original metadata is metadata for the original moving image data to be the original. The original metadata may include, e.g., generation time of the original moving image data, an ID of the signature device 205 that the original moving image data is registered in and so on in addition to location data of the image data and the identification data of the moving image data.

The original metadata extractor 606 extracts, e.g., original metadata, i.e., an original metadata ID "NA419" and location data "1" from the original moving image data for the first image in the original moving image data. Then, the original metadata extractor 606 extracts original metadata, i.e., the original metadata ID "NA419" and location data "2" from the original moving image data for the second image in the original moving image data. The original metadata extractor 606 extracts original metadata for all the images in the original moving image data in this way. Incidentally, the extracted original metadata is stored in the storage area in the RAM 403, the magnetic disk 405, the optical disk 407, etc.

The encryptor 607 has a function to encrypt at least part of the original metadata. The encryptor 607 encrypts, e.g., location data of the image data and identification data of the moving image data in the original metadata. Further, the encryptor 607 may encrypt at least part of the cut off metadata. Incidentally, the encrypted original metadata or cut off metadata is stored in the storage area in the RAM 403, the magnetic disk 405, the optical disk 407, etc.

The writer 608 writes still image data for every image into a first area in an area that a still image data file into which image data is encoded according to the image format is stored in. Further, the writer 608 has a function to write original metadata extracted by the original metadata extractor 606 into a second area.

Incidentally, the first area is an area in which a bit pattern of encoded image data such as a DQT (Define Quantization Table) marker, a DHT (Define Huffman Table) marker, an SOF (Start of Frame) marker or an SOS (Start of Scan) marker, etc. is filed if the image is in a JPEG format. The second area is an area which can be used for various purposes including APP0-APP15 markers, differently from the first area. Incidentally, the second area may be a tEXt chunk in which text data can be embedded in case of another image format, e.g., PNG.

Further, one of the APP0-APP15 markers may have been used by another application program in some cases. If that is the case, the writer 608 makes an unused one of the APP0-APP15 markers the second area and writes the original metadata into the second area. The writer 608, e.g., files the image data and the original metadata into the first area and the second area, respectively, in order to encode the moving image frame by means of the still image encoder 605.

Further, the writer 608 may write cut off metadata generated by the cut off metadata generator 610 into a third area in a still image data file in which still image data corresponding to location data specified by the specifying unit 609 is filed. The still image data file in which still image data corresponding to the location data specified by the specifying unit 609 is filed is a cut off still image data file. Incidentally, the third area is an area in the APP0-APP15 markers except where the original metadata is filed, e.g., in case of a JPEG format.

Further, the writer 608 may write summary data of a combination of the cut off still image data file and property data of its own into a fourth area in the cut off still image data file. The fourth area is an area in the APP0-APP15 markers except where the original metadata or the cut off metadata is filed, e.g., in case of a JPEG format. Further, if the cut off metadata is filed in the APP2 marker, an area indicated by the APP2 marker may include both the third area in which the cut off metadata is filed and the fourth area. Incidentally, the cut off still image data file that the summary data has been written into is stored in the storage area in the RAM 403, the magnetic disk 405, the optical disk 407, etc.

The specifying unit 609 has a function to specify location data of image data on the basis of location data of one of plural images specified by a user to whom identification data is set. The specifying unit 609 specifies, e.g., a frame number: 12355 which is location data of image data extracted by an extractor whom the signature device 205 logged in. Incidentally, the specified location data is stored in the storage area in the RAM 403, the magnetic disk 405, the optical disk 407, etc.

The cut off metadata generator 610 has a function to generate cut off metadata including time when the specifying unit 609 specified the location data and identification data of a user who specified the location data by means of the specifying unit 609. The cut off metadata is metadata related to a cut off operation having been done. The cut off metadata generator 610 generates cut off metadata including, e.g., specified time "15A3:32 (HH:MM:SS), Aug. 13, 2010" and an ID of the extractor, "Suzuki Minoru: S15256". Incidentally, the generated cut off metadata is stored in the storage area in the RAM 403, the magnetic disk 405, the optical disk 407, etc.

The digest data generator 611 generates summary data for a still image data file of every image after the writing operation done by the writer 608. The digest data generator 611 generates, e.g., digest data for a still image data file encoded according to a JPEG format that the original metadata is filed in.

Further, the digest data generator 611 may generate summary data of a combination of a cut off still image data file and property data of its own. Incidentally, the digest data generator 611 may employ an ID of the signature device 205 or of a network card of the signature device for its own property data.

Further, how to combine the cut off still image data file with the property data of the signature device 205 may be such that, e.g., a bit pattern of the property data of the signature device 205 may be coupled either before or after a bit pattern of the cut off still image data file. The digest data generator 611 may calculate an exclusive logical sum of the bit pattern of the cut off still image data file and the bit pattern of the property data of the signature device 205 in order to combine them in a different way.

Further, the digest data generator 611 may generate new summary data for a combination of original metadata of a cut off still image data file, cut off metadata and property data of the signature device 205. How to combine the original metadata of a cut off still image data file, the cut off metadata and the property data of the signature device 205 may be such that, e.g., bit patterns of the original metadata, the cut off metadata and the property data of the signature device 205 in the above order or in different order. Incidentally, the generated digest data is stored in the storage area in the RAM 403, the magnetic disk 405, the optical disk 407, etc.

The electronic signature generator 612 generates an electronic signature for digest data generated by the digest data generator 611 and made an object to be signed. The object to be signed may include digest data of entire moving image data apart from digest data of a still image data file. The electronic signature generator 612 generates an electronic signature, e.g., by encrypting a collection of digest data having n frames with a secret key. Incidentally, the generated electronic signature is stored in the storage unit 630.

The electronic signature verifiers 613 and 622 each have a function to verify authenticity of an electronic signature. If the electronic signature verifier 613 decodes an electronic signature stored in the storage unit 630 with a public key and a result of decoding agrees with summary data of an object to be electronically signed, specifically e.g., the electronic signature verifier 613 outputs a conclusion that the electronic signature is guaranteed to be authentic. Incidentally, the result of the verification is stored in the storage area in the RAM 403, the magnetic disk 405, the optical disk 407, etc.

The input unit 621 has a function to input a still image data file to be verified. The input unit 621 inputs a still image data file according to, e.g., a JPEG format, etc. Incidentally, the inputted still image data file is stored in the storage area in the RAM 403, the magnetic disk 405, the optical disk 407, etc.

The metadata extractor 623 has a function to extract data filed in the second area in the still image data file to be verified inputted by the input unit 621. The metadata extractor 623 detects markers in the still image data file to be verified if the still image data file to be verified is, e.g., in a JPEG format. Upon detecting a marker that the original metadata or cut off metadata is filed on, the metadata extractor 623 extracts data filed in an area specified by the relevant marker. Incidentally, the extracted data is stored in the storage area in the RAM 403, the magnetic disk 405, the optical disk 407, etc. Instead, a pointer indicating where the data is extracted and data indicating an area length may be stored in the storage area.

The decoder 624 has a function to decode encrypted data of the original metadata. Further, the decoder 624 decodes encrypted data in the cut off metadata. Incidentally, the decoded data is stored in the storage area in the RAM 403, the magnetic disk 405, the optical disk 407, etc.

The searcher 625 has a function to search a summary data group stored in the storage unit 630 for summary data for which a combination of identification data of moving image data and location data of image data corresponds to data extracted by an extractor. Suppose, e.g., that there are two blocks of original moving image data stored in the storage unit 630 and their IDs are "DA104" and "NA419" each. Further, suppose that a summary data group of frame numbers 1 through 40000 of original moving image data having the identification data "DA104" is stored in the storage unit 630, and so is a summary data group of frame numbers 1 through 30000 of original moving image data having the identification data "NA419". Further, suppose that data extracted by the metadata extractor 623 is of "NA419" and "12355".

At this time, the searcher 625 searches the summary data group stored in the storage unit 630 for a summary data of a frame number 12355 of the original moving image data having the identification data "NA419" which corresponds to "NA419" and "12355". Incidentally, a result of the search is stored in the storage area in the RAM 403, the magnetic disk 405, the optical disk 407, etc.

The digest data generator 626 has a function to generate summary data for the still image data file to be verified inputted by the input unit 621. Incidentally, the generated digest data is stored in the storage area in the RAM 403, the magnetic disk 405, the optical disk 407, etc.

The decision unit 627 has a function to decide whether the summary data searched for by the searcher agrees with the summary data generated by the digest data generator 626. Incidentally, a result of the decision is stored in the storage area in the RAM 403, the magnetic disk 405, the optical disk 407, etc.

The output unit 628 outputs the result of the decision made by the decision unit 627, e.g., to a device from which the still image data file was inputted by the input unit 621.

The storage unit 630 stores therein moving image data. Further, the storage unit 630 stores therein summary data of each of still image data files each including a first area and a second area. Still image data encoded from image data is filed in the first area. Location data in moving image data and identification data of the moving image data are stored in the second area. Incidentally, the storage unit 630 stores therein summary data of each the still image data files in connection with location data of each of images in the moving image data.

The storage unit 630 specifically stores therein the original moving image data having the ID "NA419". Further, the storage unit 630 stores therein digest data H1 and H2 through Hn for still image data a still image data that image data of the frame number 1 in the original moving data is encoded into and a still image data file including "NA419" and the frame number 1. Further, the digest data H1 and H2 through Hn is stored in connection with location data of each of the images in the moving image data. The digest data H1 and H2 through Hn may be specifically stored in the above order in the storage unit 630. A pointer group indicating the digest data H1 and H2 through Hn may be stored in order of location data of each of the images in the moving image data, instead. Incidentally, the moving image data and the summary data are stored in the moving image management DB 500a.

Figure 7:
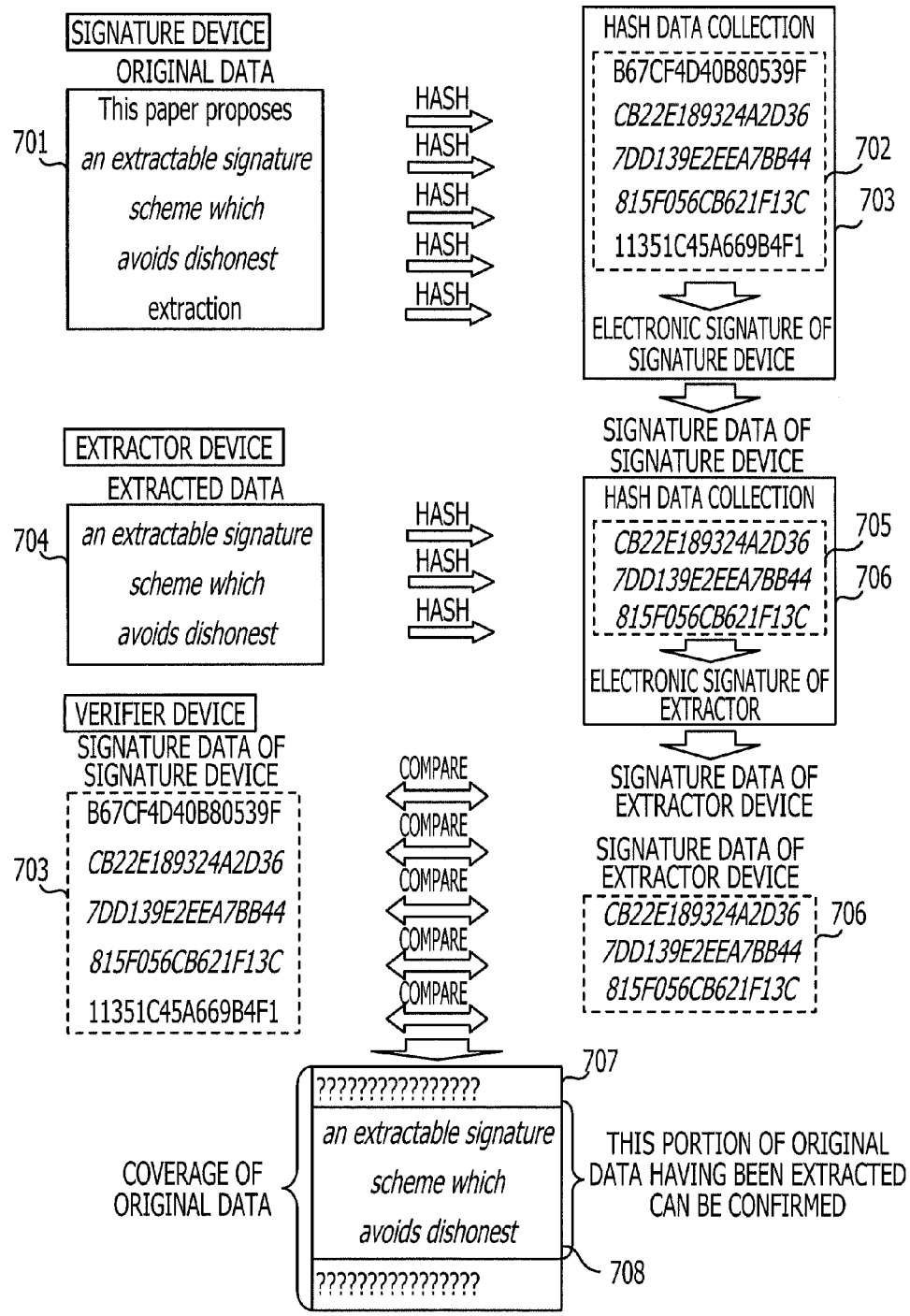
FIG. 7 is an explanatory diagram which depicts an exemplary operation according to a signature algorithm.

FIG. 7 is an explanatory diagram which depicts an exemplary operation according to a signature algorithm. The signature device divides original data 701 into partial data blocks, calculates a hash collection of each of the partial data blocks and generates a hash data collection 702. Then, the generated hash data collection 702 is made an object to be electronically signed. The signature device electronically signs the object to be signed. The signature device combines the hash data collection 702 with the electronic signature to form signature data 703 of the signature device.

The extractor device extracts partial data from the data that the signature device has put the signature data to so as to generate extracted data 704. Then, the extractor device works similarly as the signature device so as to generate a hash data collection 705. The extractor device makes the hash data collection 705 an object to be signed, electronically signs the object to be signed and combines the hash data collection 705 with the electronic signature to form signature data 706 of the extractor device.

The verifier device verifies integrity of the hash data collection 702 by means of the electronic signature of the signature device in the signature data 703 of the signature device. The verifier device similarly verifies integrity of the hash data collection 705 by means of the electronic signature of the extractor device in the signature data 706 of the extractor device. Then, the verifier device generates a hash data collection from disclosed partial data and verifies whether the generated hash data collection agrees with the hash data collection 705. The verifier device finally compares the hash data collections of the signature device and the extractor device with each other so that it is known that a range 708 of the hash data of the extractor device has been extracted from a range 707 of the original data. If hash data of the extracted data 704 does not include hash data of the original data 701, it is known that the partial data has been altered.

Figure 8:
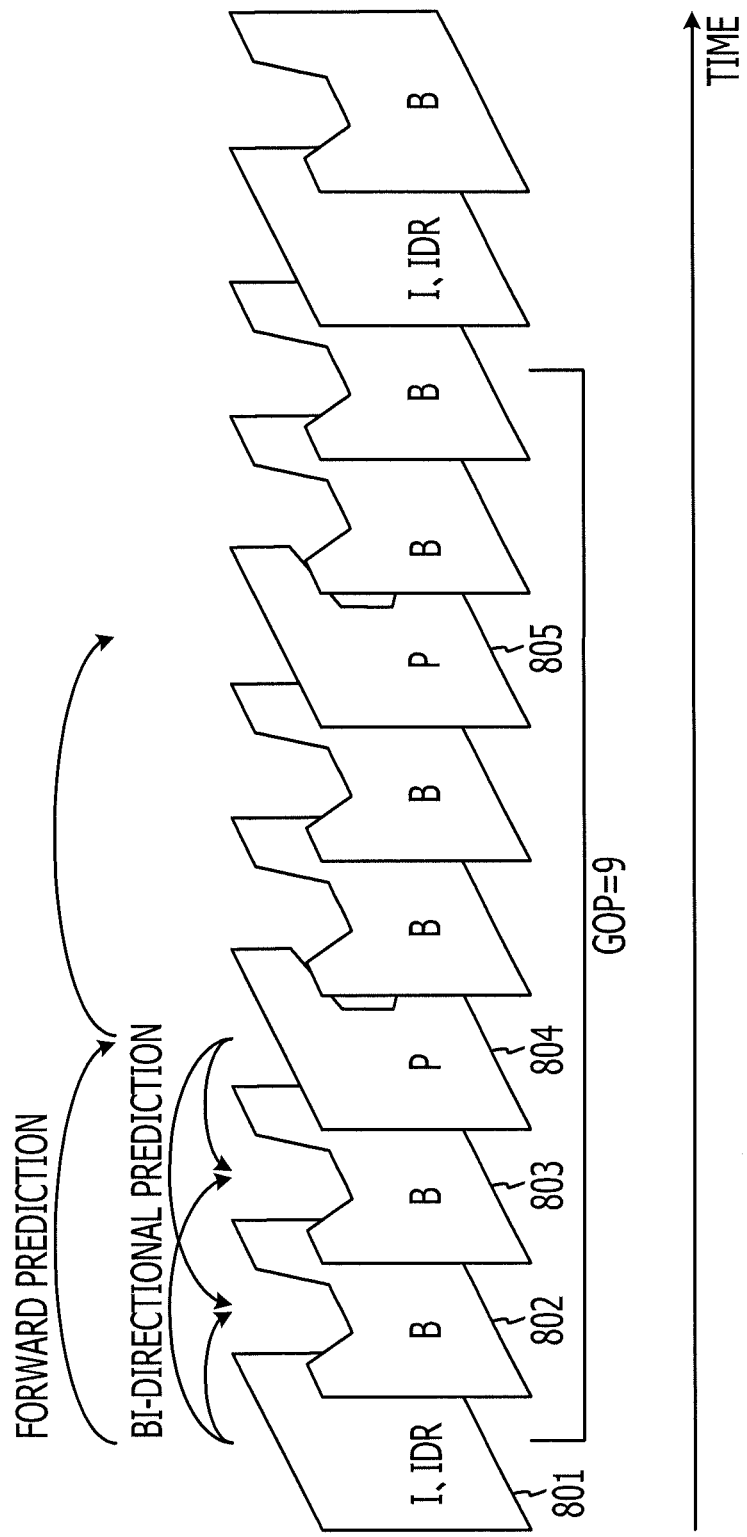
FIG. 8 is an explanatory diagram which depicts exemplary image types of compressed moving image data and their arrangement.

FIG. 8 is an explanatory diagram which depicts exemplary image types of compressed moving image data and their arrangement. A frame including compressed moving image data can be roughly classified into a moving image frame which can be independently played back and a predictive frame having differential data with respect to the moving image frame. The predictive frame will not be independently played back.

According to the MPEG standard, a moving frame which can be independently played back is called an I-picture, and a predictive frame is called a P- or B-picture. The I-picture keeps compressed image data corresponding to one frame. Further, the I-picture includes an IDR (Instantaneous Decoder Refresh) picture added anew according to the H.264/AVC standard. The I- and IDR pictures will be explained simply as an I-picture hereafter. Features of the respective pictures will be described later. The I-picture is a frame 801 in FIG. 8. The P-pictures are frames 804 and 805. The B-pictures are frames 802 and 803.

The P- and B-pictures are each called an inter-frame predictive image, as well. The P-picture incorporates predictive error data, i.e., a difference with respect to a most lately decoded I- or P-picture which is made a reference image. The frame 804, e.g., is converted into a frame which can be independently played back with reference to an image in the frame 801 which is an I-picture. The frame 805 is converted into a frame which can be independently played back by the moving image decoder 602 with reference to an image in the frame 804 which is a P-picture.

The converter 604 carries out a forward prediction by referring to a past frame in order to convert a P-picture in this way. The frame which is referred to is a latest I- or P-picture, and an earlier frame may be a reference frame according to H.264/AVC.

The B-picture incorporates predictive error data, i.e., differences with respect to most lately decoded past and future I- or P-pictures which are made reference images. The frame 802, e.g., is converted into a frame which can be independently played back with reference to images in the frame 801 and 804 which are I- and P-pictures, respectively, and so is the frame 803.

The converter 604 carries out a bi-directional prediction by referring to past and future frames in order to convert a B-picture in this way. The frame which is referred to is a latest I- or P-picture for a B-picture similarly for a P-picture, and a frame one or more frames earlier or later may be a reference frame according to H.264/AVC.

Calculate differences between a P- or B-picture and frames located in front and back in this way so as to reduce redundancy in a direction of time and to achieve a high data compression rate. Further, gather several images as depicted in FIG. 8 to form data such that a plurality of smallest units of moving image data called GOP (Group Of Pictures) is collected for compressed moving image data. Let GOP=9, e.g., in FIG. 8. The GOP is a structure forming a unit which can be independently played back so that moving image data can be played back or edited from halfway.

Further, a function of an IDR picture will be explained. According to H.264/AVC, as described earlier, a frame is referred to from a P- or B-picture beyond a latest I- or P-picture. It is thus unknown whether a playback starts from an I-picture. An IDR picture alleviates this problem. Upon receiving an IDR picture, the moving image decoder 602 clears a buffer that a reference frame is filed in, so as to guarantee that the playback starts from the IDR picture. As the reference is cleared, no frame can be referred to from the P- or B-picture beyond the IDR picture.

Figure 9:
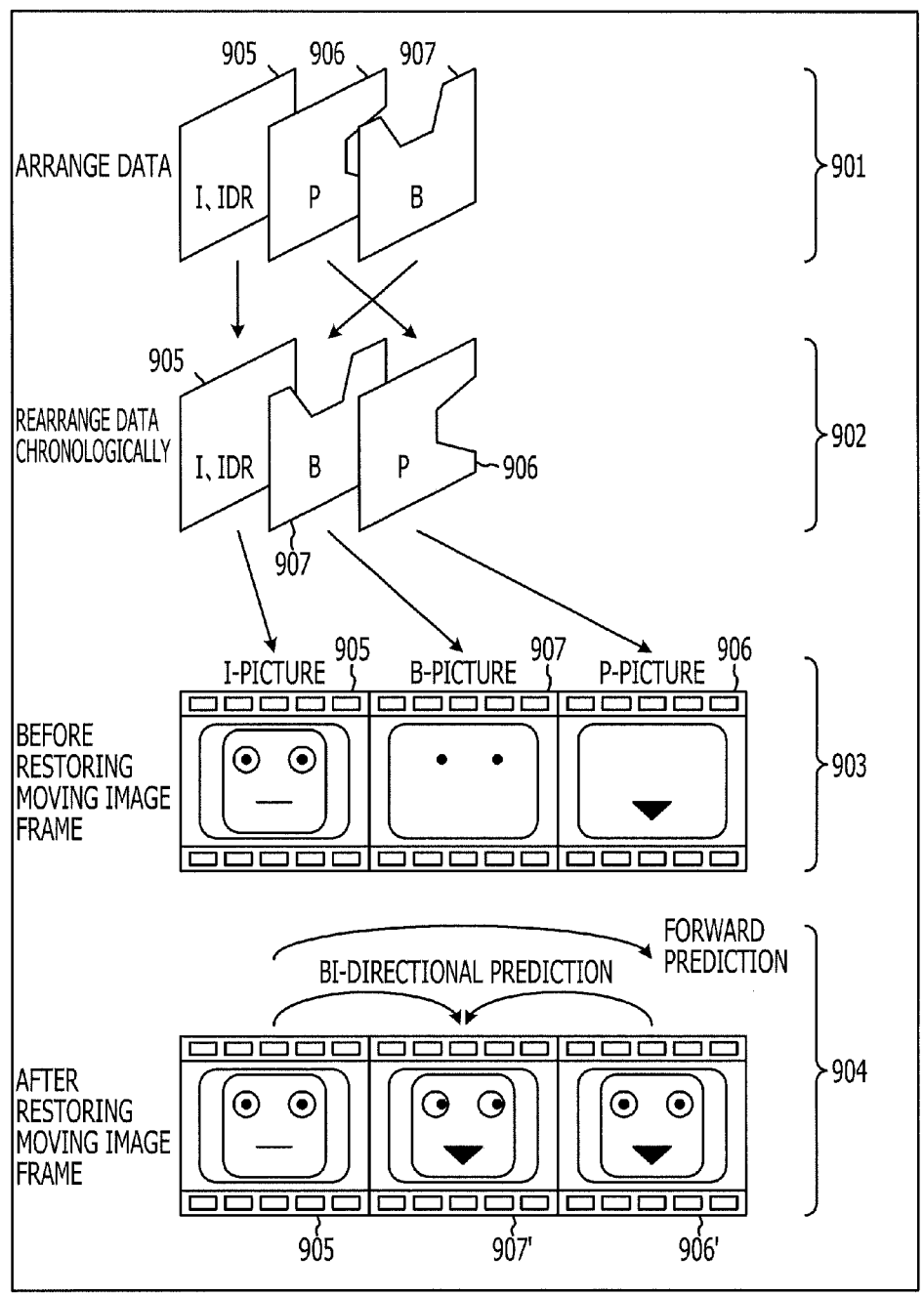
FIG. 9 illustrates an exemplary case in which P- and B-pictures of compressed moving image data are converted into independent images.

FIG. 9 is an explanatory diagram which depicts an exemplary case in which P- and B-pictures of compressed moving image data are converted into independent images. To begin with, suppose that data is filed in order of frames to be referred to in the moving image data as explanatorily indicated with a reference numeral 901. The compressed moving image data is analyzed by the moving image decoder 602 for every frame, i.e., for each of frames 905, 906 and 907. A specific analytical example is given such that data in an MPEG format which has been entropy-encoded according to DCT (Discrete Cosine Transform) is decoded according to inverse DCT and analyzed for every frame.

As exemplarily depicted in FIG. 9, the frames 905, 906 and 907 are I-, P- and B-pictures, respectively. Then, the frames 905-907 are arranged in order of the frames 905, 907 and 906 by the moving image decoder 602 so as to be in a chronological order as indicated with a reference numeral 902.

Then, a process for converting the P- and B-pictures into independent images will be described. An explanatory diagram indicted with a reference numeral 903 depicts condition before a moving image frame is restored. The frame 905 which is an I-picture holds the entire image data. The frames 906 and 907 which are P- and B-pictures, respectively, each hold predictive error data which is a difference of the image data. The converter 604 converts the frames 906 and 907 into frames 906' and 907', respectively, which can be played back after a moving image frame is restored as indicated with a reference numeral 904.

Specifically, the converter 604 additionally writes the frame 906 which is a difference on the frame 905 being a base so as to generate the frame 906'. Similarly, the converter 604 additionally writes the frame 907 which is a difference on the frames 905 and 906 being bases so as to generate the frame 907'.

Further, the P- and B-pictures each have data of motion compensation in addition to the predictive error data, and grasp to what extent the image has moved in a particular range with respect to the I- and P-pictures being references. Incidentally, the moving image frame is restored after the frames are rearranged to be obtained in chronological order for convenience of explanation in FIG. 9. Instead, the frames may be rearranged to be obtained in chronological order after the moving image frame is restored.

Then, a flow of data processing in the signature system of the embodiment will be explained by the use of an exemplary operation and an exemplary data structure. Further, what is supposed for the signature system 100 of the embodiment is defined before the flow of data processing is specifically explained. Terminals which access the signature system 100 of the embodiment are the upload terminal 202, the playback/extraction terminal 203 and the verification terminal 204. Three operators who operate the upload terminal 202, the playback/extraction terminal 203 and the verification terminal 204 are a producer, an extractor and a verifier, respectively.

The producer manages and operates the picture recorder terminal 207 so as to register original image data. Then, the producer operates the upload terminal 202 so as to register the original image data in the signature device 205. Specifically, if recording start and recording stop buttons with which the picture recorder terminal 207 is equipped are pressed, the picture recorder terminal 207 accepts instructions to start and stop recording pictures, respectively. Further, the extractor operates the upload terminal 202 so as to perform communication with the signature device 205, and to issue instructions to register the original image data recorded by the picture recorder terminal 207.

Further, the playback/extraction terminal 203 cuts off part of original image data stored and piled in the signature device 205, and asks the signature device 205 to generate a cut off still image data file. Further, the verifier operates the verification terminal 204 so as to ask the signature device 205 to verify a disclosed cut off still image data file. Incidentally, suppose that the playback/extraction terminal 203 in the signature system 100 of the embodiment cuts off a data file of a single still image in the original moving image data.

Figure 10:
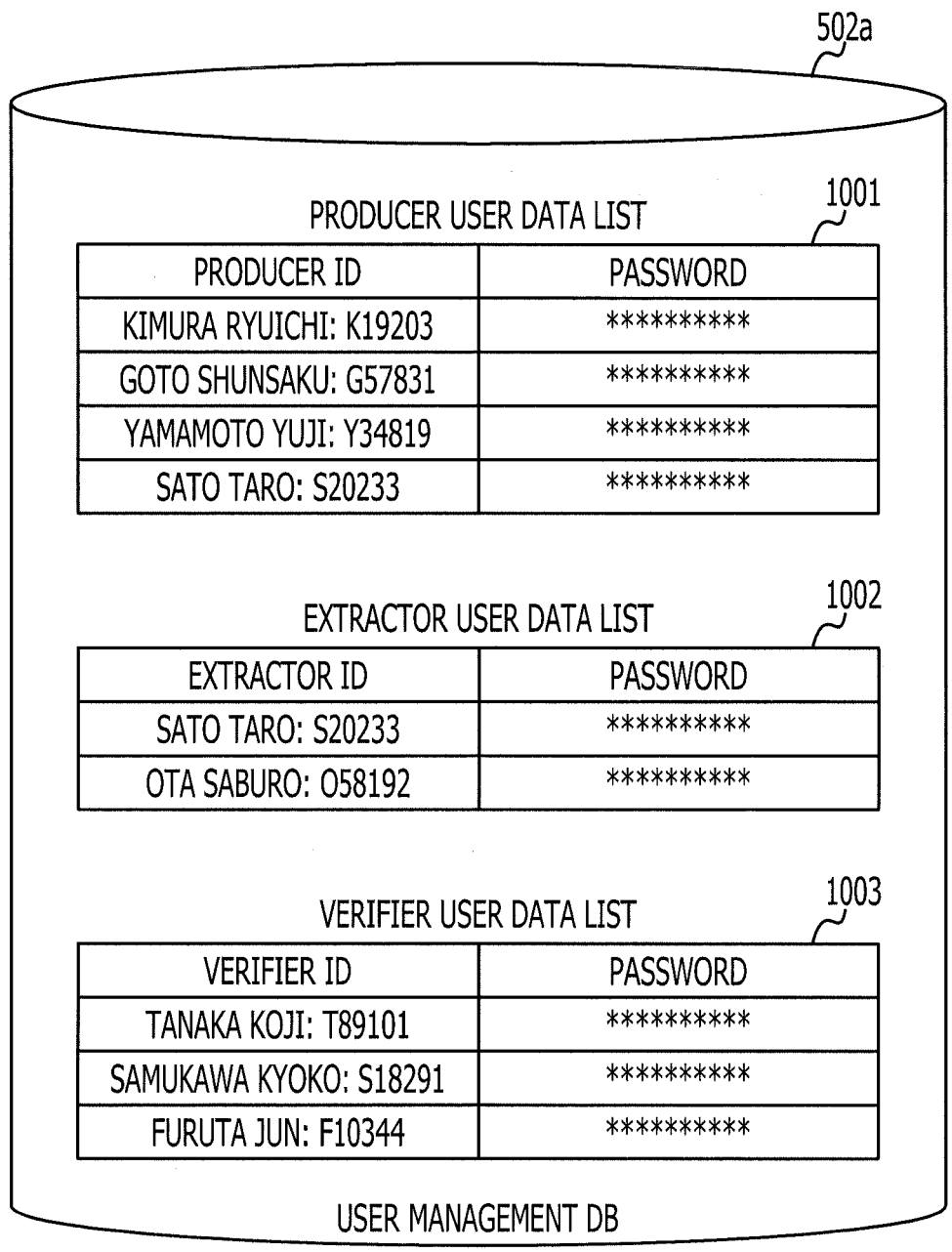
FIG. 10 is an explanatory diagram which exemplarily depicts what is stored in a user data list.

FIG. 10 is an explanatory diagram which exemplarily depicts what is stored in a user data list. FIG. 10 depicts a producer user data list 1001, an extractor user data list 1002 and a verifier user data list 1003 filed in the user management DB 502a.

The producer user data list 1001 includes two fields which are producer ID and password fields. Identification data for enabling the producer to be uniquely identified is filed in the producer ID field. A password for allowing the producer to log in the signature system 100 is filed in the password field. In FIG. 10, e.g., "Kimura Ryuuichi: K19203" is filed in the producer ID field, and an encrypted password is filed in the password field.

Similarly, the extractor user data list 1002 includes two fields which are extractor ID and password fields. Identification data for enabling the extractor to be uniquely identified is filed in the extractor ID field. A password for allowing the extractor to log in the signature system 100 is filed in the password field.

Further, the verifier user data list 1003 includes two fields which are verifier ID and password fields. Identification data for enabling the verifier to be uniquely identified is filed in the verifier ID field. A password for allowing the verifier to log in the signature system 100 is filed in the password field.

The signature system 100 uploads and registers the original moving image data recorded by the picture recorder terminal 207 into the signature device 205 as instructed by the producer having logged in, and guarantees content of the original moving image data by putting a signature by means of the signature device 205. Incidentally, as putting a signature while being unaware which part of the original moving image data is extracted, the signature system 100 extracts every one of the I-, P- and B-pictures. Further, the signature system 100 may extract only the I-picture carrying a piece of information which can be independently displayed.

Further, the signature system 100 partially extracts a data file of a single still image from the original moving image data that the signature device 205 has put a signature to as instructed by the extractor having logged in, and discloses the extracted file to the verification terminal 204 as a cut off still image data file.

Then, the signature system 100 verifies whether the disclosed cut off still image data file is guaranteed by the signature device 205 as instructed by the verifier having logged in. The signature system 100 verifies whether the disclosed cut off still image data file is part of the original moving image data that the signature device 205 has put a signature to, and verifies in addition whether the playback/extraction terminal 203 extracted the cut off still image data file after the extractor logged in. Incidentally, the signature device 205 traces the procedure of electronic signature described above in order to process the electronic signature.

Figure 11:
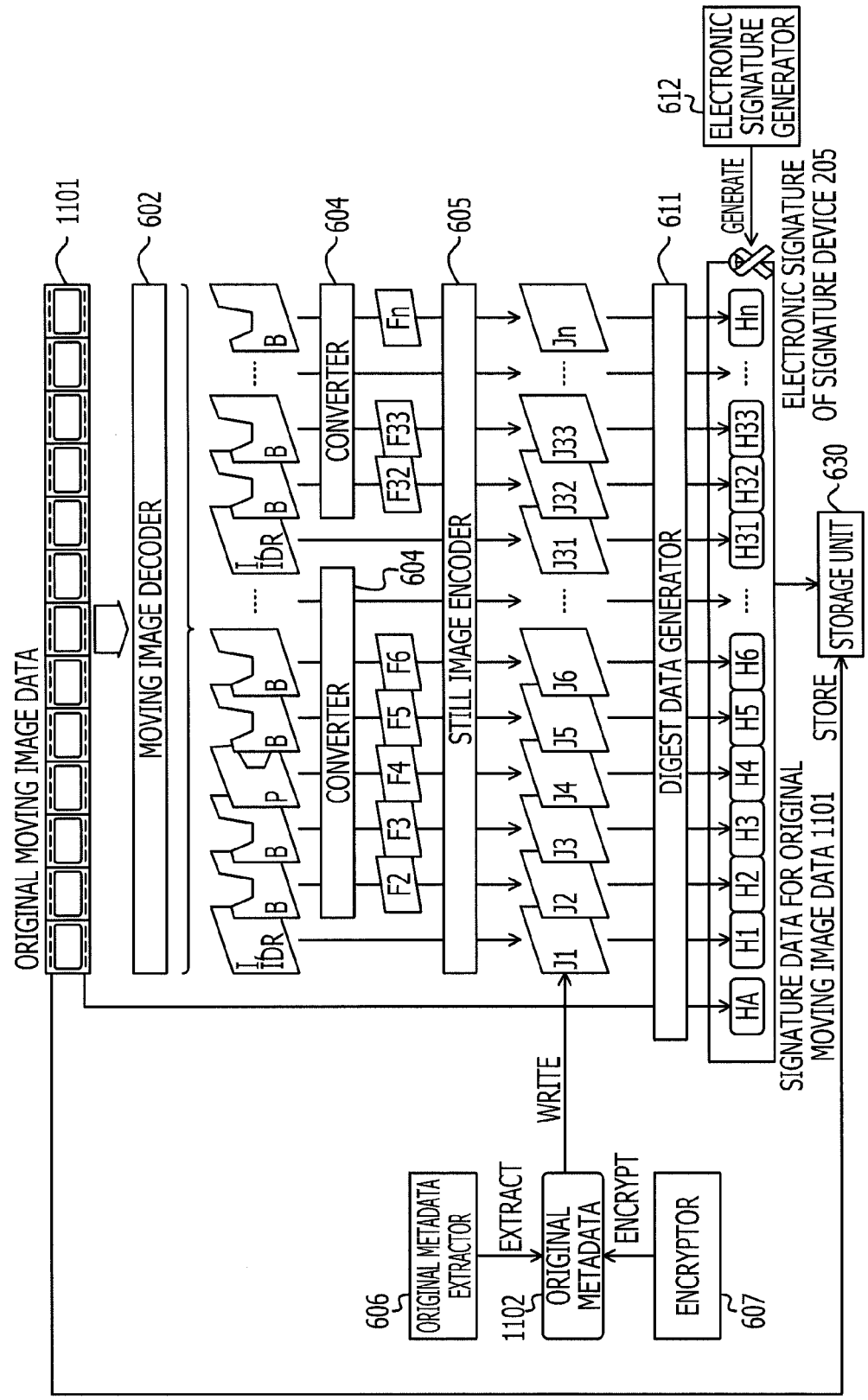
FIG. 11 is an explanatory diagram which depicts an exemplary method for generating a signature to be put to original moving image data.

FIG. 11 is an explanatory diagram which depicts an exemplary method for generating a signature to be put to original moving image data. The signature device 205 analyzes original moving image data 1101 which has been inputted to the signature generator 504 for every frame by means of the moving image decoder 602, and arranges the analyzed frames in chronological order. Further, the signature device 205 stores the original moving image data 1101 in the storage unit 630. Then, the signature device 205 transfers each of the frames to the converter 604 if the frame is a P- or B-picture, and to the still image encoder 605 if the frame is an I- or IDR picture.

The signature device 205 converts the frames transferred to the converter 604 into moving image frames which can be independently played back by means of the converter 604. The converted moving image frames are specifically moving image frames F2 and F3 through Fn. Further, the conversion method was earlier described with reference to FIG. 9. Further, the moving image frame which can be played back may be in a data format which is a same as that of an I- or IDR picture, or an uncompressed image format.

Then, the signature device 205 encodes the moving image frames which are I- and IDR-pictures transferred from the transfer unit 603 and the moving image frames converted by the converter 604 by means of the still image encoder 605, and generates still images. The still images are specifically still images 31, 32 and 33 through in.

Then, the signature device 205 extracts original metadata 1102 by means of the original metadata extractor 606. Incidentally, an example of the extracted original metadata 1102 will be specifically described later with reference to FIG. 12. Further, the signature device 205 encrypts part of the original metadata 1102 extracted for the still image J1 by means of the encryptor 607, and writes the encrypted part into the still image J1. Then, the signature device 205 encrypts part of the original metadata 1102 extracted for the still image J2, and writes the encrypted part into the still image J2. The signature device 205 writes the extracted original metadata into each of the still images up to in. Incidentally, a method for writing the original metadata 1102 into the still images will be described later with reference to FIG. 12.

After writing the original metadata 1102, the signature device 205 generates digest data for each of the still images into which the original metadata 1102 is written by means of the digest data generator 611. The signature device 205 specifically generates digest data H1 and H2 through Hn. Further, the signature device 205 generates digest data HA for the entire original moving image data 1101.

Upon finishing generating all the digest data, the signature device 205 generates electronic signatures of the signature device 205 to be put to the digest data HA of the original moving image data 1101 and a collection of digest data of all the pictures by means of the electronic signature generator 612. The signature device 205 sets the collection of the digest data and the electronic signatures of the signature device 205 generated for the collection together as signature data of the original moving image data.

The signature device 205 can use a one-way hash function to generate the digest data, and can use a public key cryptosystem RSA (Rivest Shamir Adleman) to generate the electronic signatures. The one-way hash function may incorporate algorithms called MD5, SHA-1 and SHA-256. According to SHA-256, e.g., digest data is generated in 256 bits (32 bytes) per one message.

If moving image data is recorded in 30 [fps] (fps: frame Per Second) for nearly one hour, e.g., frames as many as 30 [fps]×60 [seconds]×60 [minutes]=108000 are preserved. According to the SHA-256 algorithm, the digest data is as large as 108000 frames×32 [bytes]=nearly 3.5 [Mbytes] in size. The digest data and the signature generated according to the RSA cryptosystem form signature data as large as nearly 4 [Mbytes] in size together, so that the signature device 205 can achieve a guarantee of features of the original by preserving data not so large in size as the moving image data. The signature device 205 generates a signature to be put to original image data according to the above operations. What is specifically processed in FIG. 11 will be described later with reference to FIGS. 24 and 25.

Figure 12:
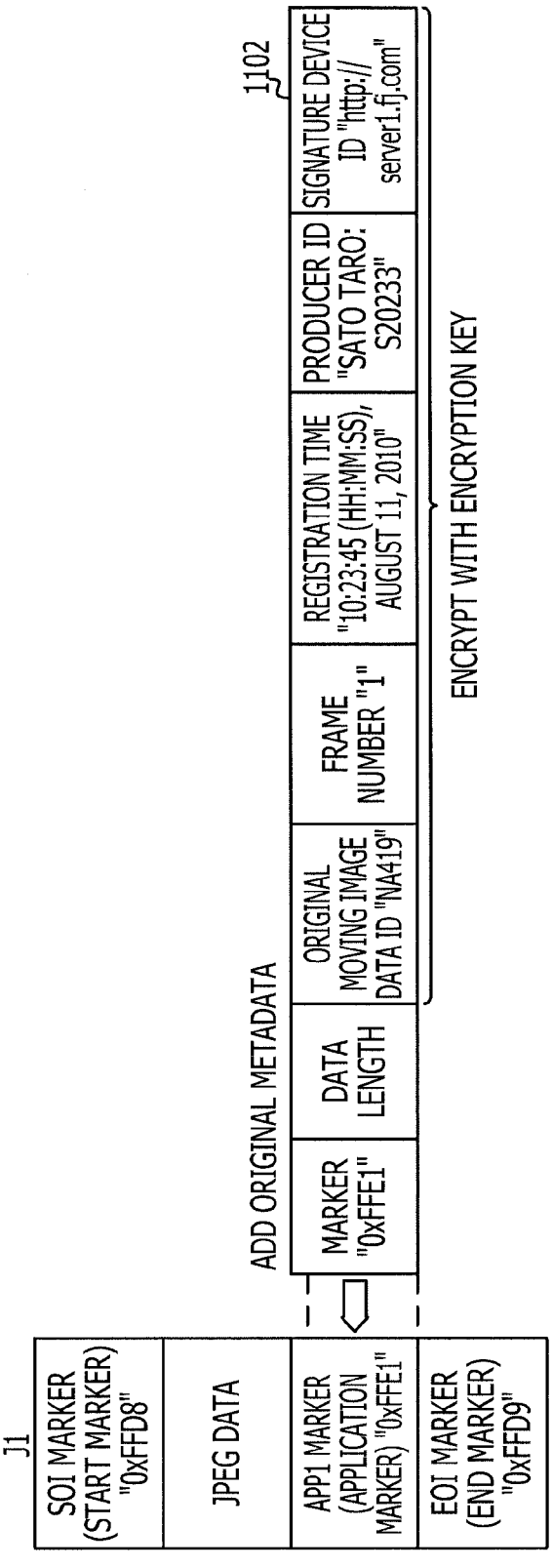

FIG. 12 is an explanatory diagram which depicts an exemplary still image data file that original metadata is added to. FIG. 12 depicts a state in which the original metadata 1102 is written into the still image data file J1 depicted in FIG. 11. Suppose that the still image data file J1 is in a JPEG format. Data in two bytes formed by 0xFF and successive one byte is defined as a marker to give JPEG data and its structure a distinction in the JPEG format. A kind of marker "0xFFD8", e.g., indicates an SOI (Start Of Image) marker to indicate a start of the JPEG file. A marker "0xFFD9" indicates an EOI (End Of Image) marker to indicate an end of the JPEG file.

Further, there are APP0 through APP15 markers which can be used for various purposes. The APP0 through APP15 markers are given values "0xEFE0" through "0xFFEF". The APP1 marker is set as a location that the original metadata 1102 is written into according to the embodiment. The still image J1 includes an SOI marker, JPEG data, an APP1 marker and an EOI marker.

The original metadata 1102 written into the APP1 marker includes seven fields which are marker, data length, original moving image data ID, frame number, registration time, producer ID and signature device ID fields. In the marker field, "0xFFE1" which indicates APP1 is filed. In the data length field, the number of bytes from the data length field to the signature device ID field is filed. In the original moving image data ID field, an ID which can make the original moving image data 1101 uniquely identifiable is filed. In the frame number field, a frame location of a still image to be an object is filed.

In the registration time field, time when the original moving image data 1101 is registered is filed. Incidentally, the registration time field is obtained with reference to an internal clock in the signature device 205. Incidentally, suppose that time is periodically calibrated on the internal clock in the signature device 205 and thus causes not so much error. The embodiment allows incorrect registration time, though.

The producer ID is an ID of a manager of the picture recorder terminal 207 who records the original moving image data 1101 by using the picture recorder terminal 207 and in addition registers the original moving image data 1101 in the signature device 205 by using the upload terminal 202. The signature device ID is an ID which can make the signature device 205 uniquely identifiable. Incidentally, the signature system 100 may include a plurality of signature devices 205. In that case, an ID which makes each of the plural signature devices 205 uniquely identifiable is filed in the signature device ID field.

In FIG. 12, e.g., the original metadata 1102 related to the still image 31 is filed. The original metadata 1102 specifically indicates that the ID of the original moving image data 1101 is "NA419", that the still image J1 is of a first frame, and that the time of generation is "10:23:45 (HH:MM:SS), Aug. 11, 2010". Further, the original metadata 1102 indicates that the producer who produced the original moving image data 1101 is "Sato Taro: S20233" and that the ID of the signature device 205 is "http://server1.fj.com".

Further, the signature device 205 may run an encryption process by using an encryption key filed in the key management DB 501*a* in the signature device 205 so as to avoid leakage or alteration of the original metadata 1102. Incidentally, a range to be encrypted includes the original moving image data ID field through the signature device ID field.

Figure 13:
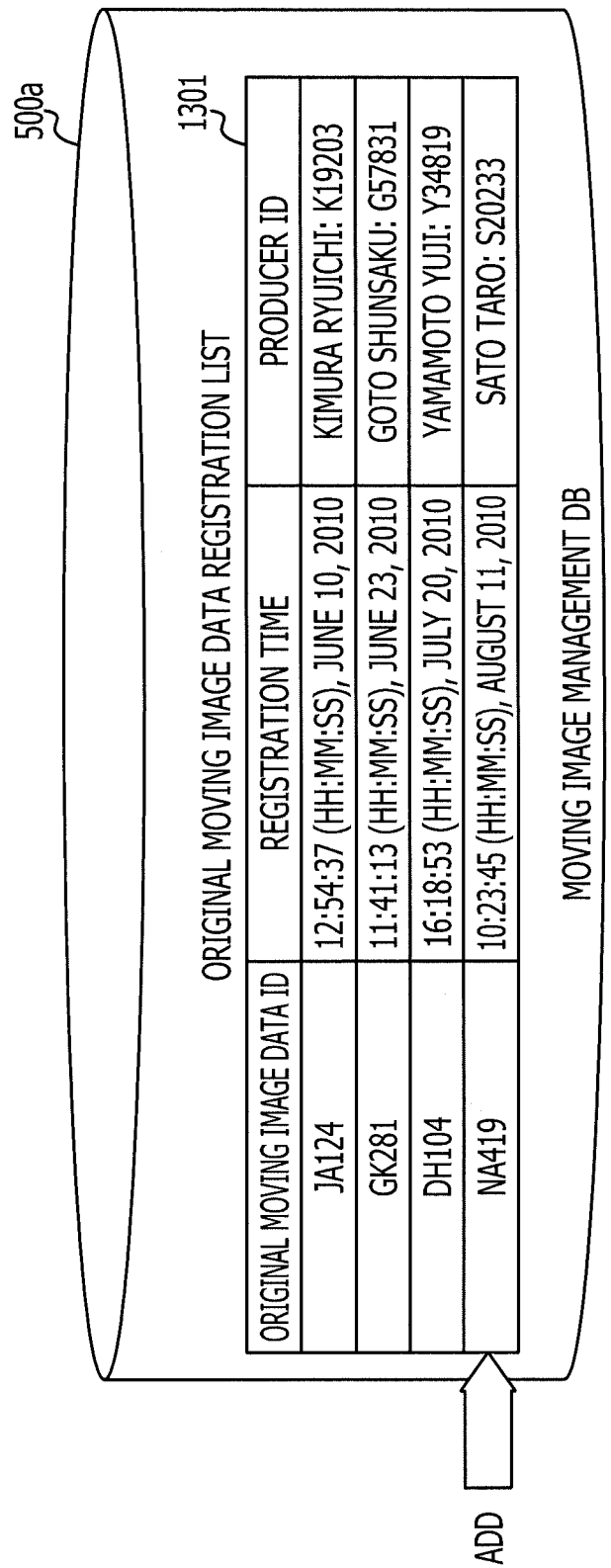
FIG. 13 is an explanatory diagram which exemplarily depicts what is stored in an original moving image data registration list.

FIG. 13 is an explanatory diagram which exemplarily depicts what is stored in an original moving image data registration list 1301. The original moving image data registration list 1301 is filed in the moving image management DB 500*a*. The original moving image data registration list 1301 includes three fields which are original moving image data ID, registration time and producer ID fields. The original moving image data ID, registration time and producer ID depicted in FIG. 12 are filed in the original moving image data ID, registration time and producer ID fields, respectively.

New entries are added to the original moving image data registration list 1301 each time new original moving image data is registered. In FIG. 13, e.g., entries "NA419", "10:23:45 (HH:MM:SS), Aug. 11, 2010" and "Sato Taro: S20233" are in the original moving image data ID, registration time and producer ID fields, respectively.

Figure 14:
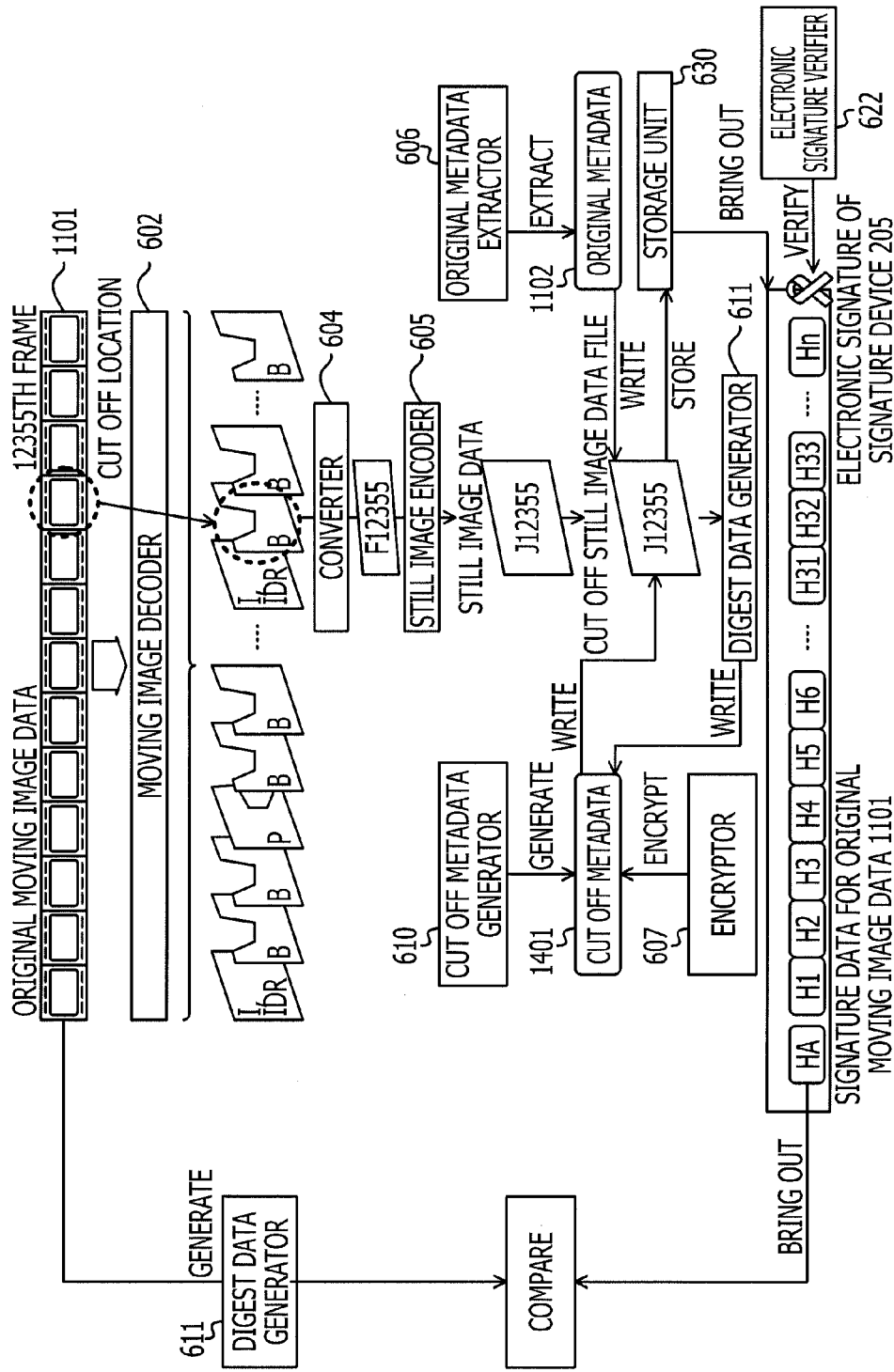
FIG. 14 is an explanatory diagram which depicts an exemplary method for generating a cut off still image data file.

FIG. 14 is an explanatory diagram which depicts an exemplary method for generating a cut off still image data file. The signature device 205 checks whether the original moving image data 1101 is unaltered. The signature device 205 specifically verifies data of a signature put to the original moving image data 1101 by means of the electronic signature verifier 622. The signature device 205 takes a specific method such as to bring out the original moving image data 1101 stored in the storage unit 630 and verify the electronic signature added to the signature data.

If the verification is successful, the signature device 205 brings out the digest data HA of the entire original moving image data 1101 filed in the signature data. The signature device 205 compares the digest data HA with digest data for the entire original moving image data 1101 generated by the digest data generator 611 after bringing out the digest data HA, and checks whether the both digest data are the same.

The signature device 205 records digest data of the entire original moving image data 1101 in advance and uses the entire digest data for comparison in this way in order to detect alteration in the moving image data 1101. The signature device 205 can thereby confirm the original more quickly than it does in a case where digest data of all the still images are recalculated for comparison.

Upon confirming the original, the signature device 205 is instructed with regard to a cut off location. If a frame corresponding to the cut off location is a P- or B-picture, the signature device 205 converts the frame into a moving image frame by means of the converter 604, and further encodes the moving image frame. Suppose, e.g., that the signature device 205 is instructed to cut off a 12355th frame in FIG. 14. At this time, the signature device 205 converts a B-picture of the 12355th frame into a moving image frame F12355 by means of the converter 604, and further encodes the moving image frame F12355 and generates still image data J12355 by means of the still image encoder 605.

After generating the still image data, the signature device 205 extracts the original metadata 1102 by means of the original metadata extractor 606. Then, the signature device 205 encrypts and writes part of the generated original metadata 1102 into the still image data J12355. The still image data J12355 that the original metadata 1102 is written into is made a cut off still image data file J12355.

Then, the signature device 205 generates cut off metadata 1401 by means of the cut off metadata generator 610. Incidentally, a specific example of the generated cut off metadata 1401 will be described later with reference to FIGS. 15A and 15B. Then, the signature device 205 encrypts part of the generated original metadata 1102 by means of the encryptor 607. After the encryption, the signature device 205 generates digest data for a combination of the cut off still image data file J12355 and the cut off metadata 1401 by means of the digest data generator 611. After the generation, the signature device 205 writes the generated digest data into a cut off log list 1501 which will be described later with reference to FIG. 15, or into the cut off metadata 1401. Finally, the signature device 205 writes the cut off metadata 1401 into the cut off still image data file J12355.

Figure 15A:
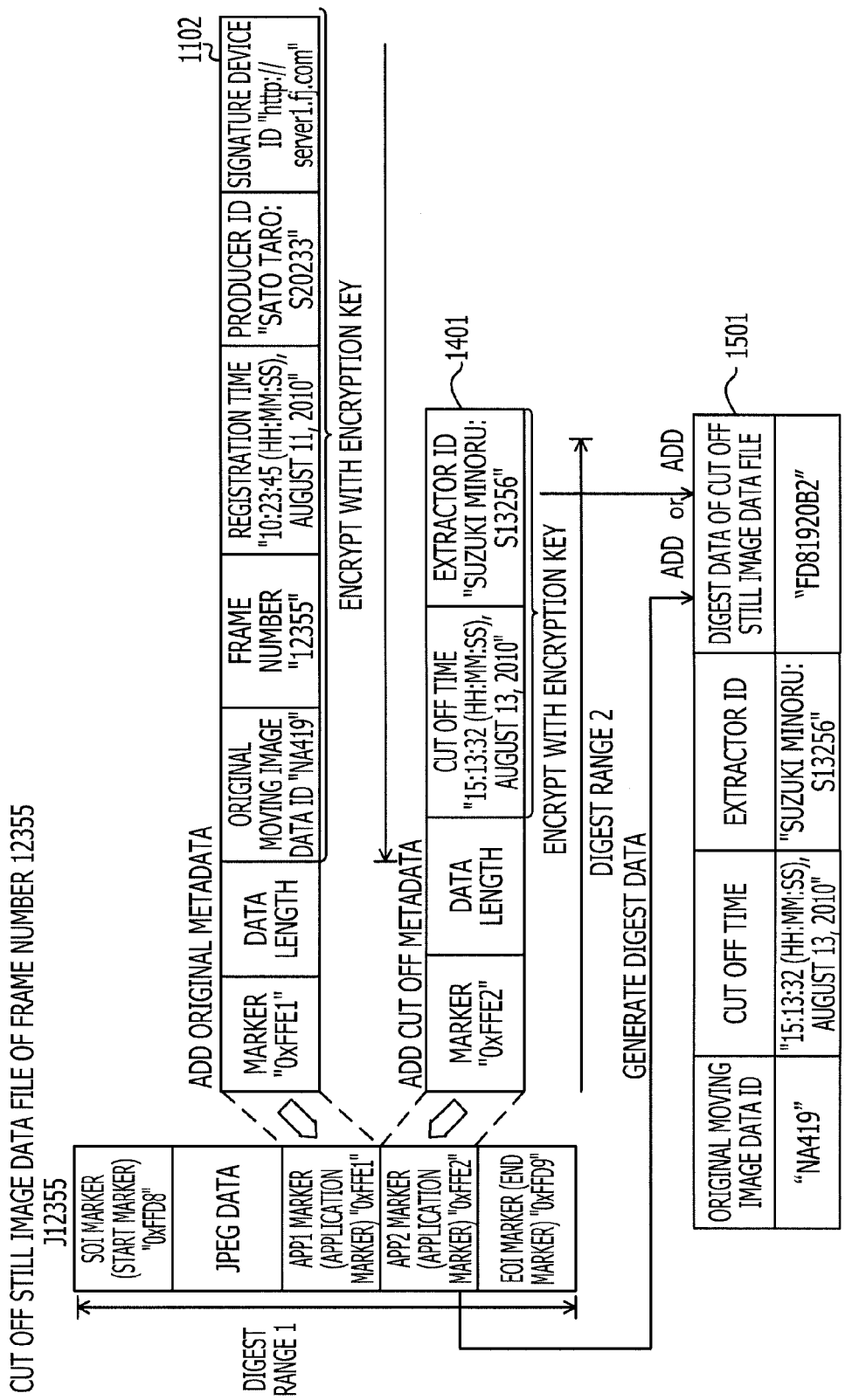
Figure 15B:
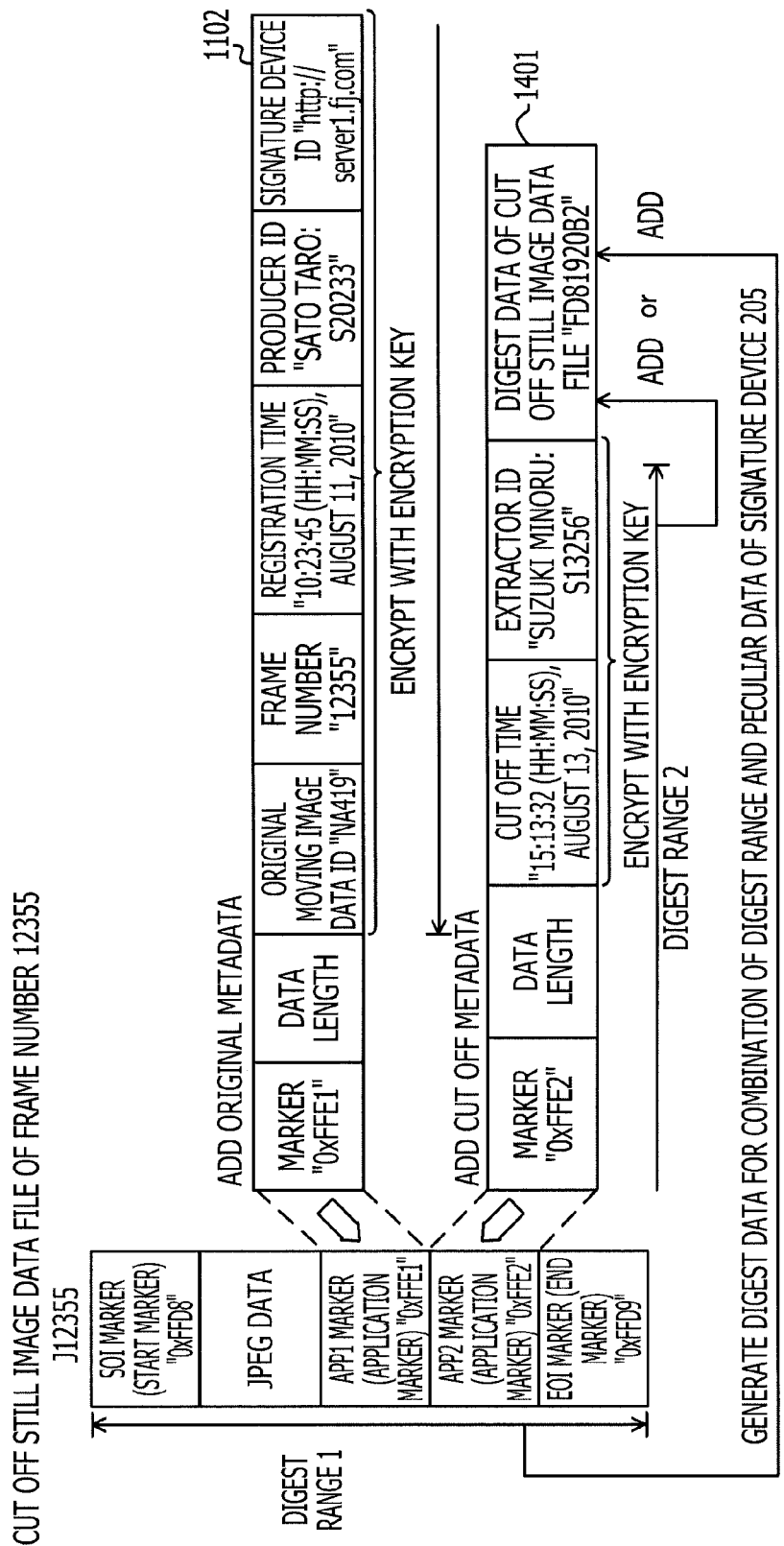

Then, two forms of the cut off still image data file to which the original metadata and the cut off metadata are added will be explained with reference to FIGS. 15A and 15B. FIG. 15A illustrates a state in which the original metadata 1102 and the cut off metadata 1401 are written into the still image J12355 depicted in FIG. 14, and the cut off log list 1501 is stored in the signature device 205. Further, FIG. 15B illustrates a state in which the cut off metadata 1401 that the digest data for the combination of the original metadata 1102 and the cut off still image data file is added to is written into the still image J12355 depicted in FIG. 14.

FIG. 15A is an explanatory diagram which depicts an example of the still image data file that the original metadata and the cut off metadata are added to. Incidentally, as the data to be filed in the original metadata 1102 was explained with reference to FIG. 12, its explanation is omitted.

The cut off still image data file depicted in FIG. 15A will be explained first. The still image data file J12355 includes an SOI marker, JPEG data being still image data, an APP1 marker, an APP2 marker and an EOI marker. The cut off metadata 1401 is filed in the APP2 marker.

The cut off metadata 1401 written into the APP2 marker includes four fields which are marker, data length, cut off time and extractor ID fields. In the marker field, "0xFFE2" which indicates APP2 is filed. In the data length field, the number of bytes from the data length field to the extractor ID field is filed. In the cut off time field, time when the cut off still image is generated is filed. In the extractor field, an ID of the user who generated the cut off still image is filed.

Further, the cut off log list 1501 filed in the moving image management DB 500*a* is a list that an entry is added to each time a cut off still image data file is generated. The cut off log list 1501 includes four fields which are original moving image data ID, cut off time, extractor ID and digest data of the cut off still image data file fields. In the original moving image data ID field, a same value as the value in the original moving image data ID field of the original metadata 1102 is filed. In the cut off time field, a same value as the cut off time of the cut off metadata 1401 is filed. In the extractor ID field, a same value as the value in the extractor ID field of the cut off metadata 1401 is filed. In the digest data of the cut off still image data file field, digest data generated from the cut off still image is filed.

Further, the signature device 205 may perform encryption by using an encryption key filed in the key management DB 501*a* in the signature device 205 so as to avoid leakage or alteration of the cut off metadata 1401. Incidentally, a range to be encrypted includes the cut off time through extractor ID fields.

Further, a range covered by the digest data of the cut off still image data file is a digest range 1 which covers the entire still image J12355 depicted in FIG. 15A. Further, the range covered by the digest data of the cut off still image data file may be a digest range 2 which covers the entire still image J12355 depicted in FIG. 15A. The digest range 2 specifically covers the original moving image data ID field in the original metadata 1102 through the extractor ID field in the cut off metadata 1401.

Why the range covered by the digest data is limited to the digest range 2 is, at first, that authenticity can be confirmed with regard to the cut off still image data file excluding the cut off metadata 1401 depending upon the signature data put to the original moving image data 1101. Thus, it is enough for the digest data of the cut off still image data file to cover the cut off metadata 1401. If the digest range covers only the cut off metadata 1401, however, the cut off metadata 1401 can be exchanged for different cut off metadata 1401.

Thus, if the range covered by the digest data includes at least the original moving image data ID field and the frame number field, digest data which is peculiar to the cut off still image data file can be generated in the digest range 2. Incidentally, a period of time for data processing according to the one-way hash function which generates digest data can be rendered shorter as an inputted byte pattern is shorter. The signature device 205 can thereby shorten a period of time for generating digest data by narrowing the range covered by the digest data while keeping the cut off still image data file including the cut off metadata 1401 from being altered or exchanged by a third party.

Incidentally, cut off meta data 1401 related to the still image J12355 having been cut off is filed as depicted in FIG. 15A. The cut off metadata 1401 specifically indicates that the time when the still image was cut off is 15A3:32 (HH:MM:SS), Aug. 13, 2010, and that the ID of the extractor who cut off the still image is "Suzuki Minoru: S13256". Further, it is indicated that the digest data field in the cut off still image data file in the cut off log list 1501 indicates "FD81920B2".

FIG. 15B is an explanatory diagram which depicts another example of the cut off still image data file that the original metadata and the cut off metadata are added to. Incidentally, differences from what is depicted in FIG. 15A will be explained with reference to FIG. 15B. The cut off metadata 1401 includes the digest data field of the cut off still image data file in the cut off still image data file depicted in FIG. 15B. As what is stored in the digest data field of the cut off still image data file, digest data generated for a combination of the cut off still image data file and data peculiar to the signature device 205 is filed. As the digest data of the cut off still image data file is opened in FIG. 15B, the signature device 205 can keep the digest data from being forged by combining the digest range and the peculiar data that only the signature device 205 knows so as to generate the digest data.

The signature device 205 can generate digest data for the digest range and the peculiar data within the signature device 205 in this way, so as to keep the cut off still image data file from being altered or exchanged by a third party. Incidentally, it is preferable for the peculiar data of the signature device 205 to be filed in the signature device data management TB 503 in advance in such a way that no third person can peruse the peculiar data. Although the signature device ID can be used for the peculiar data of the signature device 205, it is preferable to have another ID as the signature device ID is opened as included in the original metadata 1102.

Further, the signature device 205 generates digest data excluding a portion of the digest data field in the cut off still image data file with regard to the digest range 1 of the digest data in the cut off still image data file. On the other hand, the signature device 205 may fix the digest data field in the cut off still image data file in size and generate the digest data in which every bit in the digest data field is given a value 0.

Figure 16:
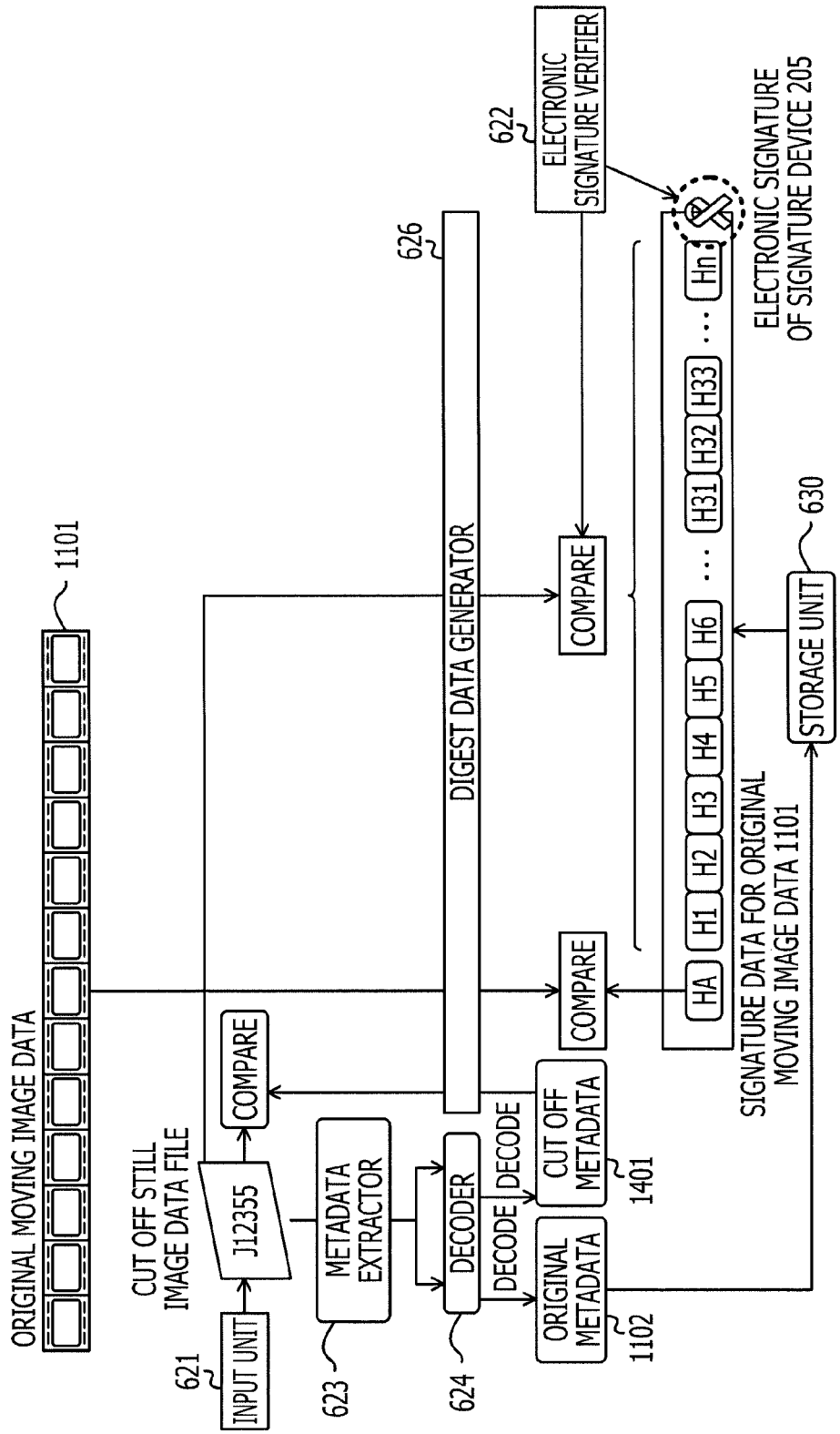
FIG. 16 is an explanatory diagram which depicts an exemplary method for verifying a signature put to a cut off still image data file.

FIG. 16 is an explanatory diagram which depicts an exemplary method for verifying a signature put to the cut off still image data file. To begin with, the signature device 205 extracts the original metadata 1102 and the cut off metadata 1401 from the cut off still image data file to be verified according to the JPEG format by means of the metadata extractor 623. Incidentally, if some of the fields of the original metadata 1102 and the cut off metadata 1401 are encrypted, the signature device 205 decodes the encrypted fields by means of the decoder 624.

Then, the signature device 205 generates digest data from the original moving image data 1101 stored in the storage unit 630 by means of the digest data generator 626. Then, the signature device 205 brings out and compares the signature data of both the generated digest data and the original moving image data 1101, and decides whether the both signature data agree with each other.

If the both signature data agree with each other, the signature device 205 verifies part of the original of the cut off still image data file. The signature device 205 specifically generates digest data from the cut off still image data file except for the cut off metadata 1401. Incidentally, the signature device 205 generates digest data for the original metadata 1102 included in the digest data of the cut off still image data file being kept encrypted with an encryption key. Why the signature device 205 generates the digest data in a state of being encrypted is that digest data was generated in a state of being encrypted when the signature put to the original moving image data 1101 was generated. Thus, the signature device 205 processes verification in a state of being encrypted for checking whether data is altered in the verification process, as well.

Then, the signature device 205 searches and brings out the digest data filed in the signature data of the original moving image data 1101 with respect to the frame number filed in the original metadata 1102. In FIG. 16, e.g., as the frame number equal to 12355 is recorded in the original metadata, the signature device 205 brings out the 12355th digest data filed in the signature data of the original moving image data. After bringing out that, the signature device 205 compares the digest data generated by the electronic signature verifier 622 with the brought out digest data and decides whether the both digest data agree with each other.

If the both digest data agree with each other, the signature device 205 checks whether the cut off metadata is unaltered. The signature device 205 specifically generates digest data of the original metadata and the cut off still image data file including the cut off metadata. Incidentally, the signature device 205 generates the digest data by including the cut off metadata encrypted with an encryption key and the peculiar data of the signature device 205. After generating the digest data, the signature device 205 compares the generated digest data with the digest data filed in the cut off metadata and decides whether the both digest data agree with each other. If the both digest data agree with each other, the signature device 205 notifies the verification terminal 204 of success in the verification. Then, exemplary screens displayed on the playback/extraction terminal 203 and the verification terminal 204 will be explained with reference to FIGS. 17-21.

Figure 17:
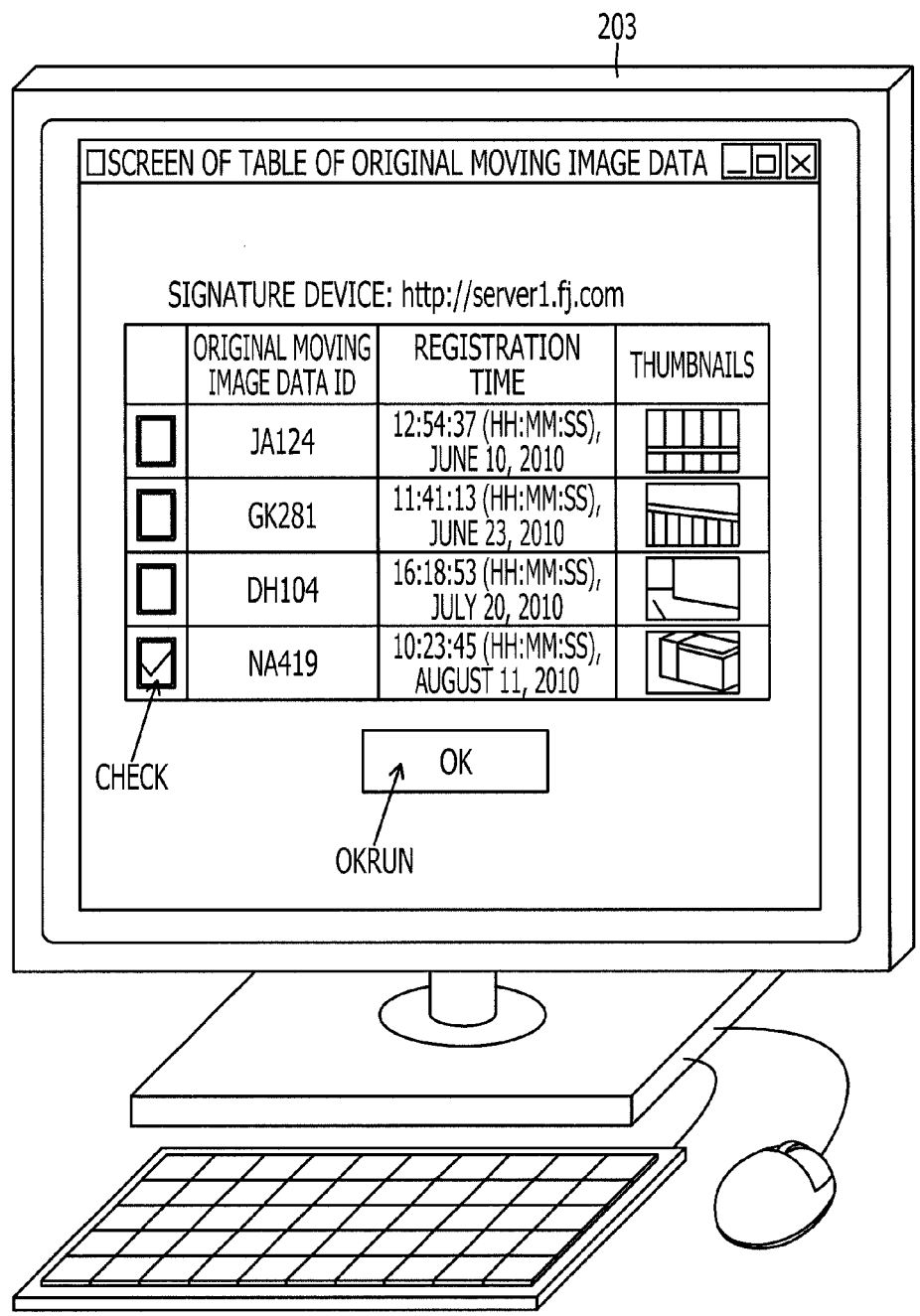

FIG. 17 is an explanatory diagram which depicts an exemplary screen that a list of the original moving image data 1101 is displayed on. The playback/extraction terminal 203 can choose original moving image data to be cut off if a checkbox (CHECK) is pressed. If the extractor presses an OK button (OKRUN), a request for a cut off process is sent to the signature device 205.

Figure 18:
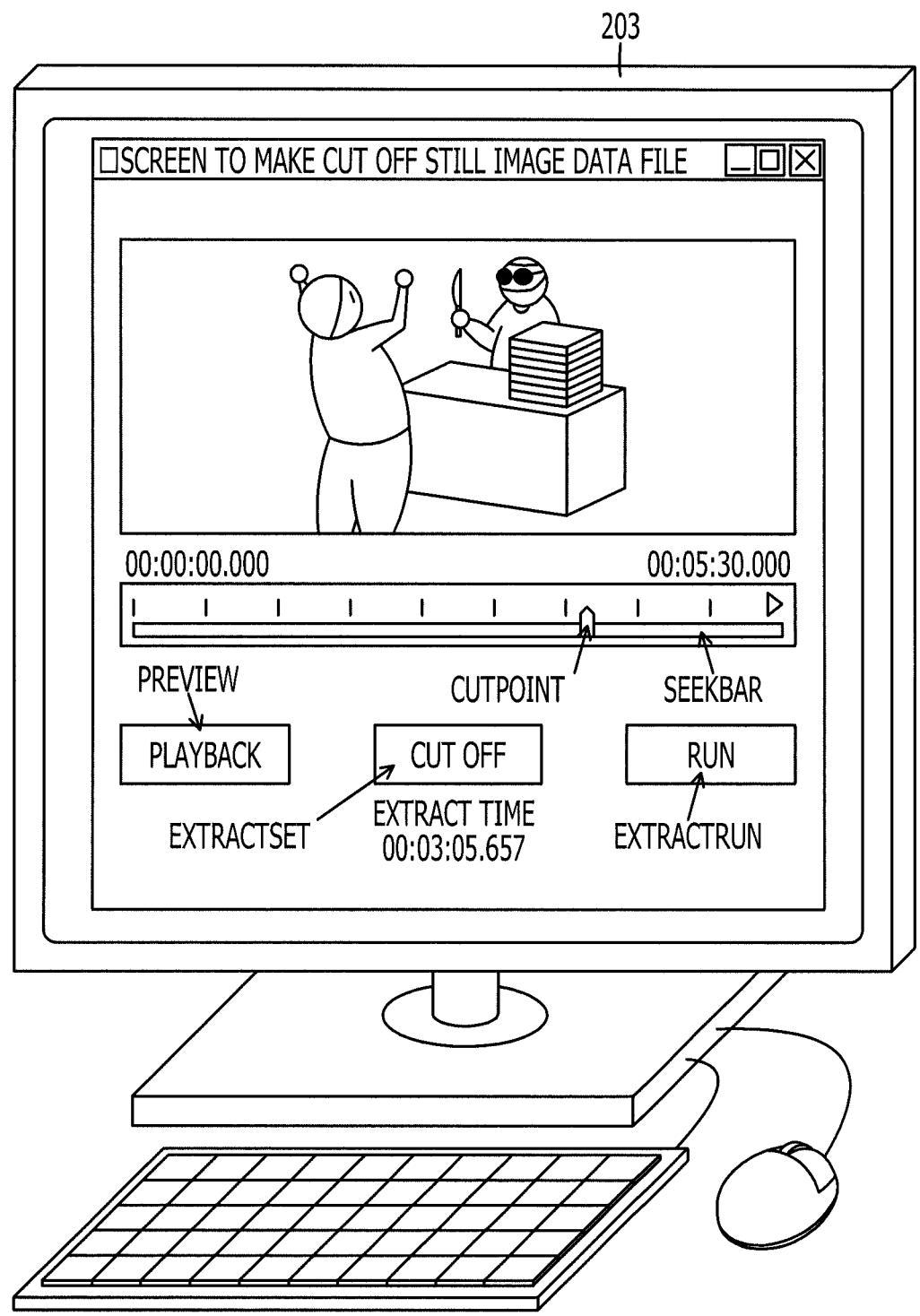

FIG. 18 is an explanatory diagram which depicts an exemplary screen that a cut off still image data file is made on. If the extractor presses a playback button (PREVIEW), the playback/extraction terminal 203 plays the original moving image data back. The extractor looks at and specifies a cut off location while the playback is going on, so as to enable the playback/extraction terminal 203 to perform a cut off operation.

A specific method for the cut off operation is as follows. Shift a pointer to a location where the cut off operation is done on a seekbar (SEEKBAR) and press a cut off button (EXTRACTSET) upon the pointer reaching the location where the cut off operation is done, so that the playback/extraction terminal 203 sets the cut off location. The cut off location (CUTPOINT) is specified owing to the above operation. Press a run button (EXTRACTRUN) so that the playback/extraction terminal 203 sends cut off location data to the signature device 205.

Figure 19:
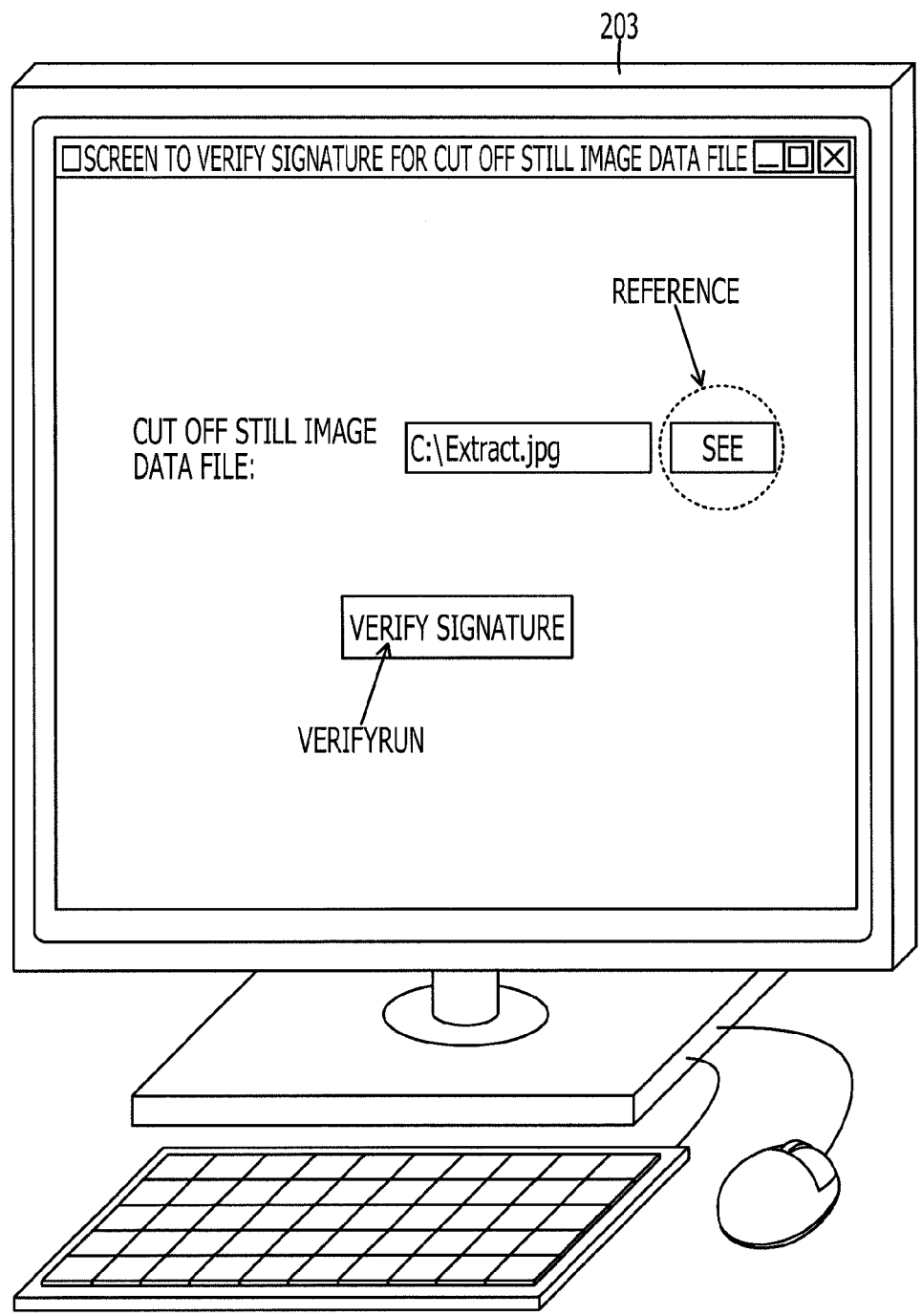

FIG. 19 is an explanatory diagram which depicts an exemplary screen that a cut off still image data file to be verified is chosen on. If the extractor presses a reference button (REFERENCE), the playback/extraction terminal 203 displays a cut off still image data file preserved in the playback/extraction terminal 203 on a file management window. After the extractor chooses a cut off still image data file to be verified and presses a signature verification button (VERIFYRUN), the playback/extraction terminal 203 sends the chosen cut off still image data file to the verification terminal 204.

Figure 20:
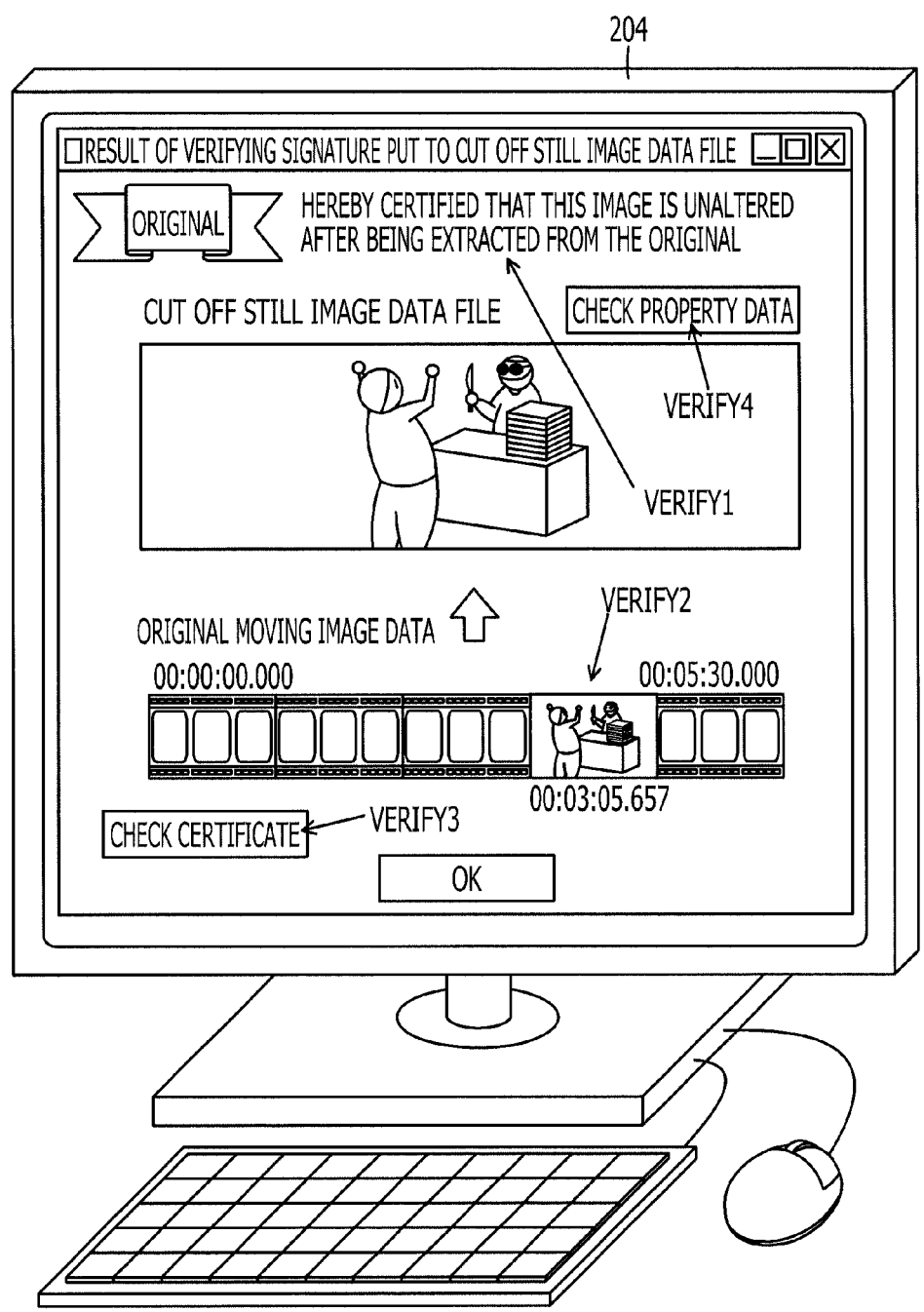

FIG. 20 is an explanatory diagram which depicts an exemplary screen that a result of the verification of the cut off still image data file is displayed on. The verification terminal 204 can demonstrate to the verifier a result such that the cut off still image data file is the still image data file formed by extracted part of the original moving image data and is unaltered after the extraction by displaying a result of the verification (VERIFY1). Further, the verification terminal 204 can display the cut off location indicating which part of the original moving image data is extracted (VERIFY2).

Further, press a certificate check button so that the verification terminal 204 can display the electronic signature data of the original moving image data and who made the original moving image data (VERIFY3).

Further, press a property data check button so that the verification terminal 204 displays a result such that the original metadata 1102 and the cut off metadata having been unaltered are verified (VERIFY4). An exemplary screen that property data is displayed on will be described later with reference to FIG. 21.

Figure 21:
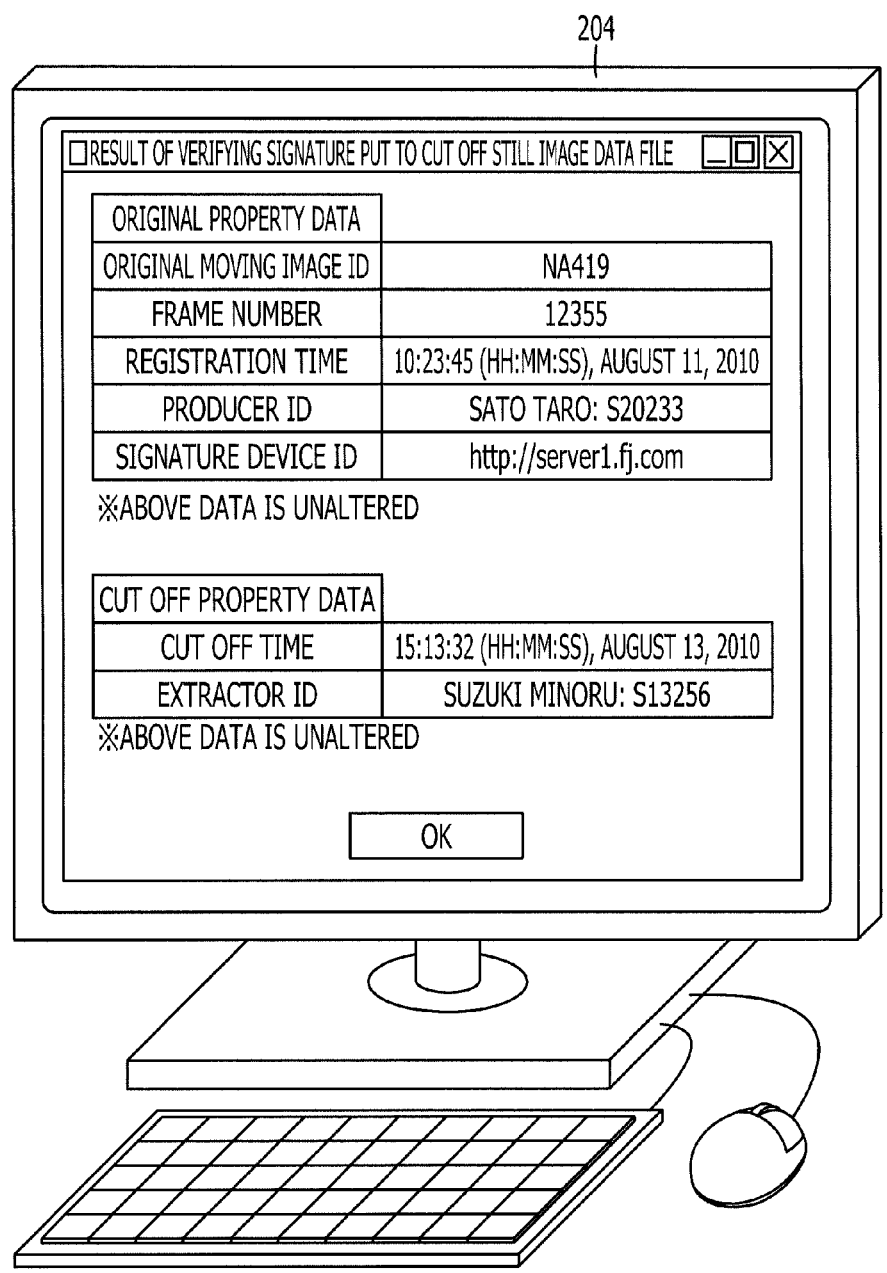

FIG. 21 is an explanatory diagram which depicts an exemplary screen that the property data of the cut off still image data file is displayed on. Press the property data check button so that the verification terminal 204 displays a screen for resultant signature verification of the cut off still image data file. The verification terminal 204 specifically displays content of the original metadata 1102 and the cut off metadata 1401. The verifier checks the screen for resultant signature verification of the cut off still image data file in this way, so that the verifier can confirm that the original moving image data is made by the signature device 205 and is unaltered.

The signature system 100 runs five processes for generating original moving image data, generating a signature, verifying signature data, generating a cut off still image data file and verifying the cut off still image data file by using the devices and functions described above. The respective processes will be explained with reference to flowcharts depicted in FIGS. 22 to 29B. Further, a dashed arrow indicates data sending and receiving among the plural devices in each of the flowcharts.

In the process for generating original moving image data, the signature system 100 runs a process for generating a signature to be put to the original moving image data, and its breakdown includes processes for decoding a moving image of the original moving image data, generating an independent frame and generating an electronic signature. In the process for verifying signature data of the original moving image data, the signature system 100 runs a process for verifying an electronic signature to be put to the original moving image data. In the process for generating a cut off still image data file, the signature system 100 runs a process for verifying a signature to be put to the original moving image data and generating an independent frame. In the process for verifying a cut off still image data file, the signature system 100 runs a process for verifying signature data of the original moving image data. Further, the processes for generating an electronic signature and verifying an electronic signature incorporate processes for sending and receiving data that an electronic signature is put to and verifying a receiver device depicted in FIG. 23 to be run after a process for registering a public key of an electronic signature in advance as described later with reference to FIG. 22.

Figure 22:
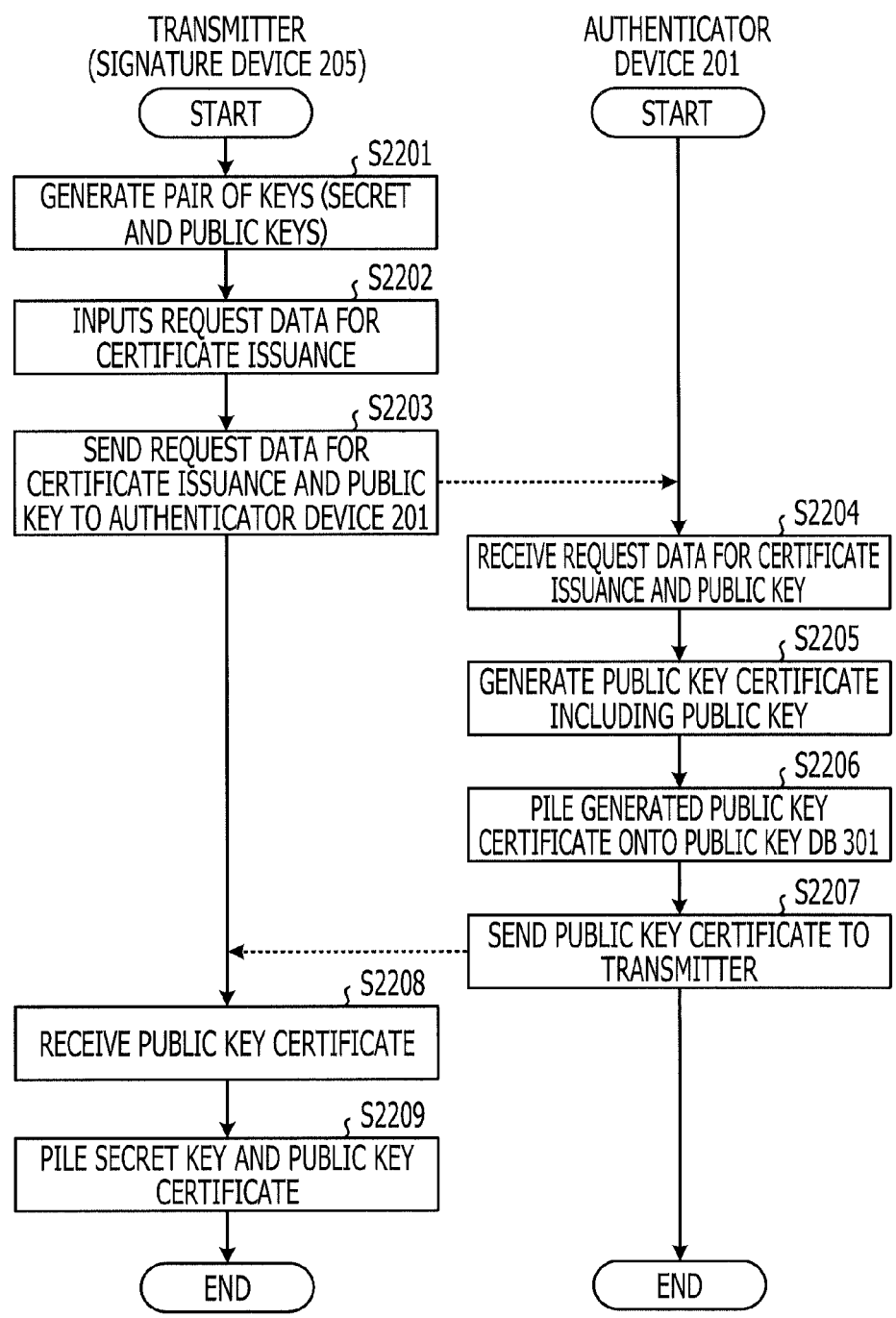
FIG. 22 is a flowchart which depicts an exemplary process for registering a public key to be used for electronic signature.

FIG. 22 is a flowchart which depicts an exemplary process for registering a public key to be used for electronic signature. FIG. 22 depicts a process in which a public key is registered in between the transmitter and the authenticator device 201. The transmitter of the electronic signature of the embodiment is the signature device 205.

To begin with, the transmitter generates a pair of keys (secret and public keys) (operation S2201). Then, the transmitter inputs request data for certificate issuance (operation S2202). The input data is related to the signature device 205. Upon finishing inputting the request data for certificate issuance, the transmitter sends the inputted request data for certificate issuance and the public key to the authenticator device 201 (operation S2203).

The authenticator device 201 receives the request data for certificate issuance and the public key on the communicator 304 (operation S2204). The certificate issuer 302 in the authenticator device 201 generates a public key certificate including the public key (operation S2205), and piles the generated public key certificate on the public key DB 301 (operation S2206). Then, the certificate issuer 302 controls the communicator 304 so as to send the issued public key certificate to the transmitter having sent the request data for certificate issuance via the network 206 (operation S2207).

Upon receiving the public key certificate (operation S2208), the transmitter piles the secret key generated by the operation 2201 and the public key certificate issued by the authenticator device 201 on the storage device that the transmitter itself has (operation S2209), and finishes the process. The signature device 205 holds the secret key and the public key certificate in the key management DB 501*a* used as a storage area.

Figure 23:
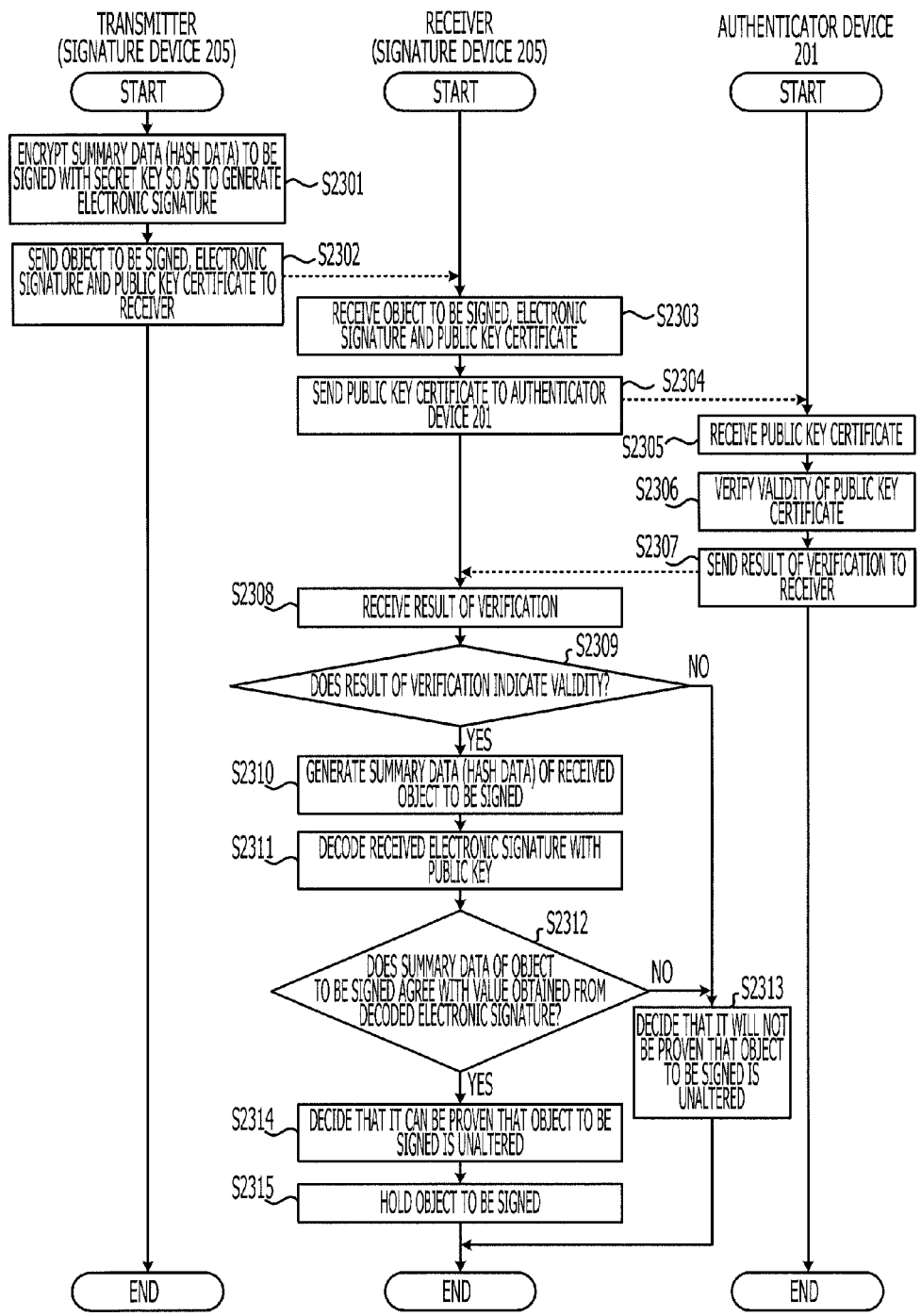
FIG. 23 is a flowchart which depicts examples of a process for sending and receiving data that an electronic signature is put to and a verification process to be run by a receiver.

FIG. 23 is a flowchart which depicts examples of a process for sending and receiving data that an electronic signature is put to and a verification process to be run by the receiver. FIG. 23 depicts the process for sending and receiving data that an electronic signature is put to between the transmitter and the receiver, and the process for verifying the electronic signature in between the receiver and the authenticator device 201. The transmitter and the receiver of the embodiment are each the signature device 205.

To begin with, the transmitter encrypts summary data (hash data) which is an object to be signed with the secret key stored in the storage area (operation S2301). Data generated through the encryption forms an electronic signature. Then, the transmitter sends the object to be signed, the electronic signature and the public key certificate similarly stored in the storage area to the receiver (operation S2302).

The receiver receives the object to be signed, the electronic signature and the public key certificate (operation S2303), and sends the public key certificate to the authenticator device 201 (operation S2304) in order to check the term of validity, data of losing validity, etc. Suppose that the authenticator device 201 of the embodiment supports a series of functions to issue and verify a certificate. Then, the authenticator device 201 receives the public key certificate (operation S2305), verifies validity (operation S2306) and sends a result of the verification to the receiver (operation S2307).

The receiver receives the result of the verification (operation S2308) and checks whether the result of the verification proves validity (operation S2309). If the result of the verification does not prove validity (operation S2309: No), the receiver decides that no fact that the received object to be signed is unaltered can be proved (operation S2313) and finishes the process. If the result of the verification proves validity (operation S2309: Yes), the receiver generates summary data (hash data) of the received object to be signed (operation S2310), and further decodes the received electronic signature with the public key (operation S2311). Then, the receiver checks whether the generated summary data of the object to be signed agrees with a value obtained from the electronic signature decoded with the public key (operation S2312).

If they do not agree with each other (operation S2312: No), the receiver shifts to an operation S2313 and finishes the process. If they agree with each other (operation S2312:

Yes), the receiver decides that the fact that the received object to be signed is unaltered can be proved (operation S2314), holds the object to be signed (operation S2315) and finishes the process. Upon going through the operation S2313, the receiver may run a notification process for indicating that the electronic signature was not proven on the operation terminal of the receiver, e.g., the playback/extraction terminal 203 or the verification terminal 204.

Figure 24:
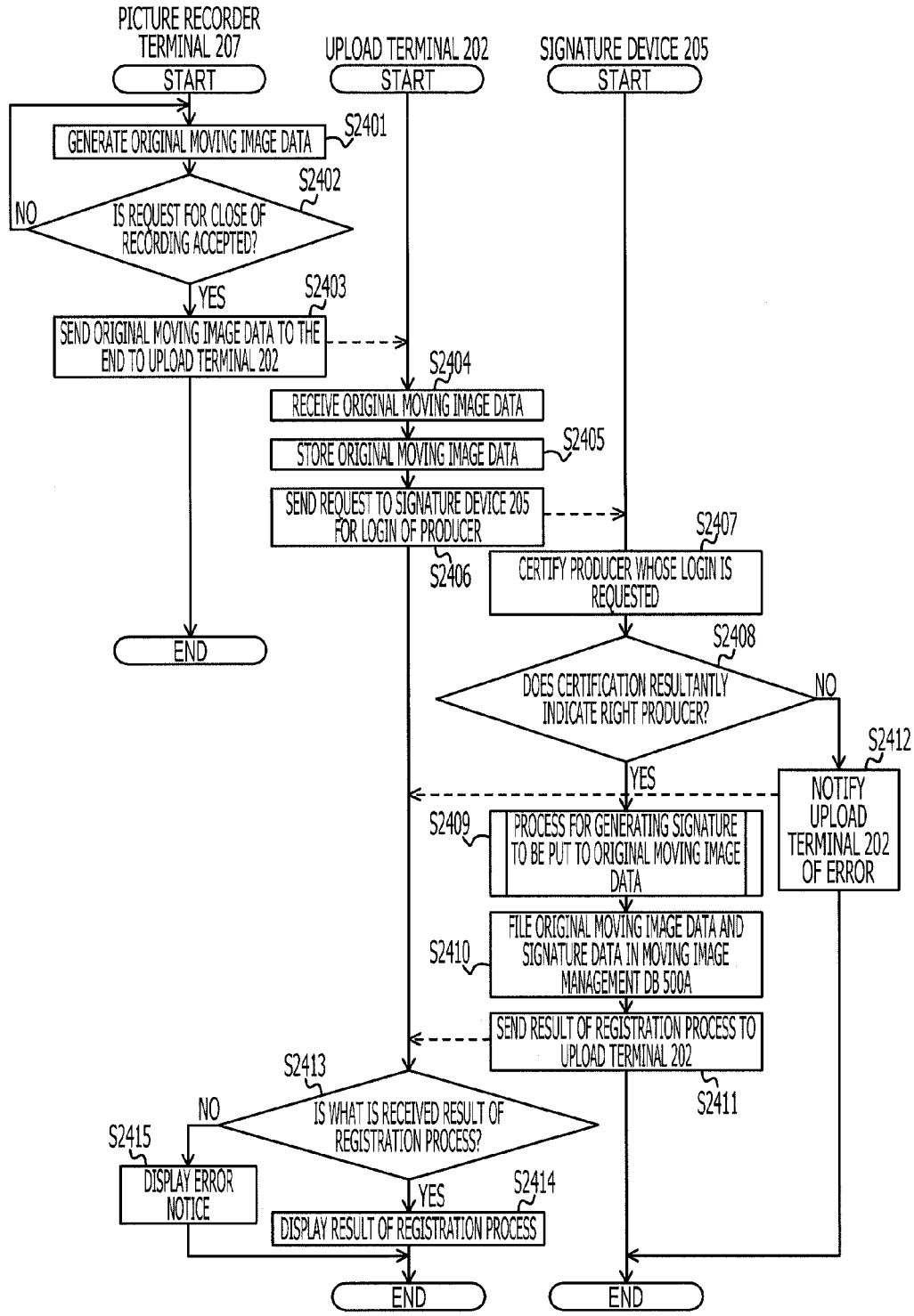
FIG. 24 is a flowchart which depicts an exemplary process for generating original moving image data.

FIG. 24 is a flowchart which depicts an exemplary process for generating original moving image data. The picture recorder terminal 207 generates original moving image data (operation S2401). The picture recorder terminal 207 decides whether the picture recorder terminal 207 has accepted a request for a close of recording after generating the original moving image data (operation S2402). Upon accepting no request for a close of recording (operation S2402: No), the picture recorder terminal 207 shifts to the process of the operation S2401 and continues generating the original moving image data. Upon accepting a request for a close of recording (operation S2402: Yes), the picture recorder terminal 207 sends the completely generated original moving image data to the upload terminal 202 (operation S2403) and finishes the process for generating original moving image data.

The upload terminal 202 receives the original moving image data (operation S2404). The upload terminal 202 stores the received original moving image data in the upload terminal 202 (operation S2405), and sends a request to the signature device 205 for login of a producer (operation S2406). At this time, the upload terminal 202 accepts user data such as an ID and a password of the producer as an input from the producer included in data for logging the producer in on the signature device 205. The upload terminal 202 sends the user data and the original moving image data with the login request to the signature device 205. Incidentally, the upload terminal 202 waits for a reply to come from the signature device 205 after the login.

Upon receiving the request for login from the upload terminal 202, the signature device 205 certifies the producer whose data is in the user data (operation S2407). A specific method for certifying the producer is as follows. If the producer user data list 1001 includes a record which agrees with the received user data, the signature device 205 certifies the producer who requested to log in as the right producer. After certifying the producer, the signature device 205 decides whether the certification resultantly indicates the right producer (operation S2408).

If the right producer is indicated (operation S2408: Yes), the signature device 205 runs a process for generating a signature to be put to the original moving image data (operation S2409). The process for generating a signature to be put to the original moving image data will be described later in detail with reference to FIG. 25. After running that process, the signature device 205 files the original moving image data and the signature data in the moving image management DB 500a via the moving image management TB 500b (operation S2410). After filing them, the signature device 205 sends a result of a registration process to the upload terminal 202 (operation S2411). Unless the right producer is indicated (operation S2408: No), the signature device 205 notifies the upload terminal 202 of an error (operation S2412).

Upon receiving what is sent from the signature device 205, the upload terminal 202 decides whether what is received is a result of the registration process (operation S2413). If it is a result of the registration process (operation S2413: Yes), the upload terminal 202 displays the result of the registration process (operation S2414) and finishes the process for generating the original moving image data. Unless it is a result of the registration process (operation S2413: No), the upload terminal 202 displays the error notification (operation S2415) and finishes the process for generating the original moving image data.

Figure 25A:
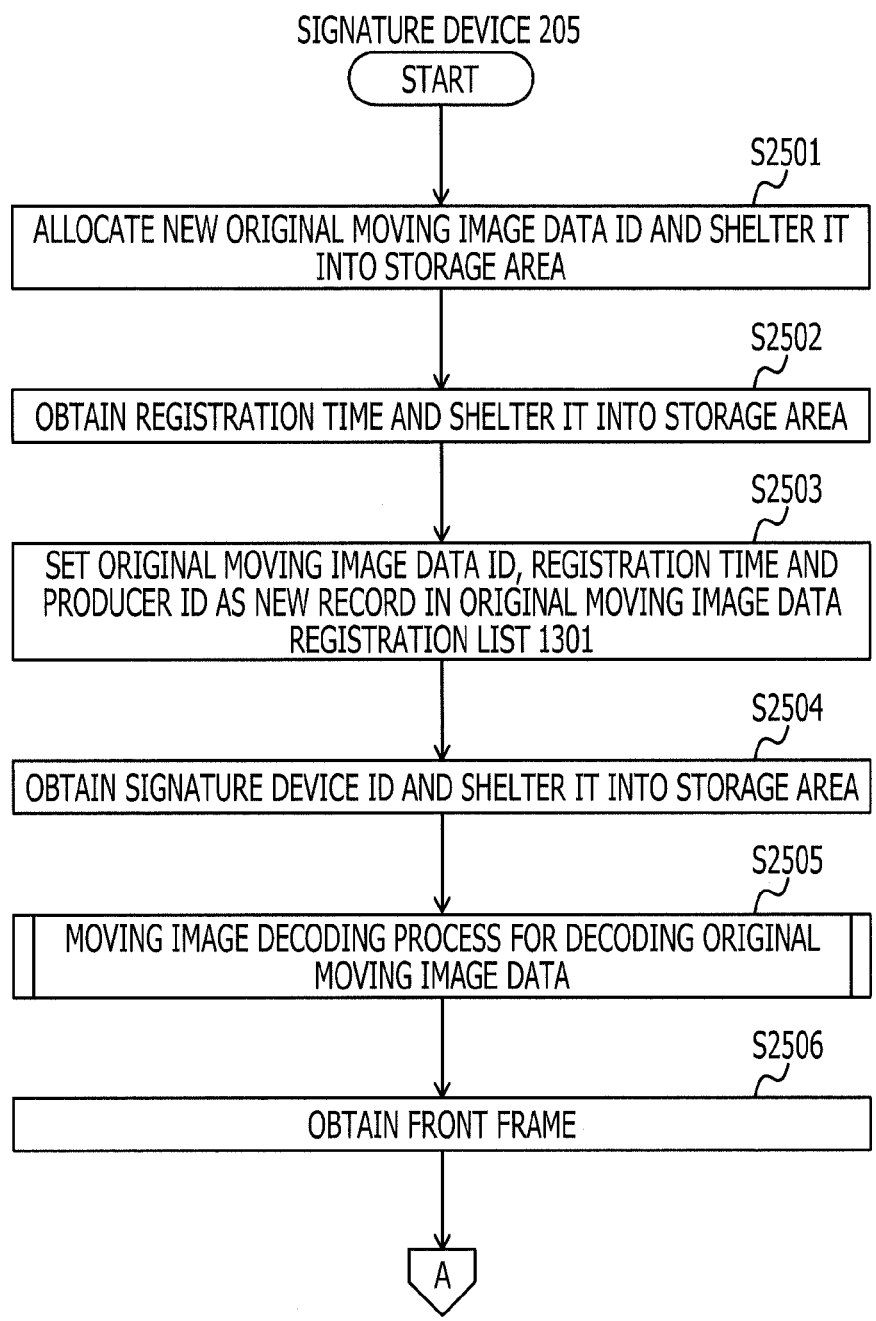
FIG. 25A is a first page of a flowchart which depicts an exemplary process for generating a signature to be put to original moving image data.

FIGS. 25A and 25B are flowcharts which depict an exemplary process for generating a signature to be put to original moving image data. To begin with, see the flowchart depicted in FIG. 25A. The signature device 205 allocates a new original moving image data ID and shelters the ID into a storage area (operation S2501). After sheltering it, the signature device 205 obtains registration time and shelters the registration time into the storage area (operation S2502). Then, the signature device 205 sets the original moving image data ID, the registration time and the producer ID as a new record in the original moving image data registration list 1301 (operation S2503).

After setting them, the signature device 205 obtains a signature device ID and shelters the signature device ID into the storage area (operation S2504). After sheltering it, the signature device 205 runs a moving image decoding process for decoding the original moving image data (operation S2505). Details of the moving image decoding process are indicated by the reference numerals 901 and 902 in FIG. 9 described earlier. The signature device 205 specifically runs the decoding process in accordance with a format of the original moving image data, decides which one of the I-, P- and B-pictures the respective frames are, and rearranges the frames not chronologically arranged so that the frames can be chronologically obtained.

After being ready to obtain data from the original moving image data frame by frame as the operation S2505, the signature device 205 obtains a front frame (operation S2506). After obtaining it, the signature device 205 shifts to a process of an operation S2507.

Then, see the flowchart depicted in FIG. 25B. The signature device 205 runs a process for generating an independent frame for the obtained frame (operation S2507). The process for generating an independent frame will be described later with reference to FIG. 26. After running the process for generating an independent frame, the signature device 205 encodes the outputted independent frame into still image data (operation S2508). The signature device 205 specifically does JPEG encoding for each of I-, P- and B-pictures to be encoded into JPEG image formats so as to generate still image data.

After encoding the pictures, the signature device 205 extracts original metadata from the original moving image data (operation S2509), and encrypts the original metadata with a shared key of the signature device 205 (operation S2510). Incidentally, a range to be encrypted is the range depicted in FIG. 12. After the encryption, the signature device 205 writes the encoded still image data and the original metadata into a new still image data file to be generated (operation S2511).

Then, the signature device 205 generates digest data of the still image data file (operation S2512). After generating the digest data, the signature device 205 decides whether the obtained frame is a last frame (operation S2513). If there is a successive frame (operation S2513: No), the signature device 205 obtains a next frame (operation S2514) and shifts to the process of the operation S2507.

If the obtained frame is a last frame (operation S2513: Yes), the signature device 205 generates digest data for the entire original moving image data (operation S2515). After generating the digest data, the signature device 205 runs a process for generating an electronic signature of the signature device 205 for the original moving image data and a collection of digest data of all still image data files (operation S2516), and finishes the process for generating a signature to be put to the original moving image data.

FIG. 26 is a flowchart which depicts a process for generating an independent frame. The signature device 205 checks whether an obtained frame is an I-picture (operation S2601). The I-picture mentioned here includes an IDR-picture.

If it is an I-picture (operation S2601: Yes), the signature device 205 converts the obtained frame into an independent frame (operation S2607). If the obtained frame is a P- or B-picture (operation S2601: No), the signature device 205 obtains a frame which is a preceding I- or P-picture (operation S2602). The term preceding means a direction towards the past on a time axis.

Then, the signature device 205 checks whether the obtained frame is a P-picture (operation S2603). If the obtained frame is a P-picture (operation S2603: Yes), the signature device 205 converts the preceding frame and the obtained frame into an independent frame (operation S2606). If the obtained frame is a B-picture (operation S2603: No), the signature device 205 obtains a frame which is a succeeding I- or P-picture (operation S2604). After obtaining it, the signature device 205 converts the preceding frame, the succeeding frame and the obtained frame into an independent frame (operation S2605).

After processing the operation S2607, S2606 or S2605, the signature device 205 outputs the independent frame (operation S2608) and finishes the process. Incidentally, a specific example of the conversion of the operation S2607, S2606 or S2605 is the process going on from what is indicated by the reference numeral 903 to what is indicated by the reference numeral 904 as earlier described with reference to FIG. 9.

FIGS. 27A, 27B, 27C and 27D form a flowchart which depicts an exemplary process for generating a cut off still image data file. See the flowchart depicted in FIG. 27A. The playback/extraction terminal 203 sends a request to the signature device 205 for login of an extractor (operation S2701). After sending the request for login, the playback/extraction terminal 203 waits for a reply to come from the signature device 205.

Upon receiving the request for login from the playback/extraction terminal 203, the signature device 205 certifies the extractor whose data is in the user data (operation S2702). A specific method for certifying the extractor as the operation S2702 is as follows. If the extractor user data list 1002 includes a record which agrees with the received user data, the signature device 205 certifies the extractor who requested to log in as the right extractor.

After certifying the extractor, the signature device 205 decides whether the certification resultantly indicates the right extractor (operation S2703). If the right extractor is indicated (operation S2703: Yes), the signature device 205 sends the original moving image data registration list 1301 to the playback/extraction terminal 203 (operation S2704). Unless the right extractor is indicated (operation S2703: No), the signature device 205 notifies the playback/extraction terminal 203 of an error (operation S2705) and finishes the process for generating a cut off still image data file.

Upon receiving what is sent from the signature device 205, the playback/extraction terminal 203 decides whether what is received from the signature device 205 is the original moving image data registration list 1301 (operation S2706).

If it is the original moving image data registration list 1301 (operation S2706: Yes), the playback/extraction terminal 203 displays the original moving image data registration list 1301 (operation S2707), and accepts a choice of original moving image data to be extracted (operation S2708). After the extractor's choice, the playback/extraction terminal 203 sends a request to the signature device 205 for a process for cutting off the chosen moving image data (operation S2709) and waits for a reply to come from the signature device 205.

Unless what is received is the original moving image data registration list 1301 (operation S2706: No), the playback/extraction terminal 203 displays an error notice (operation S2710) and finishes the process for generating a cut off still image data file. Further, the signature device 205 receives a request for a cut off process (operation S2711) and shifts to a process of an operation S2712.

Then, see the flowchart depicted in FIG. 27B. The signature device 205 brings out the original moving image data and signature data to be extracted filed in the moving image management DB 500a (operation S2712) and runs a process for verifying signature data of the original moving image data (operation S2713). After running that process, the signature device 205 decides whether a result of the verification proves successful (operation S2714). If it proves successful (operation S2714: Yes), the signature device 205 sends instructions to continue the cut off process to the playback/extraction terminal 203 (operation S2715). If it proves unsuccessful (operation S2714: No), the signature device 205 notifies the playback/extraction terminal 203 of an error (operation S2716).

Upon receiving what is sent from the signature device 205, the playback/extraction terminal 203 decides whether the instructions to continue the cut off process are received (operation S2717). Upon receiving the instructions to continue the cut off process (operation S2717: Yes), the playback/extraction terminal 203 accepts an appointed cut off location (operation S2718). After the extractor appoints the cut off location, the playback/extraction terminal 203 sends cut off location data to the signature device 205 (operation S2719). Incidentally, the playback/extraction terminal 203 waits for a reply to come from the signature device 205 after sending the cut off location data. Unless the instructions to continue the cut off process are received (operation S2717: No), the playback/extraction terminal 203 displays an error notice (operation S2720) and finishes the process for generating a cut off still image data file. Further, the signature device 205 receives the cut off location data (operation S2721) and shifts to a process of an operation S2722.

Then, see the flowchart depicted in FIG. 27C. The signature device 205 runs a process for generating an independent frame of a frame on the cut off location (operation S2722). After running that, the signature device 205 encodes the outputted independent frame into still image data (operation S2723). After encoding that, the signature device 205 extracts original metadata corresponding to the cut off location from the original moving image data (operation S2724), and encrypts the original metadata corresponding to the cut off location with the shared key of the signature device 205 (operation S2725). After encrypting that, the signature device 205 writes the still image data and the original metadata into a file to be the cut off still image data file (operation S2726).

After writing that, the signature device 205 obtains cut off time and shelters it into the storage area (operation S2727). Then, the signature device 205 obtains the extractor ID and shelters it into the storage area (operation S2728). The signature device 205 generates cut off metadata from the obtained cut off time and extractor ID (operation S2729) and shifts to a process of an operation S2730.

Finally, see the flowchart depicted in FIG. 27D. The signature device 205 encrypts the cut off metadata with the shared key of the signature device 205 (operation S2730) and generates digest data of the cut off still image data file (operation S2731). Incidentally, the digest data generated by the operation S2731 is generated for a combination of the cut off still image data file and the peculiar data of the signature device 205. Further, a range in which the digest data is generated by the operation S2731 may be the entire cut off still image data file which is the digest range 1 as described with reference to FIG. 15. Further, the range in which the digest data is generated may be the original image data ID through extractor ID fields which is the digest range 2.

After generating that, the signature device 205 writes the cut off metadata into the still image data file (operation S2732) and files it into the moving image management DB 500a as a cut off still image data file (operation S2733). After filing that, the signature device 205 sends the cut off still image data file to the playback/extraction terminal 203 (operation S2734) and finishes the process for generating the cut off still image data file.

The playback/extraction terminal 203 receives the cut off still image data file (operation S2735), stores the received cut off still image data file (operation S2736) and finishes the process for generating the cut off still image data file.

As described above, the signature device 205 entirely takes charge of the cut off processing function so that the playback/extraction terminal 203 just accepts instructions about a location of extraction, and that the cut off process can be run while no encryption key kept by the signature device 205 is taken into account.

Figure 28:
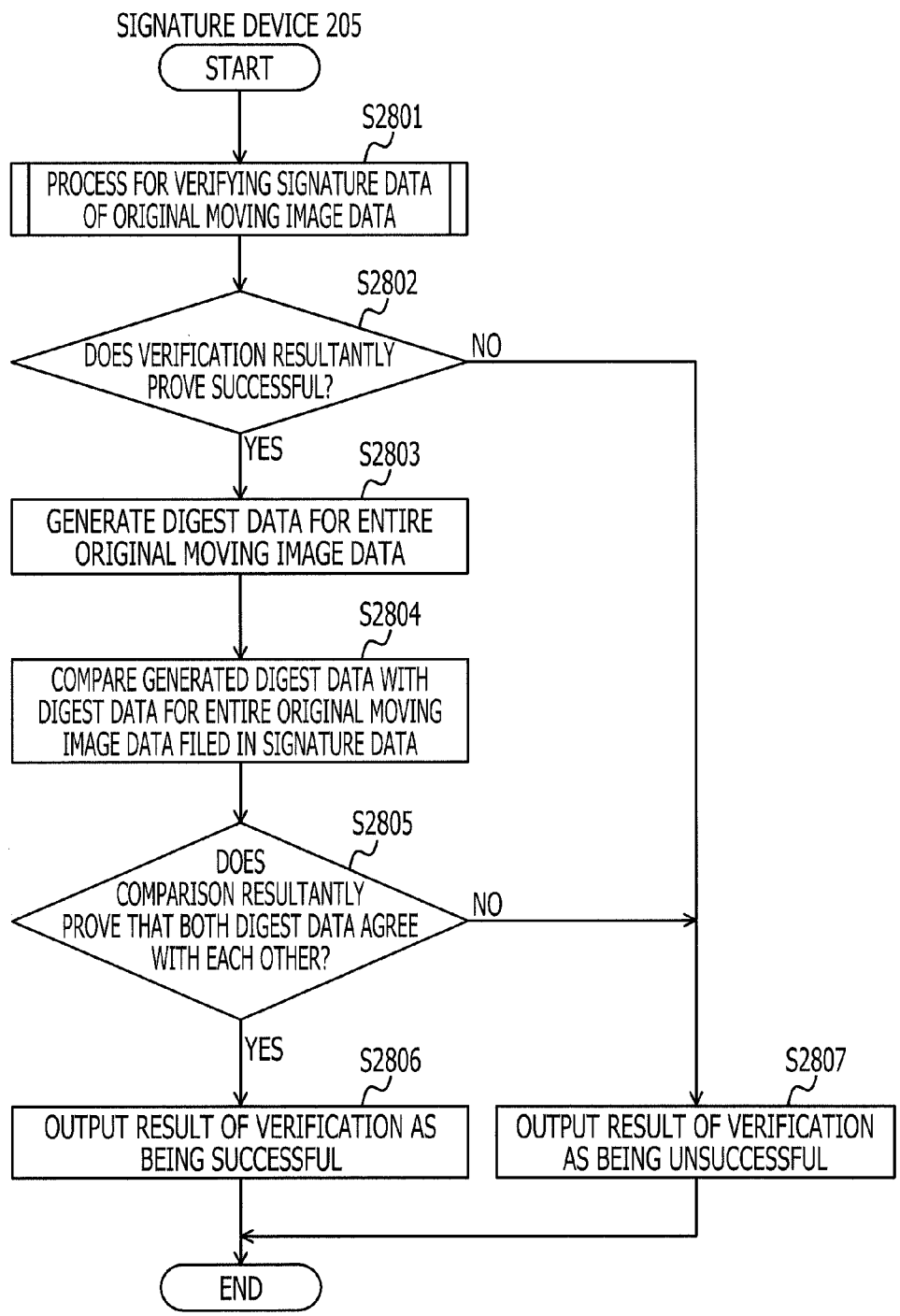
FIG. 28 is a flowchart which depicts an exemplary process for verifying signature data of original moving image data.

FIG. 28 is a flowchart which depicts an exemplary process for verifying signature data of original moving image data. The signature device 205 runs a process for verifying signature data of original moving image data (operation S2801). After running the process, the signature device 205 decides whether the verification resultantly proves successful (operation S2802). If the verification resultantly proves successful (operation S2802: Yes), the signature device 205 generates digest data for the entire original moving image data (operation S2803). After generating that, the signature device 205 compares the generated digest data with the digest data for the entire original moving image data filed in the signature data (operation S2804). After comparing them, the signature device 205 decides whether the comparison resultantly proves that the both digest data agree with each other (operation S2805).

If the comparison resultantly proves that the both digest data agree with each other (operation S2805: Yes), the signature device 205 outputs a result of the verification as being successful (operation S2806) and finishes the process for verifying the signature data of the original moving image data. Unless the verification resultantly proves successful (operation S2802: No) or unless the comparison resultantly proves that the both digest data agree with each other (operation S2805: No), the signature device 205 outputs a result of the verification as being unsuccessful (operation S2807) and finishes the process for verifying the signature data of the original moving image data.

Figure 29B:
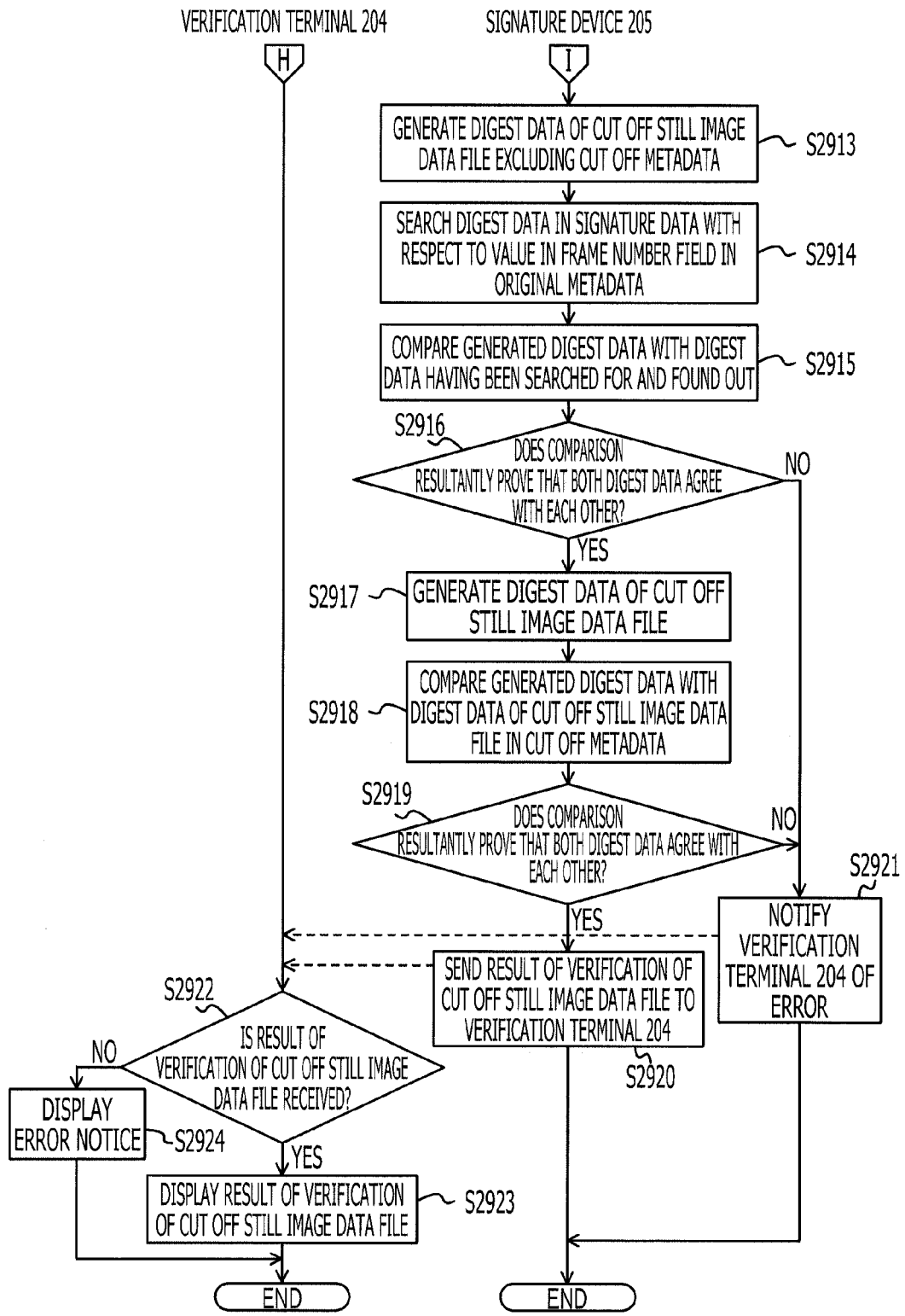
FIG. 29B is a second page of the flowchart which depicts the exemplary process for verifying the cut off still image data file.

FIGS. 29A and 29B form a flowchart which depicts an exemplary process for verifying a cut off still image data file. To begin with, see the flowchart depicted in FIG. 29A. The playback/extraction terminal 203 brings out a cut off still image data file (operation S2901). After bringing out that, the playback/extraction terminal 203 sends the cut off still image data file having been brought out to the verification terminal 204 (operation S2902) and finishes the process for verifying the cut off still image data file.

The verification terminal 204 receives the cut off still image data file (operation S2903) and sends a request to the signature device 205 for login of a verifier (operation S2904). After sending that, the verification terminal 204 waits for a reply to come from the signature device 205.

Upon receiving the request for login from the verification terminal 204, the signature device 205 certifies the verifier whose data is in the user data (operation S2905). A specific method for certifying the verifier as the operation 2905 is as follows. If the verifier user data list 1003 includes a record which agrees with the received user data, the signature device 205 certifies the verifier who requested to log in as the right verifier.

After certifying the verifier, the signature device 205 decides whether the certification indicates the right verifier (operation S2906). If the right verifier is indicated (operation S2906: Yes), the signature device 205 extracts original metadata and cut off metadata from the cut off still image data file (operation S2907). A specific method for extracting that is as follows. If the cut off still image data file is in a JPEG format, the signature device 205 detects a marker in the cut off still image data file.

If the type of the detected marker is "0xFFE1" which indicates APP1, the signature device 205 extracts original metadata up to a data pattern indicated by the successive data length field. Further, if the type of the detected marker is "0xFFE2" which indicates APP2, the signature device 205 extracts cut off original metadata up to the data pattern indicated by the successive data length field. Further, in case of another marker, the signature device 205 skips the data pattern indicated by the successive data length field and detects a next marker.

After extracting the original metadata and the cut off metadata, the signature device 205 decodes encrypted fields in the original metadata and the cut off metadata with the shared key of the signature device 205 (operation S2908). After decoding them, the signature device 205 searches the original moving image data and the signature data filed in the moving image management DB 500a with respect to the original moving image data ID field in the original metadata (operation S2909) and runs a process for verifying the signature data of the original moving image data (operation S2910). After running that process, the signature device 205 decides whether a result of the verification proves successful (operation S2911). If it proves successful (operation S2911: Yes), the signature device 205 shifts to a process of an operation S2913.

Unless the right verifier is indicated (operation S2906: No) or unless the verification proves successful (operation S2911: No), the signature device 205 notifies the verification terminal 204 of an error (operation S2912) and finishes the process for verifying the cut off still image data file.

Then, see the flowchart depicted in FIG. 29B. The signature device 205 generates digest data of the cut off still image data file excluding the cut off metadata (operation S2913). After generating that, the signature device 205 searches the digest data in the signature data with respect to a value in the frame number field in the original metadata (operation S2914).

After searching that, the signature device 205 compares the generated digest data with digest data having been searched for and found out (operation S2915). After comparing the both digest data, the signature device 205 decides whether the comparison resultantly proves that the both digest data agree with each other (operation S2916). If the comparison resultantly proves that the both digest data agree with each other (operation S2916: Yes), the signature device 205 generates digest data of the cut off still image data file (operation S2917). Incidentally, the digest data generated by the operation S2917 is generated by means of data in which data such that the cut off still image data file includes the peculiar data of the signature device 205 is included.

After generating that, the signature device 205 compares the generated digest data with the digest data of the cut off still image data file in the cut off metadata (operation S2918). After comparing the both digest data, the signature device 205 decides whether the comparison resultantly proves that the both digest data agree with each other (operation S2919). If the comparison resultantly proves that the both digest data agree with each other (operation S2919: Yes), the signature device 205 sends a result of the verification to the verification terminal 204 (operation S2920) and finishes the process for verifying the cut off still image data file. Unless the comparison resultantly proves that the both digest data agree with each other (operation S2919: No), the signature device 205 notifies the verification terminal 204 of an error (operation S2921) and finishes the process for verifying the cut off still image data file.

Upon receiving what is sent from the signature device 205, the verification terminal 204 decides whether what is received is a result of the verification of the cut off still image data file (operation S2922). Upon receiving a result of the verification of the cut off still image data file (operation S2922: Yes), the verification terminal 204 displays the result of the verification of the cut off still image data file (operation S2923) and finishes the process for verifying the cut off still image data file. Upon receiving no result of the verification of the cut off still image data file (operation S2922: No), the verification terminal 204 displays an error notice (operation S2924) and finishes the process for verifying the cut off still image data file.

According to the signature device, the method for signature and the program for signature described above, write original metadata for identifying image data into image data generated from moving image data so as to put a signature to the image data. The signature device can thereby generate image data which facilitates identification of signature data to be related to confirmation of the original. As the original metadata is included in an object to be signed, the signature device can detect an alteration if any and can easily identify the signature data by using a key for searching the moving image data and the signature data included in the original metadata in condition of no alteration.

Further, since a signature device has to have a plurality of tables for managing moving image data and signature data together, an existing signature device suffers from increased operation cost and a huge amount of data. The signature device of the embodiment does not have to manage moving image data and signature data together as data to be used for searching the signature data is included in the image data to be opened, and can thereby reduce the operation cost. Further, the ordinarily known signature device takes time for searching a huge amount of data. The signature device of the embodiment can reduce an amount of data to be held, though, and can reduce time for searching the data.

Further, the signature device may write cut off metadata to be data in time of a cut off operation into a cut off still image data file, so as to generate digest data for the cut off still image data file including the cut off metadata. The signature device can thereby keep the data in time of the cut off operation unaltered.

Further, the signature device may generate digest data for a combination of the cut off still image data file that the cut off metadata is written into and peculiar data of the signature device, and include the digest data in the cut off still image data file. The signature device thereby does not have to store in itself the digest data of the cut off still image data file including the cut off metadata, and can reduce the amount of data in the signature device.

Further, the signature device may generate digest data for a combination of original metadata of the cut off still image data file, the cut off metadata and peculiar data of the signature device, and include the digest data in the cut off still image data file. The signature device can thereby reduce time for generation of the digest data which protects the cut off still image data file from alteration, and can reduce time for signature generation and signature verification.

Further, the signature device may decide in a group of stored summary data whether summary data such that a combination of moving image data and location data of image data in the moving image data corresponds to data extracted from image data to be verified agrees with summary data of the image data to be verified. The signature device can thereby easily identify corresponding summary data from a huge group of summary data by using original metadata written into the image data to be verified.

Further, the moving image data stored in the signature device may be compressed moving image data. Further, the compressed moving image data may be inter-frame compressed moving images. Further, data made open to the public is a still image data file according to the embodiment, and may be moving image data which is part of moving image data instead. The signature device may cut off moving image data from original moving image data, e.g., on a GOP-by-GOP basis, and may write cut off metadata into the cut off moving image data so as to open it to the public.

Incidentally, run a program for signature prepared in advance on a computer such as a personal computer or a workstation so that the method for signature explained according to the embodiment can be implemented. The program for signature is recorded on a computer-readable recording medium such as a hard disk, a flexible disk, a CD-ROM, an MO or a DVD, and is read from the recording medium by the computer so as to be run. Further, the program for signature may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system comprising:
    a storage unit configured to store moving image data, the storage unit being configured to store respective summary data of a still image data file in relation to location data of each of a plurality of frames in the moving image data, the still image data file including a first area and a second area, the first area being an area in which still image data encoded from image data in accordance with an image format is stored, the second area being an area in which data of location of the image data in the moving image data and identification data of the moving image data are stored; and a first processor coupled to the storage unit and configured to:
  extract data stored in the second area in the still image data file to be verified,
  search a group of summary data stored in the storage unit for summary data such that a combination of the identification data of the moving image data and the location data of the image data corresponds to the data extracted,
  generate summary data for the still image data file to be verified;
  make a decision whether the summary data searched for agrees with the summary data generated, and
  output the decision to display; and an apparatus including a memory and a second processor coupled to the memory, wherein the second processor of the apparatus is configured to:
  extract the plurality of frames from the moving image data, the plurality of frames being drawn in order,
  encode the plurality of frames into a plurality of still image data, the plurality of still image data correspond to the plurality of frames respectively,
  extract a plurality of identification data of the moving image data from the moving image data for the plurality of frames respectively,
  extract a plurality of frame number data indicating a drawing sequence of the plurality of frames for the plurality of frames respectively,
  extract a first still image data from the plurality of still image data,
  extract a first frame number from the plurality of frames number of a first frame which corresponds to the first still image data,
  extract a first identification data from the plurality of identification data of the first frame, and
  generate the summary data corresponding to the first still image data, the first frame number and the first identification data.

2. The system according to claim 1, wherein the second processor is configured to generate an electronic signature of the summary data.

3. The system according to claim 2, wherein the second processor is configured to verify the first still image data based on the electronic signature.

4. The system according to claim 1, wherein the summary data are hash data calculated by using a hash function.

* * * * *